United States Patent
Kember et al.

(10) Patent No.: US 11,613,606 B2
(45) Date of Patent: Mar. 28, 2023

(54) METHOD FOR QUENCHING A POLYMERISATION PROCESS

(71) Applicant: Econic Technologies LTD, Macclesfield (GB)

(72) Inventors: Michael Kember, Macclesfield (GB); David Muir, Macclesfield (GB); Anthony Chartoire, Macclesfield (GB); James Leeland, Macclesfield (GB); Fernando Valera, Macclesfield (GB); Andrew Carruthers, Macclesfield (GB); Rakibul Kabir, Macclesfield (GB)

(73) Assignee: Econic Technologies LTD, Macclesfield (GB)

( * ) Notice: Subject to any disclaimer, the term of this patent is extended or adjusted under 35 U.S.C. 154(b) by 0 days.

(21) Appl. No.: 16/758,179

(22) PCT Filed: Oct. 24, 2018

(86) PCT No.: PCT/GB2018/053084
§ 371 (c)(1),
(2) Date: Apr. 22, 2020

(87) PCT Pub. No.: WO2019/081932
PCT Pub. Date: May 2, 2019

(65) Prior Publication Data
US 2022/0185956 A1 Jun. 16, 2022

(30) Foreign Application Priority Data
Oct. 24, 2017 (GB) ..................... 1717441

(51) Int. Cl.
*C08G 64/34* (2006.01)
*C08G 64/40* (2006.01)
*C08J 5/20* (2006.01)

(52) U.S. Cl.
CPC .......... *C08G 64/406* (2013.01); *C08G 64/34* (2013.01); *C08J 5/20* (2013.01); *C08J 2369/00* (2013.01)

(58) Field of Classification Search
USPC ........................................... 525/450
See application file for complete search history.

(56) References Cited

U.S. PATENT DOCUMENTS

| | | | |
|---|---|---|---|
| 3,427,256 A | 2/1969 | Milgrom | |
| 4,500,704 A | 2/1985 | Kruper, Jr. et al. | |
| 4,826,953 A | 5/1989 | Kuyper et al. | |
| 5,158,922 A | 10/1992 | Hinney et al. | |
| 5,482,908 A | 1/1996 | Le-Khac | |
| 5,536,883 A | 7/1996 | Le-Khac | |
| 5,693,584 A | 12/1997 | Le-Khac | |
| 5,780,584 A | 7/1998 | Le-Khac et al. | |
| 5,783,513 A | 7/1998 | Combs et al. | |
| 6,291,388 B1 | 9/2001 | Hofmann et al. | |
| 6,486,361 B1 | 11/2002 | Ehlers et al. | |
| 6,608,231 B1 | 8/2003 | Ooms et al. | |
| 6,699,961 B2 | 3/2004 | Eleveld et al. | |
| 6,716,788 B2 | 4/2004 | Eleveld et al. | |
| 6,835,687 B2 | 12/2004 | Hofmann et al. | |
| 6,977,236 B2 | 12/2005 | Eleveld et al. | |
| 7,008,900 B1 | 3/2006 | Hofmann et al. | |
| 7,034,103 B2 | 4/2006 | Combs | |
| 7,244,805 B2 * | 7/2007 | Park ...................... C08G 64/34 |
| | | | 435/6.12 |
| 7,811,958 B2 | 10/2010 | Bohres et al. | |
| 7,968,754 B2 | 6/2011 | Ostrowski et al. | |
| 7,977,501 B2 | 7/2011 | Haider et al. | |
| 8,273,678 B2 * | 9/2012 | Wasserman ........ C08G 65/2654 |
| | | | 502/172 |
| 9,315,622 B2 | 4/2016 | Hofmann et al. | |
| 2010/0029896 A1 | 2/2010 | Ok et al. | |

(Continued)

FOREIGN PATENT DOCUMENTS

CN 105949449 9/2016
EP 0292772 11/1989

(Continued)

OTHER PUBLICATIONS

David R. Moore et al. Mechanism of the Alternating Copolymerization of Epoxides and CO2 Using β-Diiminate Zinc Catalysts: Evidence for a Bimetallic Epoxide Enchainment; J. Am. Chem. Soc. 2003, 125, 39, 11911-11924 (Year: 2003).*

International Search Report and Written Opinion corresponding to International Application No. PCT/GB2018/053084 dated Dec. 19, 2018.

International Preliminary Report on Patentability corresponding to International Application No. PCT/GB2018/053084 dated May 7, 2020.

Search Report corresponding to Application No. GB1717441.8 dated May 1, 2018.

Houben-Weyl, Methoden der organischen Chemie, vol. E20, Makromolekulare Stoffe, 4th Edition, 1987, p. 1443-1457.

Ullmann's Encyclopedia of Industrial Chemistry, vol. A21, 5th Edition, 1992, p. 207-215.

(Continued)

*Primary Examiner* — Terressa Boykin
(74) *Attorney, Agent, or Firm* — Myers Bigel, P.A.

(57) ABSTRACT

A method for quenching a polymerisation process is described. The reaction of carbon dioxide with an epoxide in the presence of a bimetallic metal complex catalyst to produce a polymer comprises the quenching step of deactivation of the catalyst by contacting the catalyst with an acid effective to deactivate the catalyst. The deactivated catalyst may be removed from the polymer product by contacting the catalyst and polymer product with a solid phase and/or by precipitation; and the catalyst may also be optionally reactivated by contacting the deactivated catalyst with an anion. The acid may contain an anion effective to initiate the polymerisation process and effective to deactivate the catalyst and the molar ratio of acid to catalyst in the deactivation step may be less than or equal to 20:1 of the acid to catalyst mole ratio for the reaction.

31 Claims, No Drawings

(56) References Cited

U.S. PATENT DOCUMENTS

2014/0228538 A1* 8/2014 Allen .................... C07F 15/065
                                                        528/405
2014/0249279 A1   9/2014 Williams et al.
2015/0361215 A1  12/2015 Allen et al.

FOREIGN PATENT DOCUMENTS

| EP | 1529566 | 5/2005 |
| EP | 1568414 | 8/2005 |
| EP | 2342257 | 11/2015 |
| JP | 2011529487 A | 12/2011 |
| JP | 2012503078 A | 2/2012 |
| WO | 2010/033703 | 3/2010 |
| WO | 2010033703 A1 | 3/2010 |
| WO | 2013/012895 | 1/2013 |
| WO | 2013/034750 | 3/2013 |
| WO | 2015/022290 | 2/2015 |
| WO | 2017037441 A9 | 2/2018 |

OTHER PUBLICATIONS

Encyclopedia of Polymer Science and Engineering, vol. 11, 2nd Edition, 1988, p. 648-718.

* cited by examiner

METHOD FOR QUENCHING A POLYMERISATION PROCESS

CROSS REFERENCE TO RELATED APPLICATIONS

This application is a § 371 national phase application of PCT Application No. PCT/GB2018/053084, filed on Oct. 24, 2018, which claims priority to British Application No. 1717441.8 filed on Oct. 24, 2017, the entire contents of each of which is incorporated by reference herein.

FIELD OF INVENTION

The present invention relates to methods for quenching a polymerisation process comprising the reaction of carbon dioxide with an epoxide, and for purifying a polymer product obtained therefrom.

BACKGROUND

Environmental and economic concerns associated with depleting oil resources have triggered a growing interest in the chemical conversion of carbon dioxide ($CO_2$), so as to enable its use as a renewable carbon source. $CO_2$ is, despite its low reactivity, a highly attractive carbon feedstock, as it is inexpensive, virtually non-toxic, abundantly available in high purity and non-hazardous. Therefore, $CO_2$ could be a promising substitute for substances such as carbon monoxide, phosgene or other petrochemical feedstocks in many processes. One of the developing applications of $CO_2$ is copolymerization with epoxides to yield aliphatic polycarbonates.

Common methods of producing aliphatic polycarbonates comprise the copolymerization of an epoxide with $CO_2$ in the presence of a metal complex catalyst. Typically, therefore, the polymerisation processes typically result in a crude product containing the catalyst, which can degrade the polymer product over time. The crude product may also have discolouration. It is therefore desirable to deactivate and/or remove the catalyst to prevent undesirable degradation of the polymer product. Furthermore, many applications of aliphatic polycarbonates require a colourless, metal-free polymer.

It is known that strong acids such as sulphonic acid or phosphoric acid can be used to quench (or deactivate) a monometallic metal complex catalyst in a polymerisation reaction comprising the reaction of carbon dioxide with an epoxide. EP 2342257 and WO 2010/033703 each disclose monometallic transition metal complexes that can be quenched (or deactivated) with an acid containing an anion that is not a polymerisation initiator. Sulphonic acids and phosphoric acids are described and are used in a molar ratio of acid to catalyst of 1:1. EP 2342257 also discloses deactivation of the catalyst using acetic acid, however, 800 molar equivalents of acetic acid to catalyst was required to quench (or deactivate) the catalyst. EP 2342257 and WO 2010/033703 do not disclose the quenching (or deactivation) of bimetallic catalysts.

The inventors have now surprisingly found that a polymerisation process comprising the reaction of carbon dioxide with an epoxide in the presence of bimetallic metal complex catalysts can be quenched with an acid containing an anion that is effective to act as an initiator for the polymerisation reaction and which is also effective to deactivate the catalyst. The inventors have also now surprisingly found that that a polymerisation process comprising the reaction of carbon dioxide with an epoxide in the presence of a metal complex catalysts can be quenched with an acid containing an anion that is effective to act as an initiator for the polymerisation process and which is effective to deactivate the catalyst in a molar ratio of acid to catalyst of less than or equal to 20:1. The present inventors have also surprisingly found that the deactivated catalysts can be removed from the polymer product and may, optionally, be reactivated.

SUMMARY OF INVENTION

According to a first aspect of the present invention there is provided a method for quenching a polymerisation process comprising the reaction of carbon dioxide with an epoxide in the presence of a bimetallic metal complex catalyst, the method comprising the step of deactivation of the catalyst by contacting the catalyst with an acid effective to deactivate the catalyst.

According to a second aspect of the present invention there is provided a method for quenching a polymerisation process comprising the reaction of carbon dioxide with an epoxide in the presence of a bimetallic metal complex catalyst, the method comprising the step of deactivation of the catalyst by contacting the catalyst with an acid effective to deactivate the catalyst and which acid contains an anion effective to initiate the polymerisation process.

According to a third aspect of the present invention there is provided a method for quenching a polymerisation process comprising the reaction of carbon dioxide with an epoxide in the presence of a bimetallic metal complex catalyst, the method comprising the step of deactivation of the catalyst by contacting the catalyst with a carboxylic acid effective to deactivate the catalyst.

Preferably, the molar ratio of acid to catalyst in the deactivation step of the first, second and/or third aspects of the present invention is less than or equal to 20:1 of the acid to catalyst mole ratio for the deactivation reaction.

According to a fourth aspect of the present invention there is provided a method for quenching a polymerisation process comprising the reaction of carbon dioxide with an epoxide in the presence of a metal complex catalyst, the method comprising the step of deactivation of the catalyst by contacting the catalyst with an acid effective to deactivate the catalyst and which acid contains an anion effective to initiate the polymerisation process, wherein the molar ratio of acid to catalyst in the deactivation step is less than or equal to 20:1 of the acid to catalyst mole ratio for the deactivation reaction.

According to a fifth aspect of the present invention there is provided a method for quenching a polymerisation process comprising the reaction of carbon dioxide with an epoxide in the presence of a metal complex catalyst, the method comprising the step of deactivation of the catalyst by contacting the catalyst with a carboxylic acid effective to deactivate the catalyst, wherein the molar ratio of acid to catalyst in the deactivation step is less than or equal to 20:1 of the acid to catalyst mole ratio for the deactivation reaction.

Preferably, the acid of the first, second, third, fourth and/or fifth aspects of the present invention has a pKa of at least 2.5, more preferably at least 3, most preferably at least 4.

According to a sixth aspect of the present invention there is provided a method for purifying a polymer product formed from a polymerisation process comprising the reaction of carbon dioxide with an epoxide in the presence of a bimetallic metal complex catalyst, the method comprising the steps of:
(i) quenching the polymerisation process by contacting the catalyst with an add effective to deactivate the catalyst;
(ii) removing the deactivated catalyst from the polymer product by contacting said deactivated catalyst and polymer product with a solid phase and/or by precipitation; and
(iii) optionally reactivating the catalyst by contacting the deactivated catalyst with an anion.

According to a seventh aspect of the present invention there is provided a method for purifying a polymer product formed from a polymerisation process comprising the reaction of carbon dioxide with an epoxide in the presence of a bimetallic metal complex catalyst, the method comprising the steps of:
(i) quenching the polymerisation process by contacting the catalyst with an acid effective to deactivate the catalyst and which acid contains an anion effective to initiate the polymerisation process;
(ii) removing the deactivated catalyst from the polymer product by contacting said deactivated catalyst and polymer product with a solid phase and/or by precipitation; and
(iii) optionally reactivating the catalyst by contacting the deactivated catalyst with an anion.

According to an eighth aspect of the present invention there is provided a method for purifying a polymer product formed from a polymerisation process comprising the reaction of carbon dioxide with an epoxide in the presence of a bimetallic metal complex catalyst, the method comprising the steps of:
(i) quenching the polymerisation process by contacting the catalyst with a carboxylic acid effective to deactivate the catalyst
(ii) removing the deactivated catalyst from the polymer product by contacting said deactivated catalyst and polymer product with a solid phase and/or by precipitation; and
(iii) optionally reactivating the catalyst by contacting the deactivated catalyst with an anion.

Preferably, the molar ratio of acid to catalyst in step (i) of the sixth, seventh and/or eighth aspect(s) of the present invention is less than or equal to 20:1 of the acid to catalyst mole ratio for the deactivation reaction.

According to a ninth aspect of the present invention there is provided a method for purifying a polymer product formed from a polymerisation process comprising the reaction of carbon dioxide with an epoxide in the presence of a metal complex catalyst, the method comprising the steps of:
(i) quenching the polymerisation process by contacting the catalyst with an acid containing an anion effective to initiate the polymerisation process and effective to deactivate the catalyst, wherein the molar ratio of acid to catalyst in the deactivation step is less than or equal to 20:1 of the acid to catalyst mole ratio for the deactivation reaction;
(ii) removing the deactivated catalyst from the polymer product by contacting said deactivated catalyst and polymer product with a solid phase and/or by precipitation; and
(iii) optionally reactivating the catalyst by contacting the deactivated catalyst with an anion.

According to a tenth aspect of the present invention there is provided a method for purifying a polymer product formed from a polymerisation process comprising the reaction of carbon dioxide with an epoxide in the presence of a metal complex catalyst, the method comprising the steps of:
(i) quenching the polymerisation process by contacting the catalyst with a carboxylic acid effective to deactivate the catalyst, wherein the molar ratio of acid to catalyst in the deactivation step is less than or equal to 20:1 of the acid to catalyst mole ratio for the deactivation reaction;
(ii) removing the deactivated catalyst from the polymer product by contacting said deactivated catalyst and polymer product with a solid phase and/or by precipitation; and
(iii) optionally reactivating the catalyst by contacting the deactivated catalyst with an anion.

Preferably, the acid in step (i) of the sixth, seventh, eighth, ninth and/or tenth aspects of the present invention has a pKa of at least 2.5, more preferably at least 3, most preferably at least 4.

DETAILED DESCRIPTION

Catalyst

The polymerisation process according to the first, second, third, sixth, seventh and/or eighth aspect of the present invention is carried out in the presence of a bimetallic metal complex catalyst. Preferably, the bimetallic metal complex catalyst is of formula (I) or formula (II):

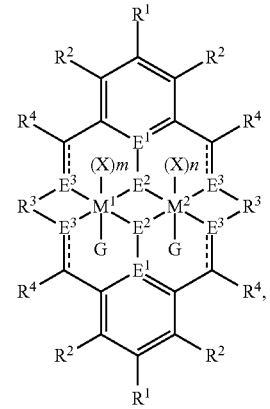

formula (I)

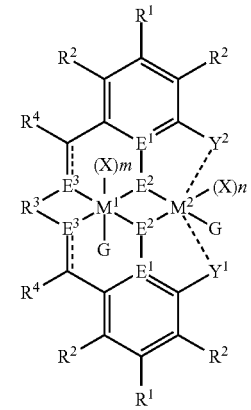

formula (II)

wherein $R^1$ and $R^2$ are independently selected from hydrogen, halide, a nitro group, a nitrile group, an imine group, $-NCR^{13}R^{14}$, an amine, an ether $-OR^{19}$, $-R^{16}OR^{17}$, an ester group —OC(O)R$^{10}$ or —C(O)OR$^{10}$, an amido group —NR$^9$C(O)R$^9$ or —C(O)—NR$^9$(R$^9$), —COOH, —C(O)R$^{15}$, —OP(O)(OR$^{18}$)(OR$^{19}$), —P(O)R$^{20}$R$^{21}$, —P(O)(OR)(OR), —OP(O)R(OR), a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

R$^3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

R$^4$ is independently selected from H, or optionally substituted aliphatic, heteroaliphatic, alicyclic, heteroalicyclic, aryl, heteroaryl, alkylheteroaryl or alkylaryl;

R$^9$, R$^{10}$, R$^{13}$, R$^{14}$, R$^{18}$, R$^{19}$, R$^{20}$ and R$^{21}$ are independently selected from hydrogen or an aliphatic, heteroaliphatic, alicyclic, heteroalicyclic, aryl or heteroaryl group;

E$^1$ is C, E$^2$ is O, S or NH or E$^1$ is N and E$^2$ is O;

----- —— ----- ═══

R$^5$ is independently selected from H, or optionally substituted aliphatic, heteroaliphatic, alicyclic, heteroalicyclic, aryl, heteroaryl, alkylheteroaryl, -alkylC(O)OR$^{10}$, -alkylnitrile, or alkylaryl;

X, when present, is independently selected from OC(O)R$^x$, OSO$_2$R$^x$, OSOR$^x$, OSO(R$^x$)$_2$, S(O)R$^x$, OR$^x$, phosphinate, halide, nitrate, hydroxyl, carbonate, amino, nitro, amido or optionally substituted aliphatic, heteroaliphatic, alicyclic, heteroalicyclic, aryl or heteroaryl;

m and n are independently integers selected from the range 0-3, such that the sum of m and n is 0-5;

R$^x$ is independently selected from hydrogen or an aliphatic, heteroaliphatic, alicyclic, heteroalicyclic, aryl or heteroaryl group;

each G is independently absent or a neutral or anionic donor ligand which is a Lewis base;

Y$^1$ and Y$^2$, when present, are independently a neutral or anionic donor group capable of donating a lone pair to the metal M$^2$; and M$^1$ and M$^2$ are independently selected from Zn(II), Cr(II), Co(II), Cu(II), Mn(II), Mg(II), Ni(II), Fe(II), Ti(II), V(II), Cr(III), Co(III), Mn(III), Ni(III), Fe(III), Ca(II), Ge(II), Al(III), Ti(III), V(III), Ge(IV), Y(III), Sc(III) or Ti(IV).

For the avoidance of doubt, where groups are found in both formula (I) and formula (II), the definitions below independently apply to both formula (I) and formula (II).

Each of the occurrences of the groups R$^1$ and R$^2$ may be the same or different. Preferably, R$^1$ and R$^2$ are independently selected from hydrogen, halide, amino, nitro, sulfoxide, sulfonyl, sulfinate, silyl, silyl ether and an optionally substituted alkyl, alkenyl, aryl, heteroaryl, heteroalicyclic, alkoxy, aryloxy or alkylthio. Preferably, each occurrence of R$^2$ is the same, and is hydrogen.

Even more preferably, R$^2$ is hydrogen and R$^1$ is independently selected from hydrogen, halide, amino, nitro, sulfoxide, sulfonyl, sulfinate, silyl, silyl ether and an optionally substituted alkyl, alkenyl, aryl, heteroaryl, heteroalicyclic, alkoxy, aryloxy, alkylthio, arylthio, such as hydrogen, $C_{1-6}$alkyl (e.g. haloalkyl), alkoxy, aryl, halide, nitro, sulfonyl, silyl and alkylthio, for example, t-butyl, n-butyl, i-propyl, methyl, piperidinyl, methoxy, hexyl methyl ether, —SCH$_3$, —S(C$_6$H$_5$), H, nitro, trimethylsilyl, methylsulfonyl (—SO$_2$CH$_3$), triethylsilyl, halogen or phenyl.

Each occurrence of R$^1$ can be the same or different, and R$^1$ and R$^2$ can be the same or different. Preferably, each occurrence of R$^1$ is the same. Preferably, each occurrence of R$^2$ is the same. When R$^1$ and R$^2$ are the same, preferably each occurrence of R$^1$ and R$^2$ is methyl. Preferably, each occurrence of R$^1$ is the same, and each occurrence of R$^2$ is the same, and R$^1$ is different to R$^2$.

Preferably, both occurrences of R$^1$ are the same, and are selected from hydrogen, halide, amino, nitro, sulfoxide, sulfonyl, sulfinate, silyl, silyl ether and an optionally substituted alkyl, alkenyl, aryl, heteroaryl, heteroalicyclic, alkoxy, aryloxy, or alkylthio. More preferably, both occurrences of R$^1$ are the same, and are selected from halide, sulfoxide, silyl, and an optionally substituted alkyl, heteroaryl or alkoxy. Still more preferably, both occurrences of R$^1$ are the same, and are selected from H, alkyl, aryl, alkoxy, trialkylsilyl such as triethylsilyl, or halide. More preferably still, both occurrences of R$^1$ are the same, and are selected from H, alkyl, phenyl, halide or trialkylsilyl. Most preferably, both occurrences of R$^1$ are the same, and are selected from H, methyl, ethyl, n-propyl, i-propyl n-butyl, t-butyl, t-amyl or t-octyl.

It will be appreciated that the group R$^3$ can be the divalent alkylene, alkenylene, alkynylene, heteroalkylene, heteroalkenylene or heteroalkynylene group which may optionally be interrupted by an aryl, heteroaryl, alicyclic or heteroalicyclic group, or may be a divalent arylene or cycloalkylene group which acts as a bridging group between two nitrogen centres in the compound of formulae (I) and (II). Thus, where R$^3$ is an alkylene group, such as 2,2-dimethylpropane-1,3-diyl, the R$^3$ group has the structure —CH$_2$—C(CH$_3$)$_2$—CH$_2$—. The definitions of the alkyl, aryl, cycloalkyl etc groups set out herein therefore also relate respectively to the divalent alkylene, arylene, cycloalkylene etc groups set out for R$^3$, and may also be optionally substituted. Exemplary options for R$^3$ include ethane-1,2-diyl, 2,2-fluoropropane-1,3-diyl, 2,2-dimethylpropane-1,3-diyl, propane-1,3-diyl, butane-1,4-diyl, phenylene, cyclohexane-1,2-diyl, cyclohexane-1,4-diyl or biphenylene. When R$^3$ is cyclohexane-1,2-diyl or cyclohexane-1,4-diyl, it can be the racemic, RR- or SS-forms.

R$^3$ can be independently selected from substituted or unsubstituted alkylene, alkenylene, alkynylene, heteroalkylene, heteroalkenylene or heteroalkynylene, arylene or cycloalkylene. Preferably, R$^3$ is selected from substituted or unsubstituted alkylene, cycloalkylene, alkenylene, heteroalkylene and arylene. More preferably, R$^3$ is selected from —CH$_2$C(CH$_3$)$_2$CH$_2$—, —CH$_2$CH$_2$CH$_2$—, —CH$_2$CH(CH$_3$)CH$_2$—, —CH$_2$C(CH$_2$C$_6$H$_5$)$_2$CH$_2$—, —(C$_6$H$_4$)—, —CH$_2$CH$_2$—, —CH$_2$—CH$_2$CH$_2$CH$_2$—, —CH$_2$CH$_2$N(CH$_3$)CH$_2$CH$_2$—, —(C$_6$H$_{10}$)— or —CH$_2$CH$_2$CH(C$_2$H$_5$)—. Still more preferably R$^3$ is selected from —CH$_2$C(CH$_3$)$_2$CH$_2$—, —CH$_2$CH$_2$—, —CH$_2$CH$_2$CH$_2$—, —CH$_2$CH(CH$_3$)CH$_2$—, —CH$_2$C(CH$_2$C$_6$H$_5$)$_2$CH$_2$—, —CH$_2$CH$_2$CH(C$_2$H$_5$)—, —CH$_2$CH$_2$CH$_2$CH$_2$—. More preferably still, R$^3$ is selected from —CH$_2$C(CH$_3$)$_2$CH$_2$—, CH$_2$CH$_2$CH$_2$—, —CH$_2$CH(CH$_3$)CH$_2$— and —CH$_2$C(C$_2$H$_5$)CH$_2$—.

R$^3$ can be independently selected from substituted or unsubstituted alkylenes and substituted or unsubstituted arylenes, preferably substituted or unsubstituted propylenes, such as propane-1,3-diyl and 2,2-dimethylpropane-1,3-diyl, and substituted or unsubstituted phenylene or biphenylene. Preferably both occurrences of R$^3$ are the same. Even more preferably $R^3$ is a substituted propane-1,3-diyl, such as 2,2-di(alkyl)propane-1,3-diyl, especially 2,2-dimethylpropane-1,3-diyl.

Preferably, each $R^4$ is independently selected from hydrogen, and optionally substituted aliphatic or aryl. More preferably, each $R^4$ is independently selected from hydrogen or optionally substituted alkyl or aryl. Even more preferably, each $R^4$ is the same, and is selected from hydrogen or optionally substituted alkyl or aryl. Exemplary $R^4$ groups include hydrogen, methyl, ethyl, n-propyl, n-butyl, phenyl and trifluoromethyl, preferably hydrogen, methyl or trifluoromethyl. Even more preferably, each $R^4$ is hydrogen.

In preferred combinations of the $R^4$ group and $R^1$ group, $R^1$ is selected from H, methyl, ethyl, n-propyl, n-butyl, t-butyl, t-octyl, Cl, Br, F, nitro, trimethylsilyl, triethylsilyl, methylthio and methoxy and $R^4$ is selected from H, methyl, ethyl, n-propyl, phenyl and trifluoromethyl.

Each occurrence of $E^1$ may be the same or different. Preferably, each occurrence of $E^1$ is the same. Each occurrence of $E^2$ may be the same or different. Preferably, each occurrence of $E^2$ is the same. Preferably, $E^1$ is C and $E^2$ is O, S or NH more preferably $E^1$ is C and $E^2$ is O.

Each occurrence of $E^3$ may be the same or different. Preferably, each occurrence of $E^3$ is the same. Preferably $R^5$, when present, is independently selected from hydrogen or optionally substituted alkyl, alkenyl, alkynyl, aryl, heteroaryl, heteroalkenyl, heteroalkynyl, heteroaryl, -alkylC(O)$R^{10}$ or -alkylnitrile. Each $R^5$, when present, may be the same or different. Preferably, $R^5$, when present, is selected from hydrogen or optionally substituted alkyl, alkenyl, alkynyl, aryl, heteroalkyl, heteroalkenyl, heteroalkynyl or heteroaryl. More preferably, each $R^5$, when present, is the same and is selected from hydrogen or optionally substituted alkyl, alkenyl, alkynyl, aryl, heteroalkyl, heteroalkenyl, heteroalkynyl or heteroaryl. Exemplary $R^5$ groups include H, Me, Et, Bn, iPr, tBu or Ph. Even more preferably, each $R^5$, when present, is hydrogen or alkyl. Most preferably, each $R^5$, when present, is hydrogen.

$Y^1$ and $Y^2$ of formula (II) are groups that are capable of donating a lone pair of electrons to the metal $M^2$. The atom of the $Y^1$ and $Y^2$ groups which donate the lone pair of elections typically forms a bond between $Y^1$ and $Y^2$, respectively, and the metal, $M^2$. $Y^1$ and $Y^2$ may be the same or different. Preferably, $Y^1$ and $Y^2$ are the same. The atom of the $Y^1$ and/or $Y^2$ group that donates the lone pair is typically a hetero atom selected from oxygen, nitrogen or sulphur or a carbene carbon.

Accordingly, $Y^1$ and $Y^2$ may be hetero or a group containing a heteroatom capable of donating a lone pair. Typically the lone pair is provided by a nitrogen, sulphur or oxygen atom, more typically by a nitrogen or oxygen atom, most typically by a nitrogen atom.

$Y^1$ and $Y^2$ may independently comprise from 1 to 20 atoms, preferably from 1 to 15 atoms, more preferably from 1 to 10 atoms.

Preferably, $Y^1$ and $Y^2$ may be independently selected from O, S, —NC(O)$R^{10}$, —C(O)N$^-R^{10}$, —C(O)O—, —C(O)OR$^{10}$, —C(O)R$^{10}$, —C(R$^{10}$)$_2$C(O)N$^-$(R$^{10}$), optionally substituted heteroaliphatic such as —OR$^{10}$, —SR$^{10}$, —NR$^{10}$, —N(R$^{10}$)$_2$, —C(R$^{10}$)N(R$^{10}$)$_2$, —C(R$^{10}$)=N(R$^{10}$), or optionally substituted heteroalicyclic or heteroaryl or an optionally substituted carbene structure, wherein $R^{10}$ is independently selected from hydrogen or an aliphatic, heteroaliphatic, alicyclic, heteroalicyclic, aryl or heteroaryl group. More preferably, $Y^1$ and $Y^2$ may be independently selected from O$^-$, S$^-$, —OR$^{10}$, —SR$^{10}$, —N(R$^{10}$), —N(R$^{10}$)$_2$, —C(R$^{10}$)N(R$^{10}$)$_2$, —C(R$^{10}$)=N(R$^{10}$), —NC(O)R$^{10}$, —C(O)O, —C(O)OR$^{10}$, C(O)R$^{10}$ or optionally, imidazoline, 'abnormal' imidazoline (wherein the 'abnormal' imidazoline has a positive and a negative charge on the heterocycle due to the position of the double bond), imidazolidine, pyrrolidine, pyrroline, triazoline, thiazoline oxazole, oxazoline, imidazoylidene, imidazolinylidene, thiazolylidene, oxazolylidene, triazolylidene, benzimidazolylidene, pyrrolidinylidene or 'abnormal imidazolylidene or N,N'-diamidocarbene, optionally substituted pyridine, imidazole, methyl imidazole, benzimidazole, pyrrole, triazole, thiazole, benzimidazoline, benzotriazole, wherein $R^{10}$ is independently selected from hydrogen or an aliphatic, heteroaliphatic, alicyclic, heteroalicyclic, aryl or heteroaryl group.

When $Y^1$ and $Y^2$ are independently selected from optionally substituted heteroaliphatic, heteroalicyclic or heteroaryl, the optionally substituted heteroaliphatic heteroalicyclic or heteroaryl contains a hetero atom that is capable of donating the lone pair to metal $M^2$. When $Y^1$ and $Y^2$ are independently selected from an optionally substituted carbene structure which may or may not be heteroaliphatic, heteroalicyclic or heteroaryl, the optionally substituted carbene structure contains a carbon atom that is capable of donating the lone pair to metal $M^2$.

Still more preferably, $Y^1$ and $Y^2$ may be independently selected from O, —OR$^{10}$, —N(R$^{10}$)$_2$, —C(R$^{10}$)$_2$N(R$^{10}$)$_2$, —C(R$^{10}$)=N(R$^{10}$). —C(O)O$^-$, —C(O)R$^{10}$, optionally substituted imidazolylidene, benzimidazolylidene, imidazolinylidene, or pyrrole.

Most preferably, $Y^1$ and $Y^2$ are independently selected from O, —OCH$_3$—C(=O)H, —CH$_2$N(CH$_3$)$_2$, —CH$_2$N(H)(CH$_2$CH(CH$_3$)$_2$), —CH=N(CH$_2$CH(CH$_3$)$_2$), —CH$_2$-piperidine or benzotriazine.

The lone pair donating atom of the $Y^1$ and $Y^2$ groups may independently be attached directly to the remainder of the catalyst of formula (II), via a bond to the respective aryl group, or may be attached to the remainder of the catalyst of formula (II) via a linking group attached to the respective aryl group. Preferably, the linking group, when present in $Y^1$ and/or $Y^2$, is selected from optionally substituted alkylene, alkenylene, alkynylene, heteroalkylene, heteroalkenylene, heteroalkynylene, arylene, heteroarylene or cycloalkylene. More preferably, the linking group, when present in $Y^1$ and/or $Y^2$, is selected from optionally substituted alkylene, alkenylene, alkynylene or arylene, even more preferably optionally substituted alkylene of arylene. Preferably, the linking group, when present in $Y^1$ and/or $Y^2$, is optionally substituted $C_1$-$C_{10}$ alkylene, more preferably optionally substituted $C_1$-$C_6$ alkylene, even more preferably optionally substituted $C_1$-$C_4$ alkylene, most preferably methylene. For the avoidance of doubt, when the lone pair donating atom of the in $Y^1$ and/or $Y^2$ groups is a carbene carbon, the carbene carbon is not attached directly to the remainder of the catalyst of formula (II).

The heteroatom of the $Y^1$ and $Y^2$ groups may be attached to the respective aryl group of the remainder of the catalyst of formula (II) via the linking group, when present, by any suitable number of atoms, preferably 1 to 10 atoms, more preferably 1 to 6 atoms, even more preferably 1 to 4 atoms, most preferably 1 to 2 atoms. It will be appreciated that when the heteroatom of the $Y^1$ and/or $Y^2$ groups is attached directly to the respective aryl group of the remainder of the catalyst of formula (II), no linking group is present.

It will be appreciated that X acts as the initiating species for the processes of the present invention. Each X is independently selected from OC(O)$R^x$, OSO$_2$$R^x$, OSO($R^x$)$_2$, OR$^x$, halide, nitrate, hydroxyl, carbonate, amido or optionally substituted aliphatic, heteroaliphatic (for example silyl), alicyclic, heteroalicyclic, aryl or heteroaryl. $R_x$ is independently hydrogen, or optionally substituted aliphatic, haloaliphatic, heteroaliphatic, alicyclic, heteroalicyclic, aryl, alkylaryl or heteroaryl. Preferably, X is $OC(O)R^x$ or $OR^x$. Preferably, $R^x$ is independently hydrogen, optionally substituted aliphatic, haloaliphatic, aryl, heteroaryl, silyl, or alkylaryl. Exemplary options for X include $OCOCH_3$, $OCOCF_3$, $OSO_2C_7H_7$, $OSO(CH_3)_2$, Et, Me, PhOEt, OMe, OiPr, OtBu, Cl, Br, I, F, $N(iPr)_2$ or $N(SiMe_3)_2$.

When G is not absent, it is a group which is capable of donating a lone pair of electrons (i.e. a Lewis base). Each G may be neutral or negatively charged. If G is negatively charged, then one or more positive counterions will be required to balance out the change of the complex. Suitable positive counterions include group 1 metal ions ($Na^+$, $K^+$, etc), group 2 metal ions ($Mg^{2+}$, $Ca^{2+}$, etc), ammonium ions (i.e. $N(R^{26})_4^+$), iminium ions (i.e. $(R^{12})_2C=N(R^{26})_2^+$, such as bis(triphenylphosphine)iminium ions) or phosphonium ions ($P(R^{26})_4^+$), wherein each $R^{26}$ is independently selected from hydrogen or optionally substituted aliphatic, heteroaliphatic, alicyclic, heteroalicyclic, aryl or heteroaryl. Preferably, G is independently selected from an optionally substituted heteroaliphatic group, an optionally substituted heteroalicyclic group, an optionally substituted heteroaryl group, a halide, hydroxide, hydride, a carboxylate and water. More preferably, G is independently selected from water, an alcohol, a substituted or unsubstituted heteroaryl (imidazole, methyl imidazole, pyridine, 4-dimethylaminopyridine, pyrrole, pyrazole, etc), an ether dimethyl ether, diethylether, cyclic ethers, etc), a thioether, carbene, a phosphine, a phosphine oxide, a substituted or unsubstituted heteroalicyclic (morpholine, piperidine, tetrahydrofuran, tetrahydrothiophene, etc), an amine, an alkyl amine trimethylamine, triethylamine, etc), acetonitrile, an ester (ethyl acetate, etc), an acetamide (dimethylacetamide, etc), a sulfoxide (dimethylsulfoxide, etc), a carboxylate, a hydroxide, hydride, a halide, a nitrate, a sulfonate, etc. In some embodiments, one or both instances of G is independently selected from optionally substituted heteroaryl, optionally substituted heteroaliphatic, optionally substituted heteroalicyclic, halide, hydroxide, hydride, an ether, a thioether, carbene, a phosphine, a phosphine oxide, an amine, an alkyl amine, acetonitrile, an ester, an acetamide, a sulfoxide, a carboxylate, a nitrate or a sulfonate. In some embodiments, one or both instances of G is negatively charged (for example, halide). In further embodiments, one or both instances of G is an optionally substituted heteroaryl.

It will be appreciated that although in formula (II), the groups X and G are illustrated as being associated with a single $M^1$ or $M^2$ metal centre, one or more X and G groups may form a bridge between the $M^1$ and $M^2$ metal centres. For example, an X group may be associated with a single M metal centre as shown in formula (II), or a X group may be associated with both metal centres and form a bridge between the two metal centres.

$M^1$ and $M^2$ are independently selected from Zn(II), Cr(II), Co(II), Cu(II), Mn(II), Mg(II), Ni(II), Fe(II), Ti(II), V(II), Cr(III), Co(III), Mn(III), Ni(III), Fe(III), Ca(II), Ge(II), Al(III), Ti(III), V(III), Ge(IV), Y(III), Sc(III) or Ti(IV).

Preferably, for the formulae (I) and (II) herein $M^1$ and $M^2$ are independently selected from Zn(II), Cr(III), Co(II), Mn(II), Mg(II), Fe(II) or Fe(III), most preferably from Zn(II), Co(II) or Mg(II).

Preferably, at least one of $M^1$ or $M^2$ may be selected from Ni(II), Ni(III), Co(II), Co(III), Cr(II), Cr(III), Fe(II), Fe(III), Mn(III), Al(III), Zn(II) or Mg(II).

In certain embodiments, each occurrence of $M^1$ and $M^2$ may be different. Preferably, each occurrence of $M^1$ and $M^2$ is different and $M^1$ or $M^2$ is Ni(II) or Ni(III) and the other of $M^1$ or $M^2$ is Fe(II), Fe(III), Cr(III), Al(III), Mg(II), Zn(II), Co(II) or Co(III), more preferably $M^1$ or $M^2$ is Ni(II) and the other of $M^1$ or $M^2$ is Mg(II), Zn(II), Co(II), Co(III) or Cr(II). Preferably, each occurrence of $M^1$ and $M^2$ is different and $M^1$ or $M^2$ is Zn(II) and the other of $M^1$ or $M^2$ is Mg(II).

In certain embodiments, each occurrence of $M^1$ and $M^2$ is the same. Preferably, each occurrence of $M^1$ and $M^2$ may be the same and may be Ni(II), Ni(III), Fe(II), Fe(III), Mn(III), Cr(II), Cr(III), Co(II), Co(III), Zn(II) or Mg(II), more preferably each occurrence of $M^1$ and $M^2$ may be the same and may be Ni(II), Co(II), Zn(II) or Mg(II).

Preferably, the catalyst has a neutral overall charge. It will be appreciated that $M^1$ and/or $M^2$ may each have one or more optional X groups (n and m) co-ordinated to the metal centre depending on the oxidization state of the $M^1$ and $M^2$ metals and, when present, on the charge of the $Y^1$ and $Y^2$ groups used, wherein X is as defined above. For example, given that the ligand without the Y groups has a charge of 2−, if each of the metal groups, $M^1$ and $M^2$, are Ni(II) and each Y group, $Y^1$ and $Y^2$, are anionic (i.e. each have a single negative charge) then the catalyst may have an overall charge of 0. In this case, no additional X groups are co-ordinated to the metal centres. However, if one or both metal centres have a III oxidation state with a charge of 3+ then even if the Y groups are anionic further X groups on each M(III) are required. For further example, if each of the Y groups is neutral, then the overall ligand has a charge of 2−. If both metal centres are M(II) then there may be a total of 2 X groups to satisfy the overall neutral charge, if both metal centres are M(III) then there may be a total of 4 X groups to satisfy the overall neutral charge.

Suitable catalysts of formula (I) are:

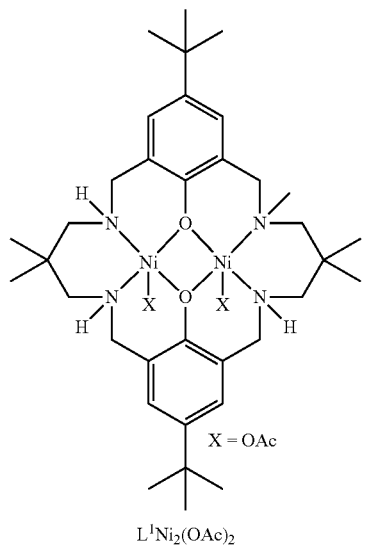

X = OAc $L^1Ni_2(OAc)_2$

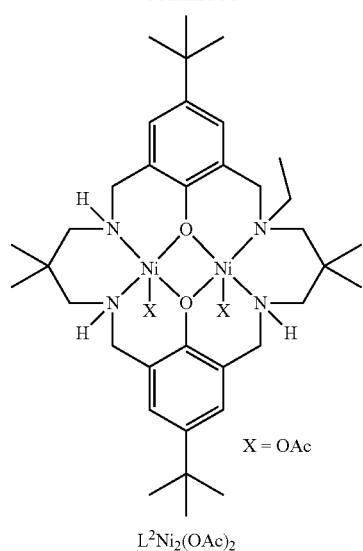
X = OAc
L²Ni₂(OAc)₂
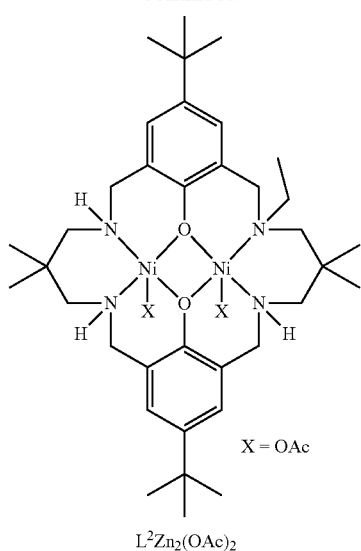
X = OAc
L²Zn₂(OAc)₂
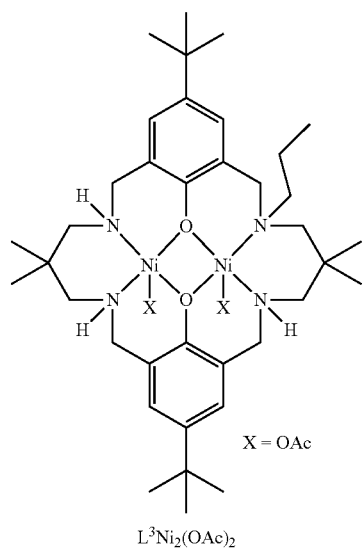
X = OAc
L³Ni₂(OAc)₂
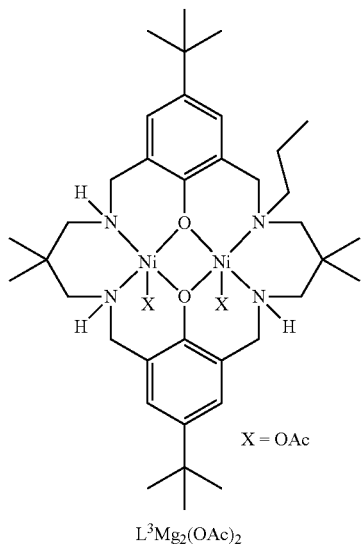
X = OAc
L³Mg₂(OAc)₂
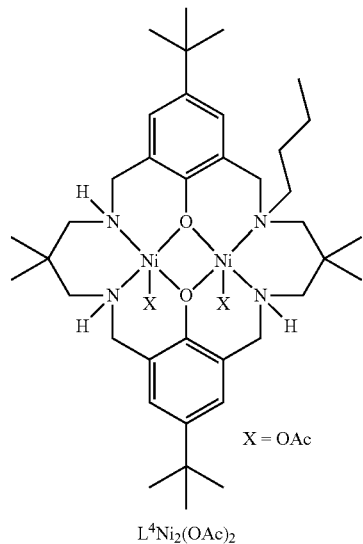
X = OAc
L⁴Ni₂(OAc)₂
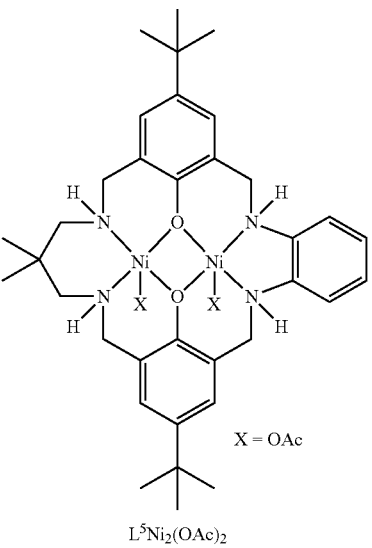
X = OAc
L⁵Ni₂(OAc)₂

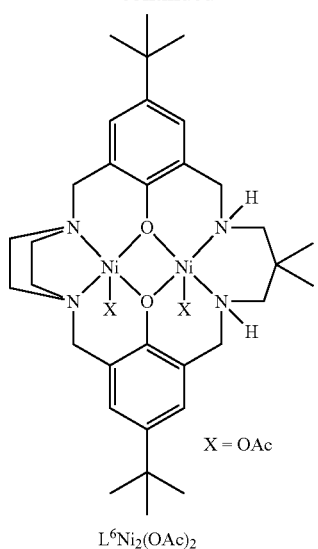
L⁶Ni₂(OAc)₂
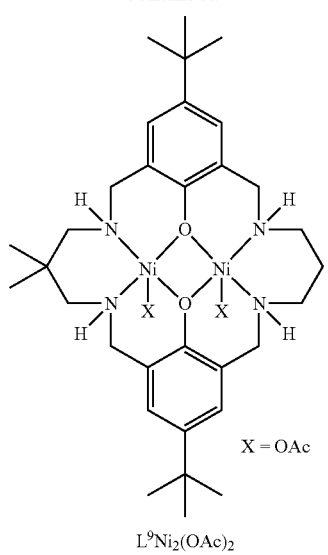
L⁹Ni₂(OAc)₂
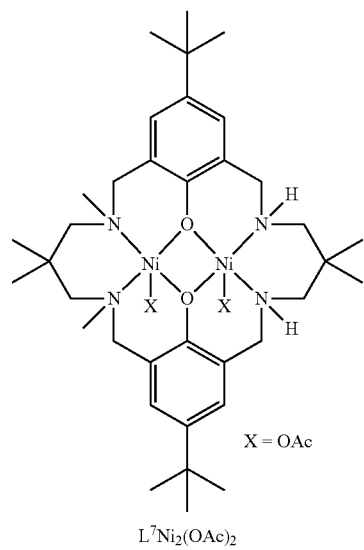
L⁷Ni₂(OAc)₂
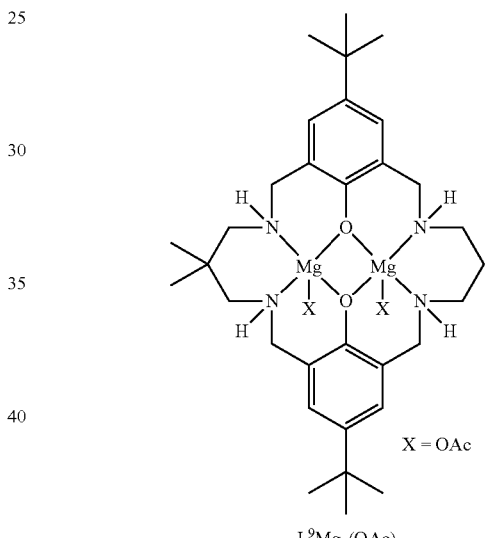
L⁹Mg₂(OAc)₂
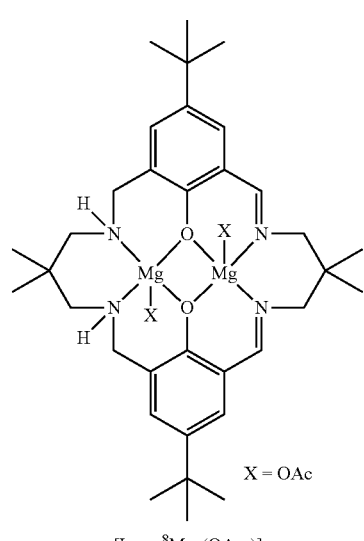
[L_imine⁸Mg₂(OAc₂)]
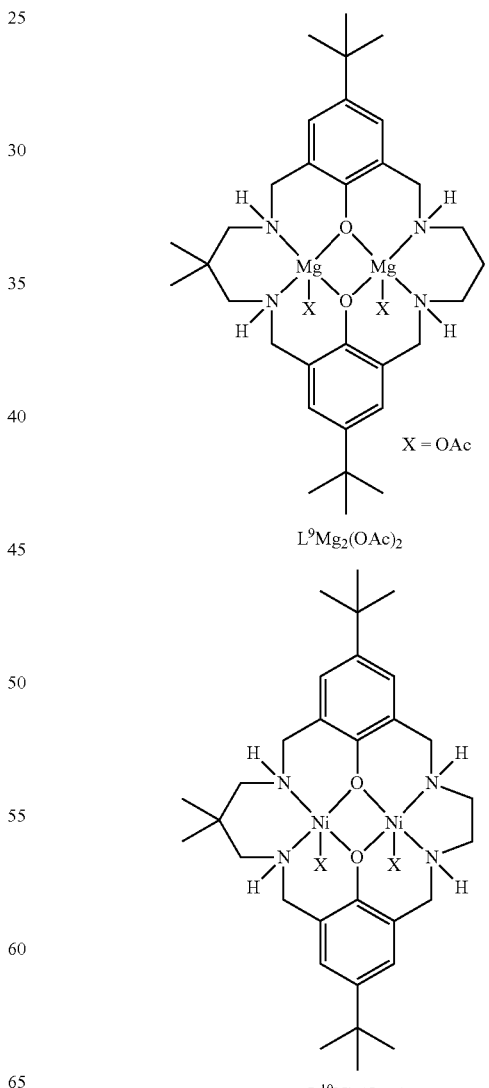
L¹⁰Ni₂(OAc)₂

-continued
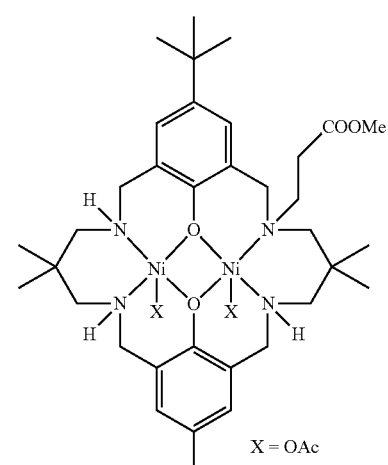
L¹²Ni₂(OAc)₂
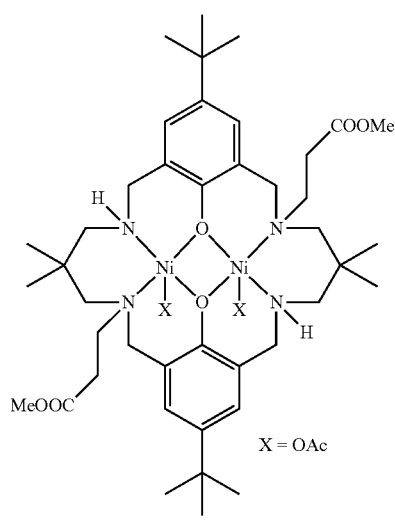
L¹³Ni₂(OAc)₂
More suitably the catalyst of formula (I) is:
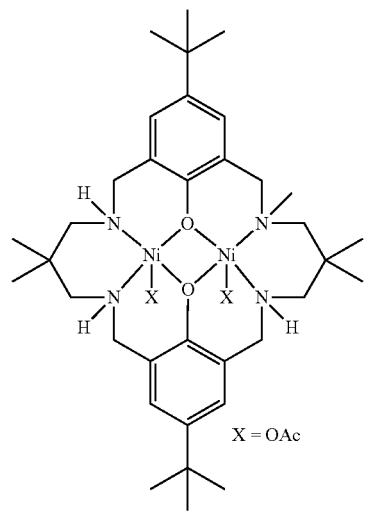
L¹Ni₂(OAc)₂
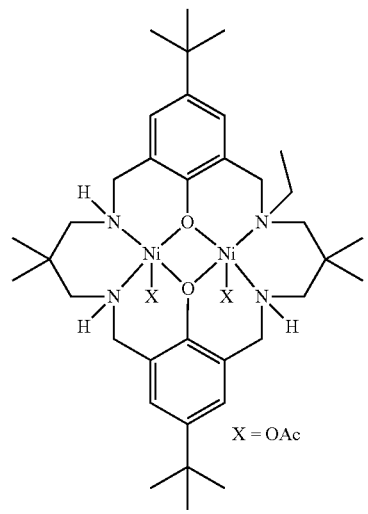
L²Ni₂(OAc)₂
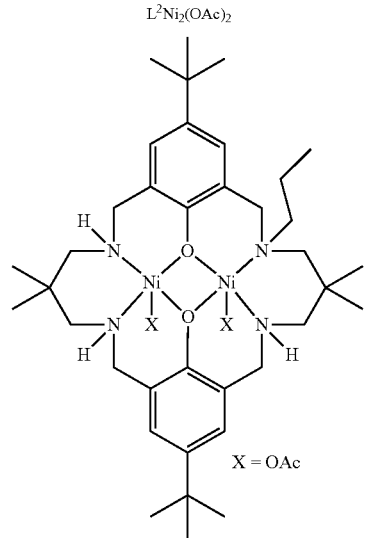
L³Ni₂(OAc)₂

-continued
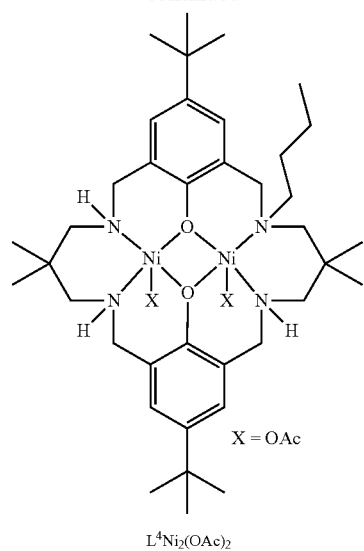
X = OAc
L⁴Ni₂(OAc)₂
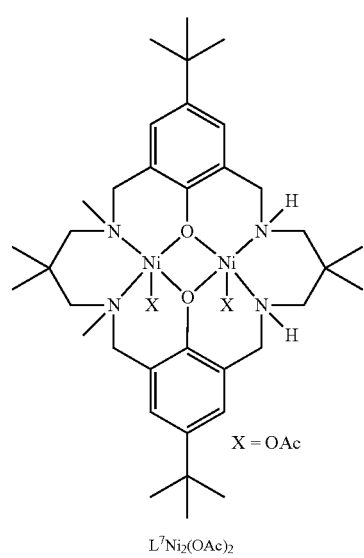
X = OAc
L⁷Ni₂(OAc)₂
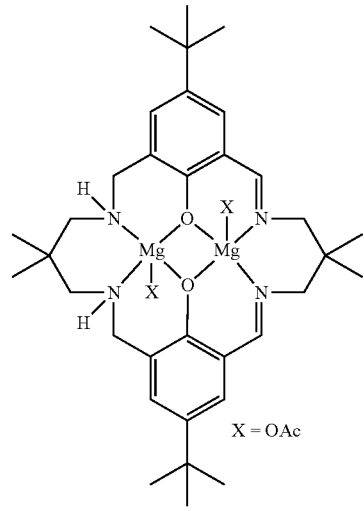
X = OAc
[L$_{imine}$⁸Mg₂(OAc₂)]
Suitable catalysts of formula (II) are:
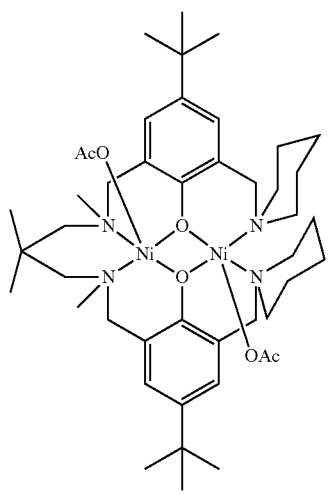
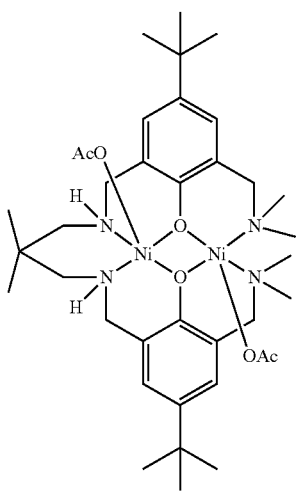
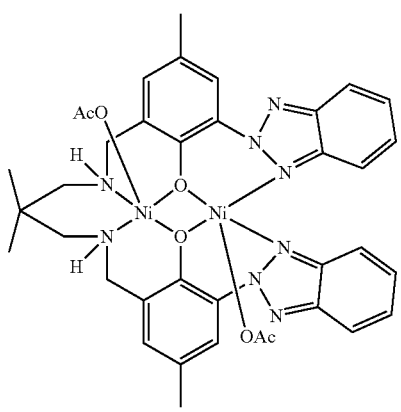

-continued
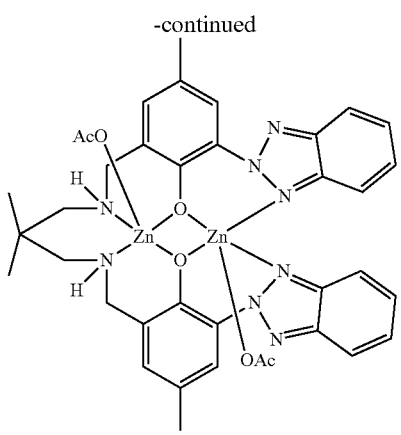
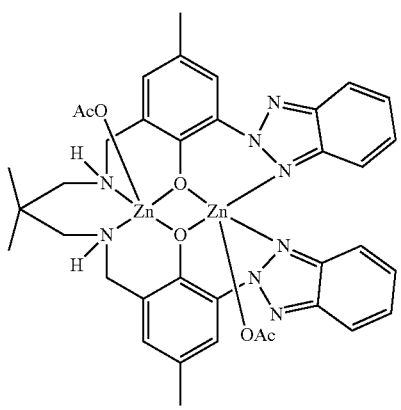
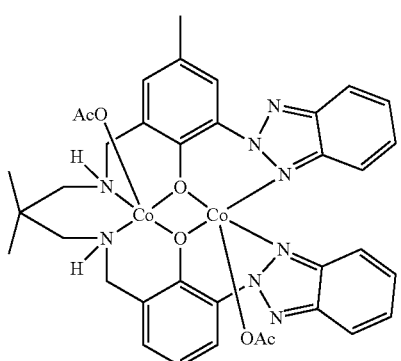
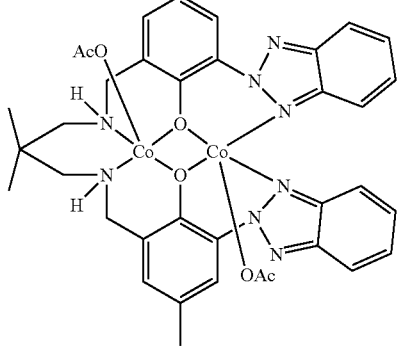
-continued
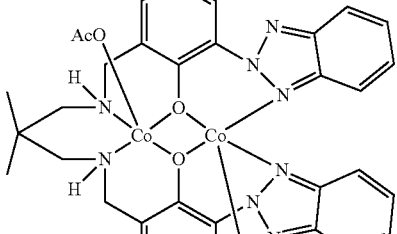
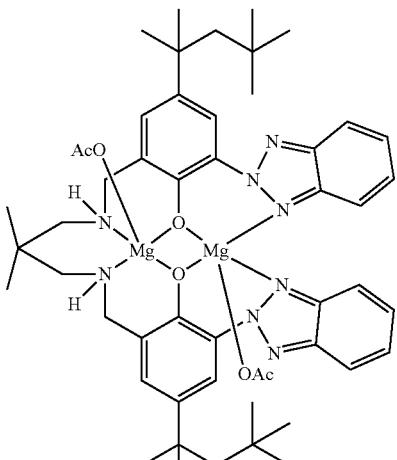
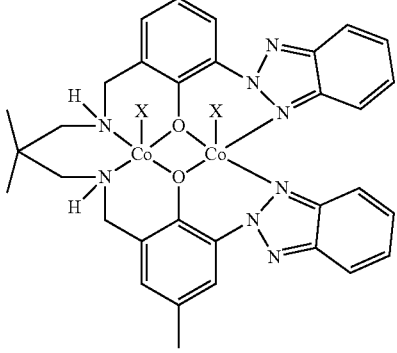
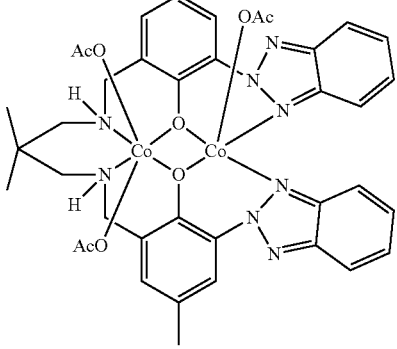

-continued
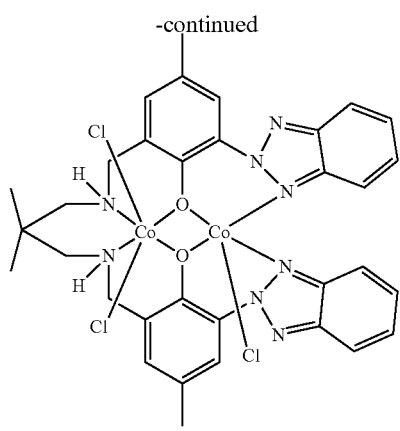
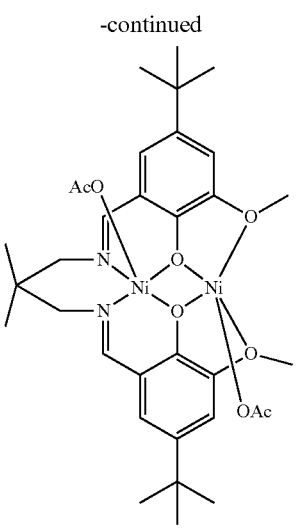
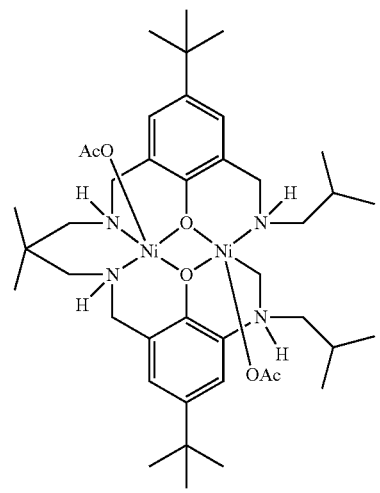
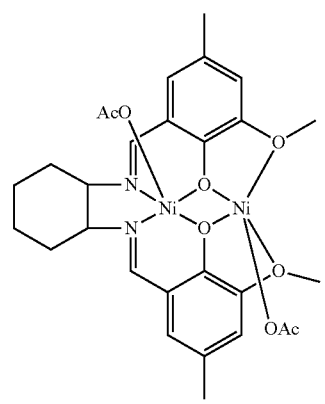
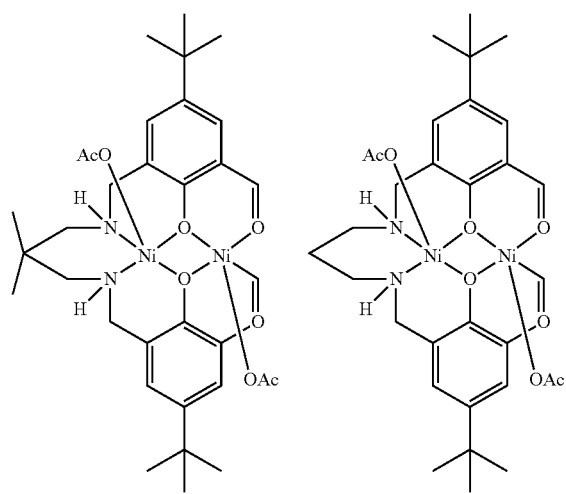
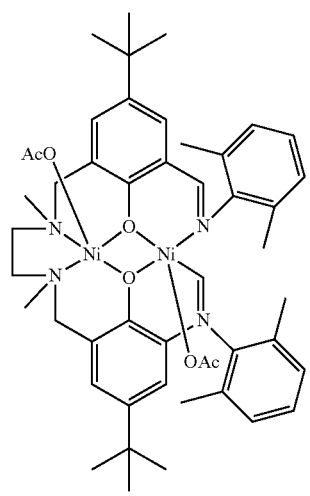

23
-continued
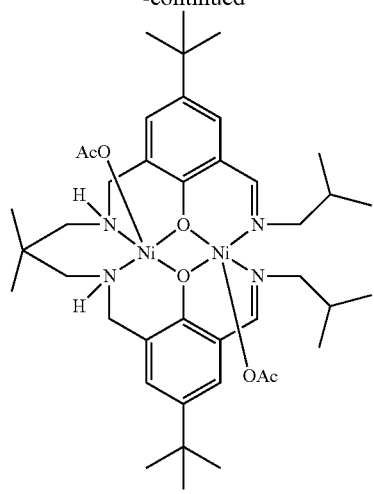
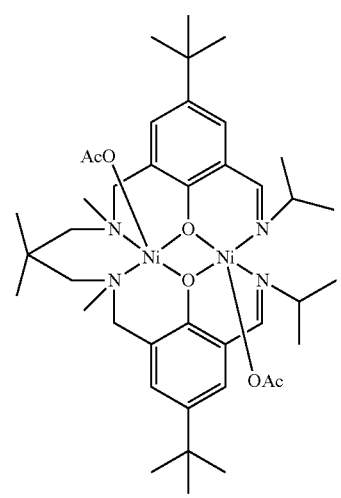
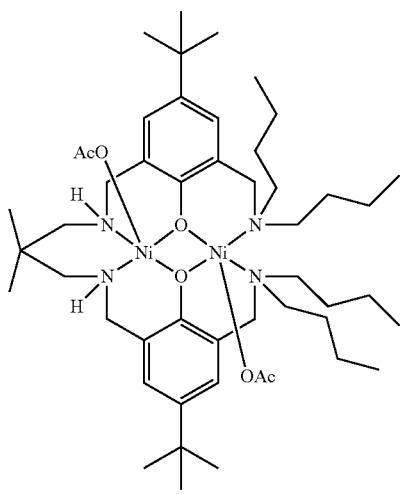
24
-continued
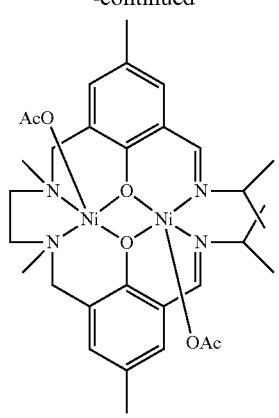
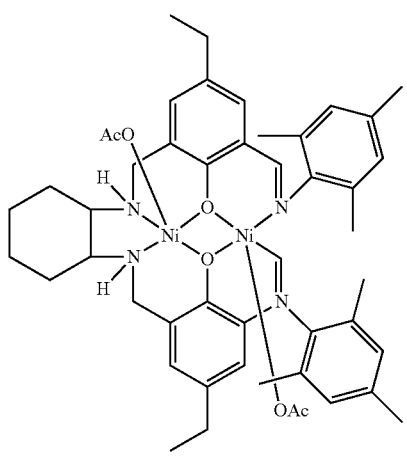
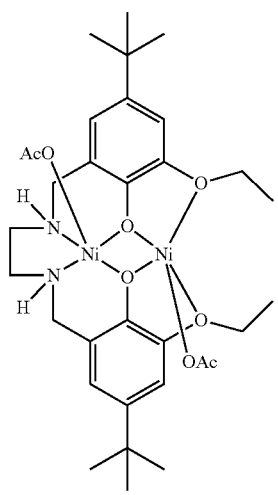

25
-continued
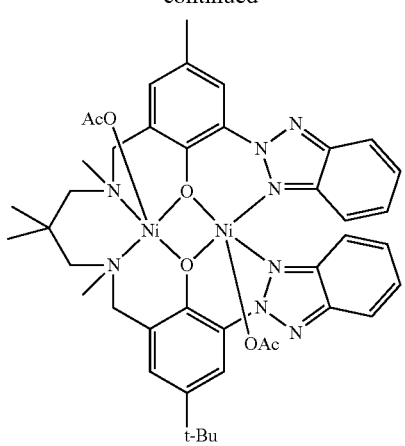
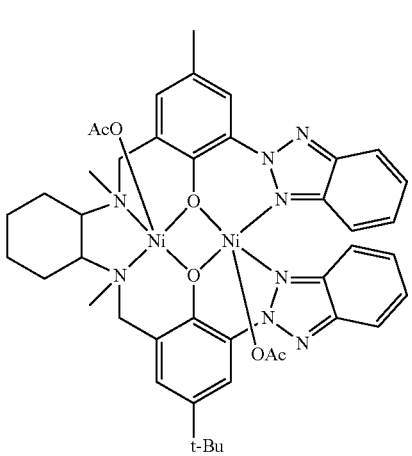
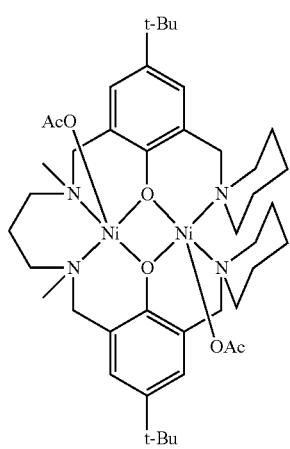
26
-continued
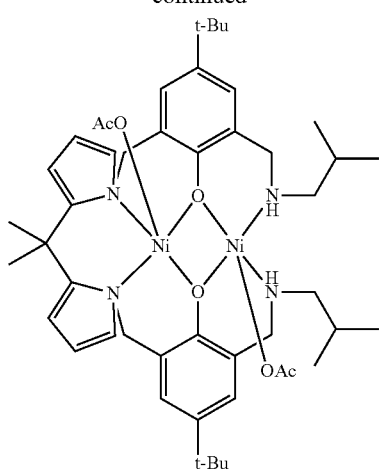
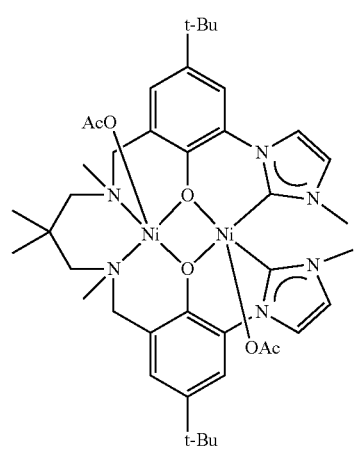
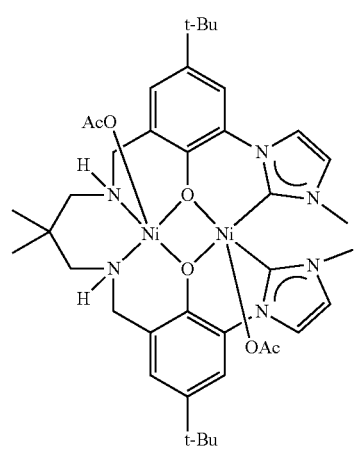

27
-continued
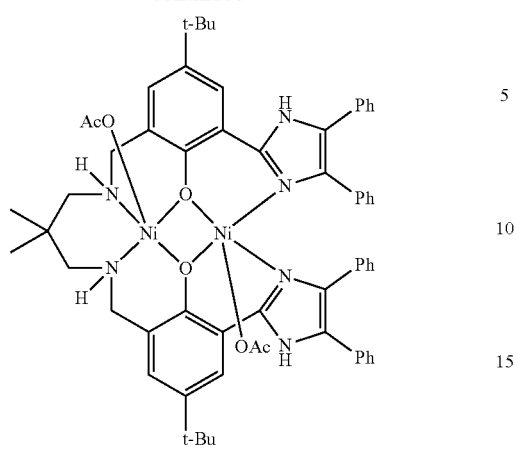
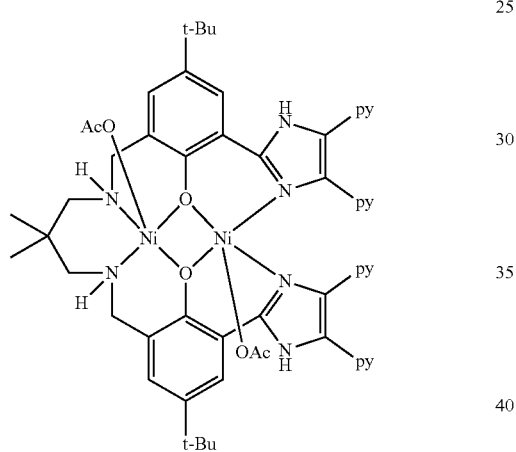
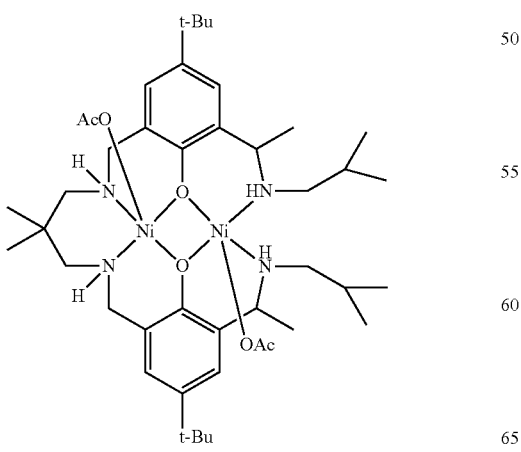
28
-continued
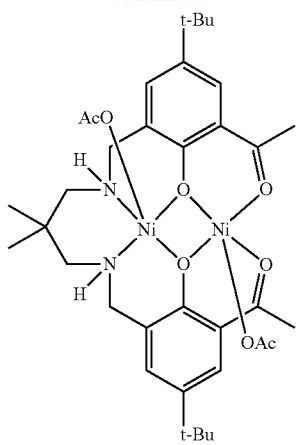
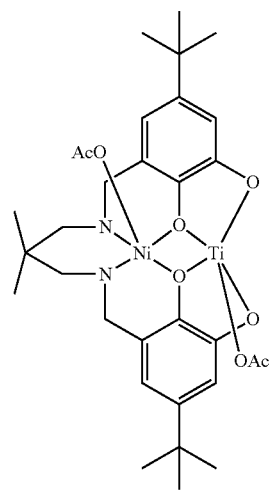
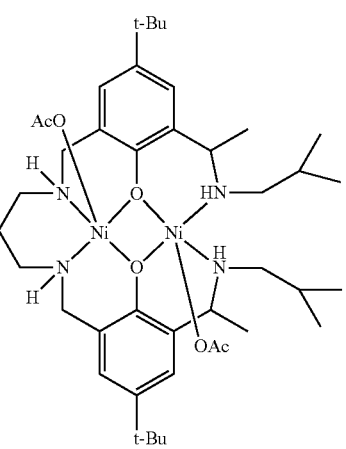

-continued
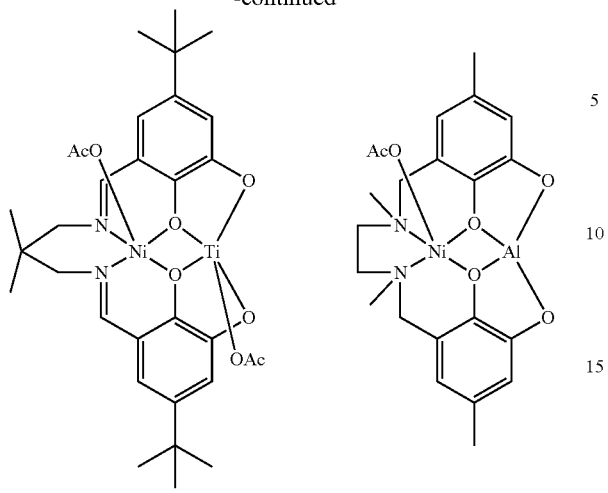
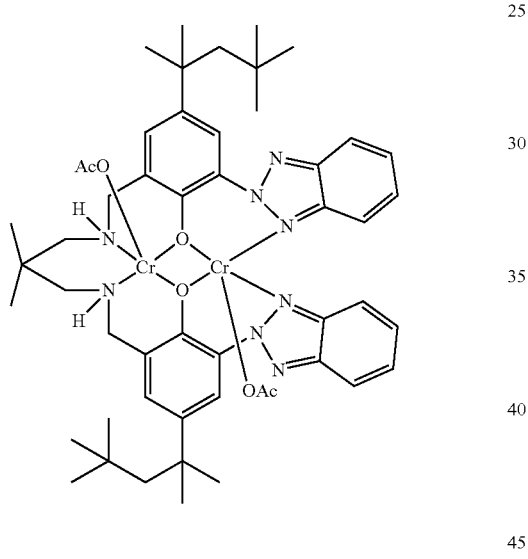
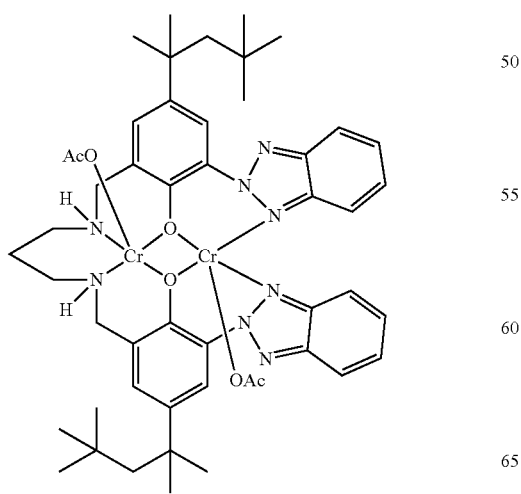
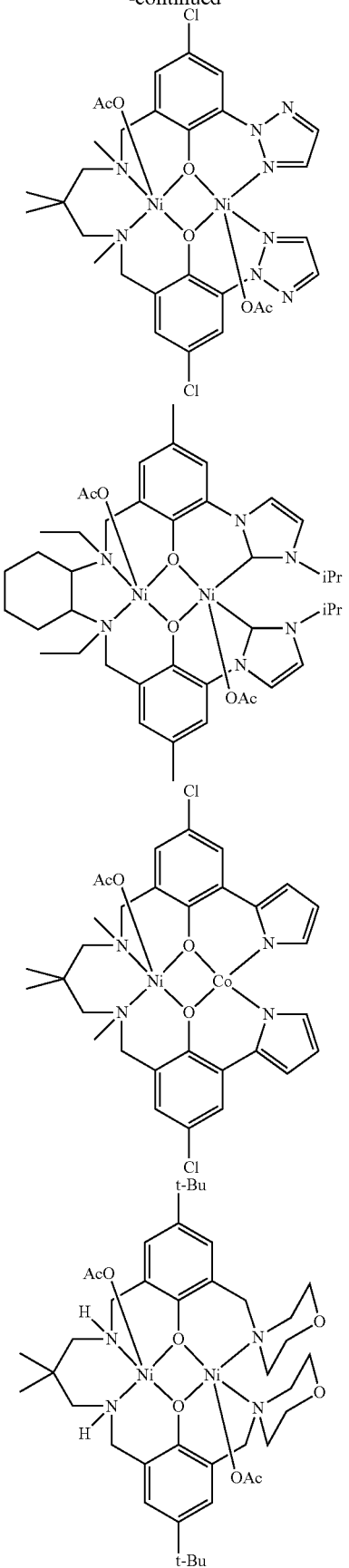

31
-continued
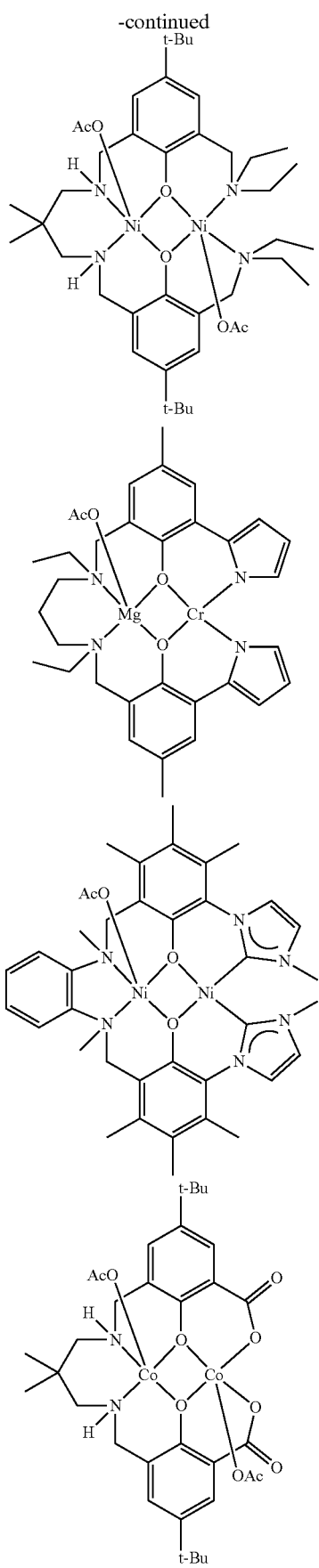
32
-continued
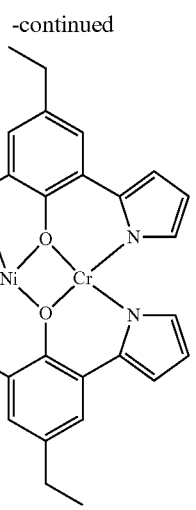
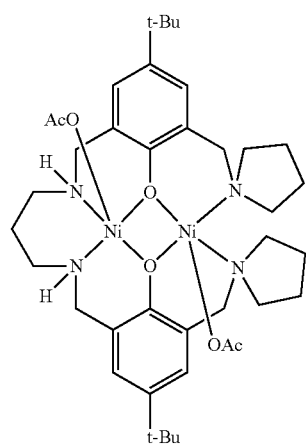
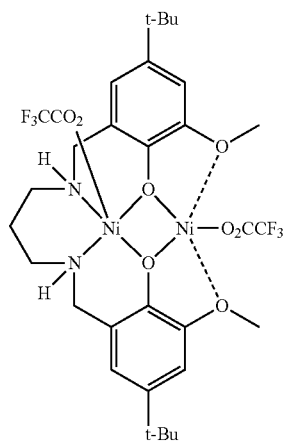

33
-continued
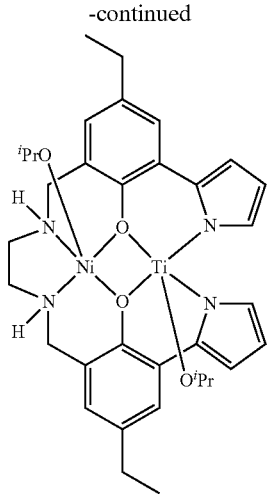
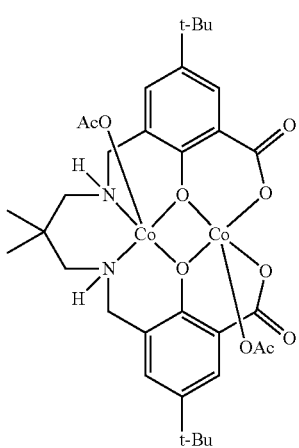
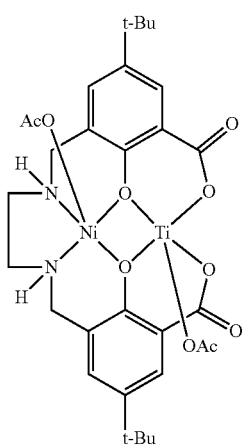
34
-continued
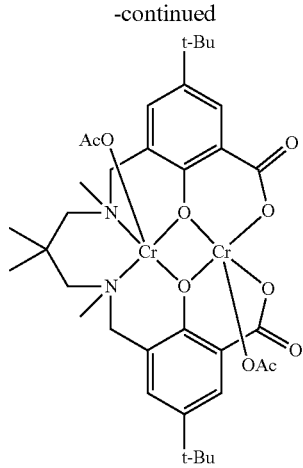
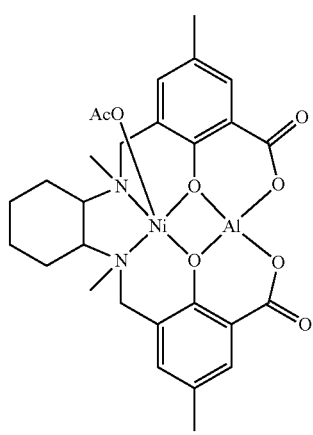
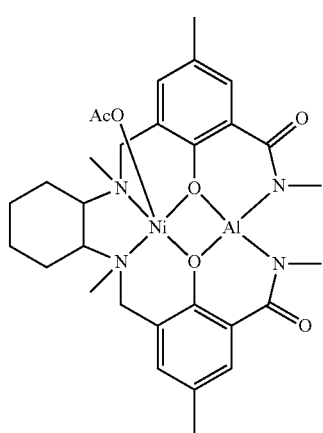

-continued
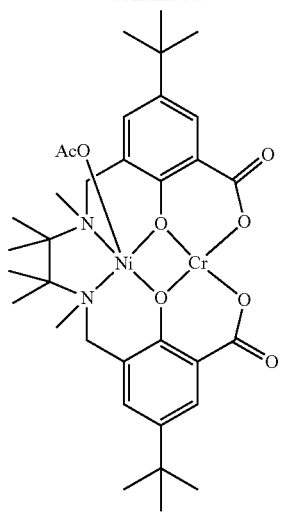
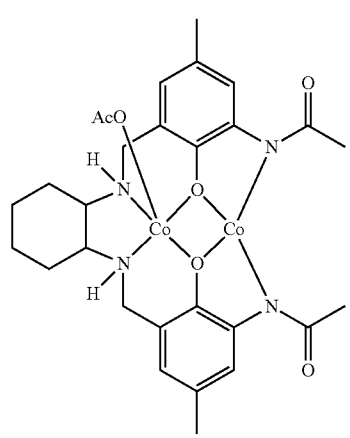
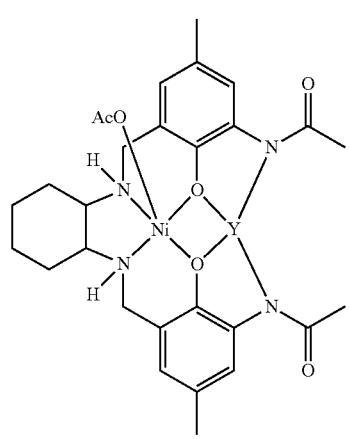
-continued
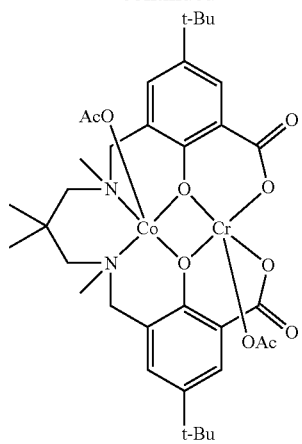
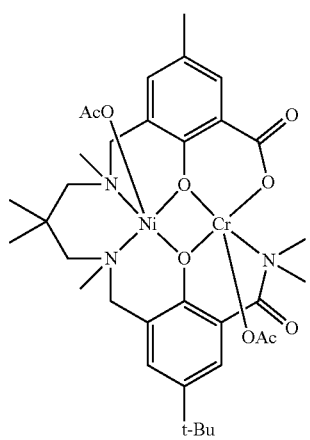
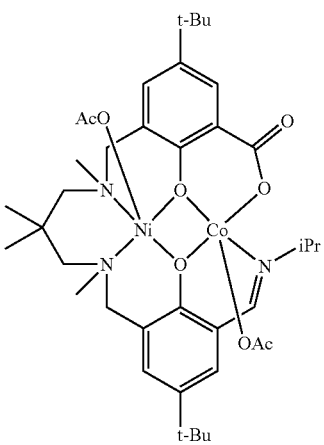

-continued

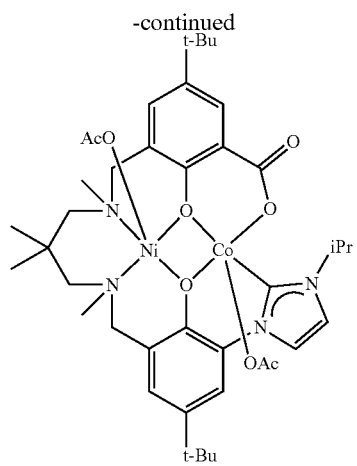

The polymerisation process according to the fourth, fifth, ninth and/or tenth aspect of the present invention is carried out in the presence of a metal complex catalyst. The metal complex may be monometallic or may be bimetallic. Preferably, the metal complex may be bimetallic, more preferably the metal complex may be according to formula (I) and/or formula (II), as described above.

Double Metal Cyanide (DMC) Catalyst

The polymerisation processes of the present invention may further comprise a double metal cyanide catalyst.

DMC catalysts are complicated compounds which comprise at least two metal centres and cyanide ligands. The DMC catalyst may additionally comprise at least one of one or more organic complexing agents, water, a metal salt and/or an acid (e.g. in non-stoichiometric amounts).

The first two of the at least two metal centres may be represented by M' and M".

M' may be selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M' is preferably selected from Zn(II), Fe(II), Co(II) and Ni(II), even more preferably M' is Zn(II).

M" is selected from Fe(II), Fe(III), Co(II), Co(III), Cr(II), Cr(III), Mn(II), Mn(III), Ir(III), Ni(II), Rh(III), Ru(II), V(IV), and V(V), preferably M" is selected from Co(II), Co(III), Fe(II), Fe(III), Cr(II), Ir(III) and Ni(II), more preferably M" is selected from Co(II) and Co(III).

It will be appreciated that the above preferred definitions for M' and M" may be combined. For example, preferably M¹ may be selected from Zn(II), Fe(II), Co(II) and Ni(II), and M" may preferably selected form be Co(II), Co(III), Fe(II), Fe(III), Cr(III), Ir(III) and Ni(II). For example, M' may preferably be Zn(II) and M" may preferably be selected from Co(II) and Co(III).

If a further metal centre(s) is present, the further metal centre may be further selected from the definition of M' or M".

Examples of DMC catalysts which can be used in the method of the invention include those described in U.S. Pat. Nos. 3,427,256, 5,536,883, 6,291,388, 6,486,361, 6,608,231, 7,008,900, 5,482,908, 5,780,584, 5,783,513, 5,158,922, 5,693,584, 7,811,958, 6,835,687, 6,699,961, 6,716,788, 6,977,236, 7,968,754, 7,034,103, 4,826,953, 4,500,704, 7,977,501, 9,315,622, EP-A-1568414, EP-A-1529566, and WO 2015/022290, the entire contents of which are incorporated by reference.

DMC catalysts which are useful in the invention may be produced by treating a solution (such as an aqueous solution) of a metal salt with a solution (such as an aqueous solution) of a metal cyanide salt in the presence of one or more organic complexing agents, water, and/or an acid. Suitable metal salts include compounds of the formula M'(X')$_p$, wherein M' is selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), and M' is preferably selected from Zn(II), Fe(II), Co(II) and Ni(II), even more preferably M' is Zn(II). X' is an anion selected from halide, oxide, hydroxide, sulphate, carbonate, cyanide, oxalate, thiocyanate, isocyanate, isothiocyanate, carboxylate and nitrate, preferably X' is halide. p is an integer of 1 or more, and the charge on the anion multiplied by p satisfies the valency of M'. Examples of suitable metal salts include zinc chloride, zinc bromide, zinc acetate, zinc acetonylacetonate, zinc benzoate, zinc nitrate, iron(II) sulphate, iron (II) bromide, cobalt(II) chloride, cobalt(II) thiocyanate, nickel(II) formate, nickel(II) nitrate, and mixtures thereof.

Suitable metal cyanide salts include compounds of the formula (Y)q[M"(CN)$_b$(A)$_c$], wherein M" is selected from Fe(II), Fe(III), Co(II), Co(II), Cr(II), Cr(III), Mn(II), Mn(III), Ir(III), Ni(II), Rh(III), Ru(II), V(IV), and V(V), preferably M" is selected from Co(II), Co(III), Fe(II), Fe(III), Cr(II), Ir(III) and Ni(II), more preferably M" is selected from Co(I) and Co(III). Y is a proton (H$^+$) or an alkali metal ion or an alkaline earth metal ion (such as K$^+$), A is an anion selected from halide, oxide, hydroxide, sulphate, cyanide oxalate, thiocyanate, isocyanate, isothiocyanate, carboxylate and nitrate. q and b are integers of 1 or more, preferably b is 4 or 6. c may be 0 or an integer of 1 or more. The sum of the charges on the ions Y, CN and A multiplied by q, b and c respectively (e.g. Y×q+CN×b+A×c) satisfies the valency of M". Examples of suitable metal cyanide salts include potassium hexacyanocobaltate(III), potassium hexacyanoferrate(II), potassium hexacyanoferrate(III), calcium hexacyanocobaltate(III), lithium hexacyanocolbaltate(III), and mixtures thereof.

Suitable complexing agents include (poly)ethers, polyether carbonates, polycarbonates, poly(tetramethylene ether diol)s, ketones, esters, amides, alcohols, ureas and the like. Exemplary complexing agents include propylene glycol, polypropylene glycol (PPG), (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol etc. It will be appreciated that the alcohol may be saturated or may contain an unsaturated moiety (e.g. a double or triple bond). Multiple (i.e. more than one different type of) complexing agents may be present in the DMC catalysts used in the present invention.

The DMC catalyst may comprise a complexing agent which is a polyether, polyether carbonate or polycarbonate.

Suitable polyethers for use in the present invention include those produced by ring-opening polymerisation of cyclic ethers, and include epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like. Preferred polyethers for use in the present invention are polyether polyols having between 2 and 8 hydroxyl groups. It is also preferred that polyethers for use in the present invention have a molecular weight between about 1,000 Daltons and about 10,000 Daltons, more preferably between about 1,000

Daltons and about 5,000 Daltons. Polyether polyols useful in the DMC catalyst of the present invention include PPG polyols, EO-capped PPG polyols, mixed EO-PO polyols, butylene oxide polymers, butylene oxide copolymers with ethylene oxide and/or propylene oxide, polytetramethylene ether glycols, and the like. Preferred polyethers include PPGs, such as PPG polyols, particularly diols and triols, said PPGs having molecular weights of from about 250 Daltons to about 8,000 Daltons, more preferably from about 400 Daltons to about 4,000 Daltons.

Suitable polyether carbonates for use in the DMC catalyst of the present invention may be obtained by the catalytic reaction of alkylene oxides and carbon dioxide in the presence of a suitable starter or initiator compound. The polyether carbonates used as the complexing agent can also be produced by other methods known to the person skilled in the art, for example by partial alcoholysis of polycarbonate polyols with di- or tri-functional hydroxy compounds. The polyether carbonates used as the complexing agent preferably have an average hydroxyl functionality of 1 to 6, more preferably 2 to 3, most preferably 2.

Suitable polycarbonates for use in the DMC catalyst of the present invention may be obtained by the polycondensation of difunctional hydroxy compounds (generally bishydroxy compounds such as alkanediols or bisphenols) with carbonic acid derivatives such as, for example, phosgene or bis[chlorocarbonyloxy] compounds, carbonic acid diesters (such as diphenyl carbonate or dimethyl carbonate) or urea. Methods for producing polycarbonates are generally well known and are described in detail in for example "Houben-Weyl, Methoden der organischen Chemie", Volume E20, Makromolekulare Stoffe, $4^{th}$ Edition, 1987, p. 1443-1457, "Ullmann's Encyclopedia of Industrial Chemistry", Volume A21, $5^{th}$ Edition, 1992, p. 207-215 and "Encyclopedia of Polymer Science and Engineering", Volume 11, $2^{nd}$ Edition, 1988, p. 648-718. Aliphatic polycarbonate diols having a molecular weight of from about 500 Daltons to 5000 Daltons, most highly preferably from 1000 Daltons to 3000 Daltons, are particularly preferably used. These are generally obtained from non-vicinal diols by reaction with diaryl carbonate, dialkyl carbonate, dioxolanones, phosgene, bischloroformic acid esters or urea (see for example EP-A 292 772 and the documents cited therein). Suitable non-vicinal diols are in particular 1,4-butanediol, neopentyl glycol, 1,5-pentanediol, 2-methyl-1,5-pentanediol, 3-methyl-1,5-pentanediol, 1,6-hexanediol, bis-(6-hydroxyhexyl)ether, 1,7-heptanediol, 1,8-octanediol, 2-methyl-1,8-octanediol, 1,9-nonanediol, 1,10-decanediol, 1,4-bis-hydroxymethyl cyclohexane, diethylene glycol, triethylene glycol, tetraethylene glycol, dipropylene glycol, tripropylene glycol, tetrapropylene glycol, alkoxylation products of diols with ethylene oxide and/or propylene oxide and/or tetrahydrofuran with molar masses up to 1000 Daltons, preferably between 200 Daltons and 700 Daltons, and in rarer cases the dimer diols, which are obtainable by reducing both carboxyl groups of dimer acids, which in turn can be obtained by dimerisation of unsaturated vegetable fatty acids. The non-vicinal diols can be used individually or in mixtures. The reaction can be catalysed by bases or transition metal compounds in the manner known to the person skilled in the art.

Other complexing agents that may be useful in present invention include poly(tetramethylene ether diols). Poly(tetramethylene ether diols) are polyether polyols based on tetramethylene ether glycol, also known as polytetrahydrofuran (PTHF) or polyoxybutylene glycol. These poly(tetramethylene ether diols) comprise two OH groups per molecule. They can be produced by cationic polymerisation of tetrahydrofuran (THF) with the aid of catalysts.

Complexing agents, as defined above, may be used to increase or decrease the crystallinity of the resulting DMC catalyst.

Suitable acids for use in the DMC catalyst of the present invention may have the formula $H_rX'''$, where $X'''$ is an anion selected from halide, sulfate, phosphate, borate, chlorate, carbonate, cyanide, oxalate, thiocyanate, isocyanate, isothiocyanate, carboxylate and nitrate, preferably $X'''$ is a halide. r is an integer corresponding to the charge on the counterion $X'''$. For example, when $X'''$ is $Cl^-$, r will be 1, i.e. the salt will be HCl.

If present, particularly preferred acids for use in the DMC catalyst of the present invention having the formula $H_rX'''$ include the following: HCl, $H_2SO_4$, $HNO_3$, $H_3PO_4$, HF, HI, HBr, $H_3BO_3$ and $HClO_4$. HCl, HBr and $H_2SO_4$ are particularly preferred.

It will also be appreciated that an alkali metal salt (e.g. an alkali metal hydroxide such as KOH, an alkali metal oxide or an alkali metal carbonate) may be added to the reaction mixture during synthesis of the DMC catalyst. For example, the alkali metal salt may be added to the reaction mixture after the metal salt ($M'(X')_p$) has been added to the metal cyanide salt ($(Y)q[M''(CN)_b(A)_c]$).

In one common preparation, an aqueous solution of zinc chloride (excess) is mixed with an aqueous solution of potassium hexacyanocobaltate, and an organic complexing agent (such as dimethoxyethane or tert-butyl alcohol) is added to the resulting slurry. After filtration and washing of the catalyst with an aqueous solution of the complexing agent (e.g. aqueous dimethoxyethane or aqueous tert-butyl alcohol), an active catalyst is obtained. Subsequent washing step(s) may be carried out using just the complexing agent, in order to remove excess water. Each one is followed by a filtration step.

In an alternative preparation, several separate solutions may be prepared and then combined in order. For example, the following solutions may be prepared:

1. a solution of a metal cyanide (e.g. potassium hexacyanocobaltate)
2. a solution of a metal salt e.g. (zinc chloride (excess))
3. a solution of a first complexing agent (e.g. PPG diol)
4. a solution of a second complexing agent (e.g. tert-butyl alcohol).

In this method, solutions 1 and 2 are combined immediately, followed by slow addition of solution 4, preferably whilst stirring rapidly. Solution 3 may be added once the addition of solution 4 is complete, or shortly thereafter. The catalyst is removed from the reaction mixture via filtration, and is subsequently washed with a solution of the complexing agents.

If water is desired in the DMC catalyst, then the above solutions (e.g. solutions 1 to 4) may be aqueous solutions.

However, it will be understood that anhydrous DMC catalysts (i.e. DMC catalysts without any water present) may be prepared if the solutions described in the above preparations are anhydrous solutions. To avoid hydrating the DMC catalyst and thereby introducing water molecules, any further processing steps (washing, filtration etc.) may be conducted using anhydrous solvents.

In one common preparation, several separate solutions may be prepared and then combined in order. For example, the following solutions may be prepared:

1. a solution of a metal salt (e.g. zinc chloride (excess)) and a second complexing agent (e.g. tert-butyl alcohol)
2. a solution of a metal cyanide (e.g. potassium hexacyanocobaltate)
3. a solution of a first and a second complexing agent (e.g. the first complexing agent may be a polymer (for example, PPG diol) and the second complexing agent may be tert-butyl alcohol).

In this method, solutions 1 and 2 are combined slowly (e.g. over 1 hour) at a raised temperature (e.g. above 25° C., such as about 50° C.) while stirring (e.g. at 450 rpm). After addition is complete the stirring rate is increased for 1 hour (e.g. up to 900 rpm). The stirring rate is then decreased to a slow rate (e.g. to 200 rpm) and solution 3 is added quickly with low stirring. The mixture is filtered.

The catalyst solids may be re-slurried in a solution of the second complexing agent at high stirring rate (e.g. about 900 rpm) before addition of the first complexing agent at low stirring rate (e.g. 200 rpm). The mixture is then filtered. This step may be repeated more than once. The resulting catalyst cake may be dried under vacuum (with heating e.g. to 60° C.).

Alternatively, after the mixture is first filtered it can be re-slurried at a raised temperature (e.g. above 25° C., such as about 50° C.) in a solution of the first complexing agent (and no second or further complexing agent) and then homogenized by stirring. It is then filtered after this step. The catalyst solids are then re-slurried in a mixture of the first and second complexing agents. For example, the catalyst solids are re-slurried in the second complexing agent at a raised temperature (e.g. above 25° C., such as about 50° C.) and subsequently the first complexing agent is added and mixture homogenized by stirring. The mixture is filtered and the catalyst is dried under vacuum with heating (e.g. to 100° C.).

It will be appreciated that the DMC catalyst may comprise:

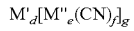

wherein M' and M" are as defined above, d, e, f and g are integers, and are chosen to such that the DMC catalyst has electroneutrality. Preferably, d is 3. Preferably, e is 1. Preferably f is 6. Preferably g is 2. Preferably, M' is selected from Zn(II), Fe(II), Co(II) and Ni(II), more preferably M' is Zn(II). Preferably M" is selected from Co(III), Fe(III), Cr(III) and Ir(III), more preferably M" is Co(III).

It will be appreciated that any of these preferred features may be combined, for example, d is 3, e is 1, f is 6 and g is 2, M' is Zn(II) and M" is Co(III).

Suitable DMC catalysts of the above formula may include zinc hexacyanocobaltate(II), zinc hexacyanoferrate(II), nickel hexacyanoferrate(II), and cobalt hexacyanocobaltate (II).

There has been a lot of development in the field of DMC catalysts, and the skilled person will appreciate that the DMC catalyst may comprise, in addition to the formula above, further additives to enhance the activity of the catalyst. Thus, while the above formula may form the "core" of the DMC catalyst, the DMC catalyst may additionally comprise stoichiometric or non-stoichiometric amounts of one or more additional components, such as at least one organic complexing agent, an acid, a metal salt, and/or water.

For example, the DMC catalyst may have the following formula:

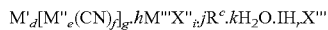

wherein M', M", X''', d, e, f and g are as defined above. M''' can be M' and/or M". X" is an anion selected from halide, oxide, hydroxide, sulphate, carbonate, cyanide, oxalate, thiocyanate, isocyanate, isothiocyanate, carboxylate and nitrate, preferably X" is halide. i is an integer of 1 or more, and the charge on the anion X" multiplied by i satisfies the valency of M'''. r is an integer that corresponds to the charge on the counterion X'''. For example, when X''' is Cl⁻, r will be 1.1 is 0, or a number between 0.1 and 5. Preferably, I is between 0.15 and 1.5.

$R^c$ is a complexing agent, and may be as defined above. For example, $R^c$ may be a (poly)ether, a polyether carbonate, a polycarbonate, a poly(tetramethylene ether diol), a ketone, an ester, an amide, an alcohol (e.g. a $C_{1-8}$ alcohol), a urea and the like, such as propylene glycol, polypropylene glycol, (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol, for example, $R^c$ may be tert-butyl alcohol, dimethoxyethane, or polypropylene glycol.

As indicated above, more than one complexing agent may be present in the DMC catalysts used in the present invention. A combination of the complexing agents tert-butyl alcohol and polypropylene glycol is particularly preferred.

It will be appreciated that if the water, complexing agent, acid and/or metal salt are not present in the DMC catalyst, h, j, k and/or l will be zero respectively. If the water, complexing agent, acid and/or metal salt are present, then h, j, k and/or l are a positive number and may, for example, be between 0 and 20. For example, h may be between 0.1 and 4. j may be between 0.1 and 6. k may be between 0 and 20, e.g. between 0.1 and 10, such as between 0.1 and 5. I may be between 0.1 and 5, such as between 0.15 and 1.5.

As set out above, DMC catalysts are complicated structures, and thus, the above formula including the additional components is not intended to be limiting. Instead, the skilled person will appreciate that this definition is not exhaustive of the DMC catalysts which are capable of being used in the invention.

An exemplary DMC catalyst is of the formula $Zn_3[Co(CN)_6]_2 \cdot hZnCl_2 \cdot kH_2O \cdot j[(CH_3)_3COH]$, wherein h, k and l are as defined above. For example, h may be from 0 to 4 (e.g. from 0.1 to 4), k may be from 0 to 20 (e.g. from 0.1 to 10), and j may be from 0 to 6 (e.g. from 0.1 to 6).

Chain Transfer Agent

The polymerisation processes of the present invention may optionally be carried out in the presence of a chain transfer agent.

Preferably, the chain transfer agent is selected from water or a compound of formula (III):

formula (III)

wherein Z is an optionally substituted moiety selected from the group consisting of aliphatic, heteroaliphatic, alicyclic, heteroalicyclic, aryl, heteroaryl, polyolefin, polyester, polyether, polycarbonate or combinations thereof;
each W is independently selected from a hydroxyl, amine, thiol or carboxylate group; and
a is an integer which is at least 2.

The chain transfer agent (CTA) may be water or a compound which has two or more groups independently selected from hydroxyl (—OH), amine (—NHR$^W$), thiol (—SH) or carboxylate (—C(O)OH), wherein R$^W$ is hydrogen, optionally substituted aliphatic, heteroaliphatic, alicyclic, heteroalicyclic, aryl or heteroaryl, or combinations thereof (i.e. aliphaticaryl, aliphaticheteroaryl, heteroaliphaticaryl, etc). It will be appreciated that although water does not have two distinct "—OH" groups, it displays similar chain transfer properties to molecules which do have two distinct "—OH" groups and is therefore intended to be encompassed by the term "chain transfer agent". Z is the core of the chain transfer agent any may be any group which can have two or more "W" groups attached to it. In preferred embodiments, Z is an optionally substituted moiety selected from the group consisting of aliphatic, heteroaliphatic, alicyclic, heteroalicyclic, aryl, heteroaryl, polyolefin, polyester, polyether, polycarbonate or combinations thereof. For example, Z may be an optionally substituted araliphatic, heteroaraliphatic, aliphaticalicyclic etc. group. Preferably, Z is selected from alkyl, heteroalkyl, alkenyl, heteroalkenyl, alkynyl, heteroalkynyl, cycloalkyl, heterocycloalkyl, aryl, heteroaryl or polyether.

When Z is a polymer (i.e. when Z comprises a polyolefin, polyester, polyether or polycarbonate group), the molecular weight (Mn) of such polymers are preferably less than 10,000 g/mol. Preferred polymers include poly(ethylene glycol) (PEG) and poly(lactic acid) (PLA).

The chain transfer agent, in particular the group Z, may optionally be substituted. In certain embodiments, Z is optionally substituted by halogen, nitrile, imine, nitro, aliphatic, acetyl, amido, heteroaliphatic, alicyclic, heteroalicyclic, aryl or heteroaryl.

n is an integer which is at least 2. Preferably, n is an integer selected from 2 to 10 inclusive. More preferably, a is an integer selected from 2 to 6 inclusive.

Each occurrence of W may be the same or different. Preferably, each occurrence of W is the same. In certain embodiments, each occurrence of W is hydroxyl (i.e. the chain transfer agent is a polyol, for example a diol, a triol, a tetraol etc.). In other embodiments, each occurrence of W is amine (i.e. the chain transfer agent is a polyamine, for example a diamine, a triamine, a tetraamine etc.). In other embodiments, each occurrence of W is carboxylic acid (i.e. the chain transfer agent is a polycarboxylic acid, for example a diacid, a triacid, a tetraacid etc.). In other embodiments, each occurrence of W is thiol (i.e. the chain transfer agent is a polythiol, for example a dithiol, a trithiol, a tetrathiol etc.). In other embodiments, the chain transfer agent is water.

When the chain transfer agent is water, X is preferably not OCOCH$_3$, OCOCF$_3$, OSO$_2$C$_7$H$_7$, OSO(CH$_3$)$_2$, or halide, more preferably C X is not OCOCH$_3$, OCOCF$_3$, OSO$_2$C$_1$H$_7$, OSO(CH$_3$)$_2$, halide, alkyl, alkoxy or amido.

A single chain transfer agent may be used or a mixture of chain transfer agents may be used.

Examples of chain transfer agents useful in the second aspect include water, mono-alcohols (i.e. alcohols with one OH group, for example, 4-ethylbenzenesulfonic acid, methanol, ethanol, propanol, butanol, pentanol, hexanol, phenol, cyclohexanol), diols (for example, 1,2-ethanediol, 1-2-propanediol, 1,3-propanediol, 1,2-butanediol, 1-3-butanediol, 1,4-butanediol, 1,5-pentanediol, 1,6-hexanediol, 1,2-diphenol, 1,3-diphenol, 1,4-diphenol, catechol and cyclohexenediol), triols (glycerol, benzenetriol, 1,2,4-butanetriol, tris(methylalcohol)propane, tris(methylalcohol)ethane, tris(methylalcohol)nitropropane, trimethylolpropane, preferably glycerol or benzenetriol), tetraols (for example, calix[4]arene, 2,2-bis(methylalcohol)-1,3-propanediol, di(t-rimethylolpropane)), polyols (for example, dipentaerythritol, D-(+)-glucose or D-sorbitol), dihydroxy terminated polyesters (for example polylactic acid), dihydroxy terminated polyethers (for example poly(ethylene glycol)), acids (such as diphenylphosphinic acid), starch, lignin, monoamines (i.e. methylamine, dimethylamine, ethylamine, diethylamine, propylamine, dipropylamine, butylamine, dibutylamine, pentylamine, dipentylamine, hexylamine, dihexylamine), diamines (for example 1,4-butanediamine), triamines, diamine terminated polyethers, diamine terminated polyesters, mono-carboxylic acids (for example, 3,5-di-tert-butylbenzoic acid), dicarboxylic acids (for example, maleic acid, malonic acid, succinic acid, glutaric acid or terephthalic acid, preferably maleic acid, malonic acid, succinic acid, glutaric acid), tricarboxylic acids (for example, citric acid, 1,3,5-benzenetricarboxylic acid or 1,3,5-cyclohexanetricarboxylic acid, preferably citric acid), mono-thiols, dithiols, trithiols, and compounds having a mixture of hydroxyl, amine, carboxylic acid and thiol groups, for example lactic acid, glycolic acid, 3-hydroxypropionic acid, natural amino acids, unnatural amino acids, monosaccharides, disaccharides, oligosaccharides and polysaccharides (including pyranose and furanose forms). Preferably, the chain transfer agent is selected from cyclohexene diol, 1,2,4-butanetriol, tris(methylalcohol)propane, tris(methylalcohol)nitropropane, tris(methylalcohol)ethane, tri(methylalcohol)propane, tri(methylalcohol)butane, pentaerythritol, poly(propylene glycol), glycerol, mono- and di-ethylene glycol, propylene glycol, 2,2-bis(methylalcohol)-1,3-propanediol, 1,3,5-benzenetricarboxylic acid, 1,3,5-cyclohexanetricarboxylic acid, 1,4-butanediamine, 1,6-hexanediol, D-sorbitol, 1-butylamine, terephthalic acid, D-(+)-glucose, 3,5-di-tert-butylbenzoic acid, and water.

The chain transfer agent may be present in a molar ratio of at least 1:1 relative to the metal complex (monometallic or bimetallic metal complex catalyst). Preferably, the chain transfer agent may be present in a molar ratio of between about 1:1 to about 100:1 relative to the metal complex. More preferably, the chain transfer agent may be present in a molar ratio from 1:1 to 9:1. Most preferably, the chain transfer agent may be present in a molar ratio of at least 2:1 relative to the metal complex.

A halogenated X group reduces the amount of chain transfer agent required to produce polycarbonate chains which are terminated at both ends with hydroxyl groups. In fact, water impurities which are present either in the carbon dioxide or left over from the production of the catalyst (for example, if hydrated metal acetates are used to produce the catalysts useful in the first aspect), can act as a sufficient amount of chain transfer agent (where the chain transfer agent is water) to ensure that all polycarbonate chains are terminated in hydroxyl groups. An excess of chain transfer agent is not therefore required. Therefore in certain embodiments, X is a halogenated group and the chain transfer agent:metal complex molar ratio is at least 0.1:1, preferably at least 1:1, more preferably 0.1:1 to 9:1, even more preferably 0.1:1 to 1:1. Preferably X is OC(O)Rx, OSO$_2$Rx, OSO(Rx)$_2$, ORx, or haloaliphatic, wherein one or both Rx groups are haloaliphatic, haloaryl or haloalicyclic more preferably haloaliphatic (such as fluoroaliphatic).

The chain transfer agent may be used to control the molecular weight ($M_n$) of the polymers produced by the process of the present invention.

Reactants

The polymerisation processes of the present invention comprise the reaction of carbon dioxide with an epoxide. The epoxide may be any compound comprising an epoxide moiety. The epoxide may be aliphatic, including cycloaliphatic or aromatic. Examples of epoxides which may be used in the present invention include, but are not limited to, cyclohexene oxide, styrene oxide, unsubstituted or substituted alkylene oxides such as ethylene oxide, propylene oxide and butylene oxide, substituted cyclohexene oxides (such as limonene oxide, $C_{10}H_{16}O$ or 2-(3,4-epoxycyclohexyl)ethyltrimethoxysilane, $C_{11}H_{22}O$), unsubstituted or substituted oxiranes (such as oxirane, epichlorohydrin, 2-(2-methoxyethoxy)methyl oxirane (MEMO), 2-(2-(2-methoxyethoxy)ethoxy)methyl oxirane (ME2MO), 2-(2-(2-(2-methoxyethoxy)ethoxy)ethoxy)methyl oxirane (ME3MO), 1,2-epoxybutane, glycidyl ethers, vinyl-cyclohexene oxide, 3-phenyl-1,2-epoxypropane, 1,2- and 2,3-epoxybutane, isobutylene oxide, cyclopentene oxide, 2,3-epoxy-1,2,3,4-tetrahydronaphthalene, indene oxide, and functionalized 3,5-dioxaepoxides. Examples of functionalized 3,5-dioxaepoxides include:

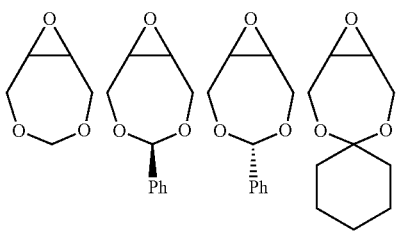

The epoxide moiety may be a glycidyl ether, glycidyl ester or glycidyl carbonate. Examples of glycidyl ethers, glycidyl esters glycidyl carbonates include:

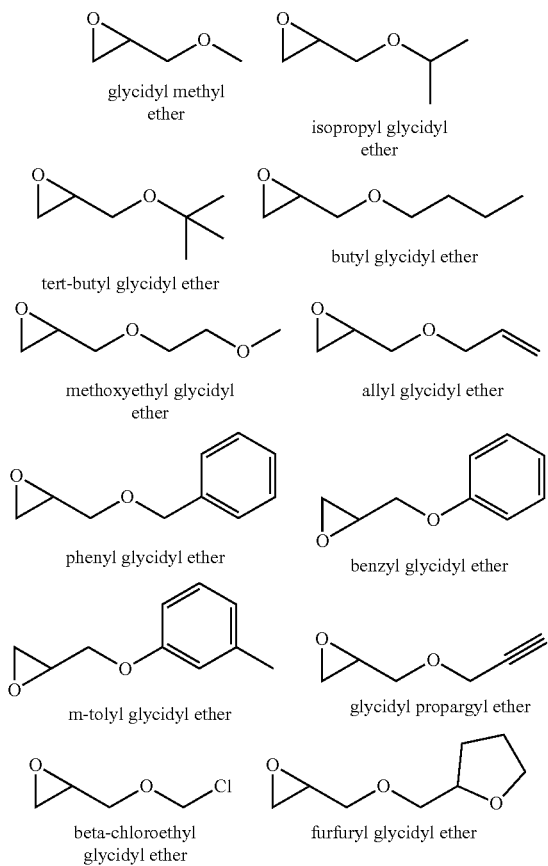

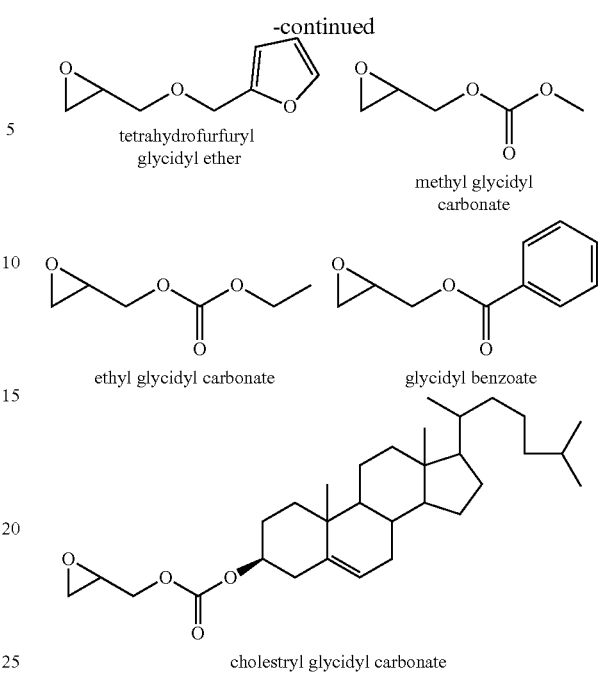

The epoxide substrate may contain more than one epoxide moiety, i.e. it may be a bis-epoxide, a tris-epoxide, or a multi-epoxide containing moiety. Examples of compounds including more than one epoxide moiety include bisphenol A diglycidyl ether and 3,4-epoxycyclohexylmethyl 3,4-epoxycyclohexanecarboxylate. It will be understood that reactions carried out in the presence of one or more compounds having more than one epoxide moiety may lead to cross-linking in the resulting polymer.

The skilled person will appreciate that the epoxide can be obtained from "green" or renewable resources. The epoxide may be obtained from a (poly)unsaturated compound, such as those deriving from a fatty acid and/or terpene, obtained using standard oxidation chemistries.

The epoxide moiety may contain —OH moieties, or protected —OH moieties. The —OH moieties may be protected by any suitable protecting group. Suitable protecting groups include methyl or other alkyl groups, benzyl, allyl, tert-butyl, tetrahydropyranyl (THP), methoxymethyl (MOM), acetyl (C(O)alkyl), benzolyl (C(O)Ph), dimethoxytrityl (DMT), methoxyethoxymethyl (MEM), p-methoxybenzyl (PMB), trityl, silyl (such as trimethylsilyl (TMS), t-Butyldimethylsilyl (TBDMS), t-Butyldiphenylsilyl (TBDPS), tri-iso-propylsilyloxymethyl (TOM), and tri-isopropylsilyl (TIPS)), (4-methoxyphenyl)diphenylmethyl (MMT), tetrahydrofuranyl (THF), and tetrahydropyranyl (THP).

The epoxide may be purified (for example by distillation, such as over calcium hydride) prior to reaction with carbon dioxide. For example, the epoxide may be distilled prior to being added to the reaction mixture.

The epoxide preferably has a purity of at least 98%, more preferably >99%.

It will be understood that the term "an epoxide" is intended to encompass one or more epoxides. In other words, the term "an epoxide" refers to a single epoxide, or a mixture of two or more different epoxides. For example, the epoxide substrate may be a mixture of ethylene oxide and propylene oxide, a mixture of cyclohexene oxide and propylene oxide, a mixture of ethylene oxide and cyclohexene oxide, or a mixture of ethylene oxide, propylene oxide and cyclohexene oxide.

The skilled person will also understand that substituted and unsubstituted oxetanes can be used in place of, and in addition to, the epoxides of the second aspect of the invention. Suitable oxetanes include unsubstituted or substituted oxetanes (preferably substituted at the 3-position by halogen, alkyl (unsubstituted or substituted by —OH or halogen), amino, hydroxyl, aryl (e.g. phenyl), alkylaryl (e.g. benzyl)). Exemplary oxetanes include oxetane, 3-ethyl-3-oxetanemethanol, oxetane-3-methanol, 3-methyl-3-oxetanemethanol, 3-methyloxetane, 3-ethyloxetane, etc.

Preferably, the epoxide may be aliphatic. Preferably, the epoxide may be a $C_1$-$C_{10}$ alkyl oxide. More preferably, the epoxide may be ethylene oxide, propylene oxide, butylene oxide or a combination thereof. Most preferably, the epoxide may be ethylene oxide, propylene oxide or a combination thereof. Such oxides are of special interest as they produce polymers (polyalkylene carbonates, such as PPC) with elastomeric properties which are useful in many applications e.g. films.

Reaction Conditions

The polymerisation process of any aspect of the present invention may be carried out at any suitable pressure. The polymerisation process may be carried out at a pressure of 1 to 100 atmospheres, preferably at 1 to 40 atmospheres, such as at 1 to 20 atmospheres, more preferably at 1 or 10 atmospheres.

The polymerisation process may be carried out at any suitable temperature. The polymerisation process may be carried out at a temperature of about 0° C. to about 250° C., preferably from about 40° C. to about 160° C., even more preferably from about 50° C. to about 120° C.

The duration of the polymerisation process may be up to 168 hours, preferably from about 1 minute to about 24 hours, more preferably from about 5 minutes to about 12 hours, most preferably from about 1 to about 6 hours.

When the polymerisation process comprises the reaction of carbon dioxide with an epoxide, the process temperature (i.e. the temperature at which the polymerisation process is carried out) may be used to control the product composition. When the temperature is increased, the selectivity of the catalyst of formulae (I) and (II) towards the formation of cyclic carbonate is also increased. The catalysts of formulae (I) and (II) and polymerisation processes may operate at temperatures of up to 250° C.

The polymerisation process may be carried out at low catalytic loading. For example, when the polymerisation comprises the reaction of carbon dioxide with an epoxide, the catalytic loading for the process is preferably about 1:1,000-100,000 catalyst:epoxide, more preferably about 1:1,000-300,000 catalyst:epoxide, even more preferably about 1:10,000-100,000, and most preferably about 1:50,000-100,000 catalyst:epoxide. When the polymerisation process comprises the reaction of an anhydride with an epoxide the catalytic loading for the process is preferably about 1:1,000-300,000 catalyst:total monomer content, more preferably about 1:10,000-100,000 catalyst:total monomer content, most preferably about 1:50,000-100,000 catalyst:total monomer content. For the avoidance of doubt, the ratios above are molar ratios.

The polymerisation process may be carried out in the presence of a solvent. Examples of solvents include toluene, diethyl carbonate, dimethyl carbonate, dioxane, dichlorobenzene, methylene chloride, propylene carbonate, ethylene carbonate, etc.

The polymerisation process can be carried out in a batch reactor or a continuous reactor.

Products

The polymer products of the polymerisation process of any aspect of the present invention may be polycarbonates or polyether carbonate polyols. For example, the polymer products may be polyether carbonate polyols such as poly(cyclohexene carbonate) (PCHC) or poly(propylene carbonate) (PPC).

It will be appreciated that the polymer product may be a polycarbonate or a polyether carbonate polyol.

When the polymer products are polyether carbonate polyols, the polyether carbonate polyols may have n ether linkages and m carbonate linkages, wherein n and m are integers, and wherein $m/(n+m)$ is from greater than zero to less than 1. When the polymer products are polycarbonates, the polycarbonates may have n ether linkages and m carbonate linkages, wherein n and m are integers, and wherein $m/(n+m)$ is equal to 1. Therefore, it will be appreciated by a person skilled in the art that when $m/(n+m)$ is 1, the polymer product is a polycarbonate and when $m/(n+m)$ is from greater than zero to less than 1, the polymer product is a polyether carbonate polyol.

Typically, when the polymerisation process is carried out in the presence of a DMC catalyst, as described above, the ratio of $m/(n+m)$ is from more than 0 to less than 1. Typically, when the polymerisation process of the present invention are carried out in the absence of a DMC catalyst, as described above, i.e. in the presence of a monometallic or bimetallic metal complex catalyst, the ratio of $m/(n+m)$ is from 0.05 to 0.95.

For example, the polymerisation process of the invention is capable of preparing polycarbonates having an $m/(n+m)$ value equal to 1. A person skilled in the art will appreciate that in this case, the epoxide and $CO_2$ monomers of the polymer product are fully alternating.

For example, the polymerisation process of the invention is capable of preparing polyether carbonate polyols having a wide range of $m/(n+m)$ values. $m/(n+m)$ may be <0.05, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, >0.95 or within any range prepared from the specific examples. For example, $m/(n+m)$ may be from about 0.5 to 0.95, from about 0.10 to 0.90, from about 0.15 to 0.85, from about 0.20 to about 0.80 or from about 0.25 to about 0.75 etc. In certain embodiments, when polymer products are polyether carbonate polyols, the polyether carbonate polyols may have a high proportion of carbonate linkages, for example $m/(n+m)$ may be greater than about 0.50, such as from greater than about 0.55 to less than about 0.95, for example about 0.65 to about 0.90, for example about 0.75 to about 0.90. The polymerisation process of the present invention is able to prepare polyether carbonate polyols having a high ratio of $m/(n+m)$ under mild conditions, for example, under pressures of 20 atmospheres or below, such as 10 atmospheres or below.

The polyether carbonate polyols may have a structure according to formula (IV):

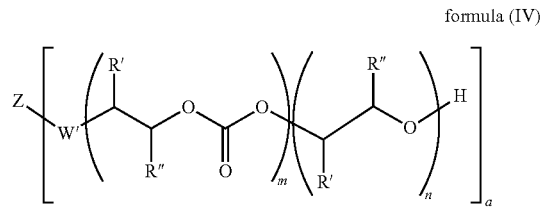

formula (IV)

wherein Z and W' depend on the nature of the chain transfer agent, R' and R" depend on the nature of the epoxide and m and n define the amount of the carbonate and polyether linkages in the polyether carbonate polyol. It will be appreciated that the polyether carbonate polyol must contain at least one carbonate and at least one ether linkage. Therefore, it will be appreciated that the number of ether and carbonate linkages (n+m) in the polyol will be greater than or equal to a. The sum of n+m must be greater than or equal to a.

It will be appreciated that in the polymers of formula (IV), the adjacent epoxide monomer units in the backbone may be head-to-tail linkages, head-to-head linkages or tail-to-tail linkages. It will also be appreciated that formula (IV) does not require the carbonate links and the ether links to be present in two distinct "blocks" in each of the sections defined by "a", but instead the carbonate and ether repeating units may be statistically distributed along the polymer backbone, or may be arranged so that the carbonate and ether linkages are not in two distinct blocks.

Thus, the polyether carbonate polyol (e.g. a polymer of formula (IV)) may be referred to as a random copolymer, a statistical copolymer, an alternating copolymer, or a periodic copolymer. It will be appreciated that the wt % of carbon dioxide incorporated into a polymer cannot be definitively used to determine the amount of carbonate linkages in the polymer backbone. For example, two polymers which incorporate the same wt % of carbon dioxide may have very different ratios of carbonate to ether linkages. This is because the "wt % incorporation" of carbon dioxide does not take into account the length and nature of the chain transfer agent. For instance, if one polymer (Mn 2000 g/mol) is prepared using a chain transfer agent with a molar mass of 100 g/mol, and another polymer (Mn also 2000 g/mol) is prepared using a chain transfer having a molar mass of 500 g/mol, and both the resultant polymers have the same ratio of m/n then the wt % of carbon dioxide in the polymers will be different due to the differing proportion of the mass of the chain transfer agent in the overall polymer molecular weight (Mn). For example, if m/(m+n) was 0.5, the two polyether carbonate polyols described would have carbon dioxide contents of 26.1 wt % and 20.6 wt % respectively.

As highlighted above, the polymerisation process of the present invention is able to produce polyether carbonate polyols which have a wide range of carbonate to ether linkages (e.g. m/(n+m) can be from greater than zero to 1), which, when using propylene oxide, corresponds to incorporation of up to about 43 wt % carbon dioxide. Similarly, polycarbonates can be formed wherein m/(n+m) is 1.

As set out above, the method of the polymerisation process of the present invention is able to produce polyether carbonate polyols which are a random copolymer, a statistical copolymer, an alternating copolymer, or a periodic copolymer. Thus, the carbonate linkages are not in a single block, thereby providing a polymer product which has improved properties, such as improved thermal degradation, as compared to a polycarbonate polyol. Preferably, the polymer prepared by the method of the invention is a random copolymer or a statistical copolymer.

Each R' may independently be selected from H, halogen, hydroxyl, or an optionally substituted alkyl, alkenyl, alkynyl, haloalkyl, aryl, heteroaryl, alkoxy, aryloxy, alkylthio, arylthio, alicyclic or heteroalicyclic group. Preferably R' may be selected from H or optionally substituted alkyl. Each R" may independently be selected from H, halogen, hydroxyl, or an optionally substituted alkyl, alkenyl, alkynyl, haloalkyl, aryl, heteroaryl, alkoxy, aryloxy, alkylthio, arylthio, alicyclic or heteroalicyclic group. Preferably R" may be selected from H or optionally substituted alkyl.

R' and R" may together form a saturated, partially unsaturated or unsaturated ring containing carbon and hydrogen atoms, and optionally one or more heteroatoms (e.g. O, N or S). For example, R' and R" may together form a 5 or six membered ring.

As set out above, the nature of R' and R" will depend on the epoxide used in the reaction. If the epoxide is cyclohexene oxide (CHO), then R' and R" will together form a six membered alkyl ring (e.g. a cyclohexyl ring). If the epoxide is ethylene oxide, then R' and R" will both be H. If the epoxide is propylene oxide, then R' will be H and R" will be methyl (or R' will be methyl and R" will be H, depending on how the epoxide is added into the polymer backbone). If the epoxide is butylene oxide, then R' will be H and R" will be ethyl (or vice versa).

It will also be appreciated that if a mixture of epoxides are used, then each occurrence of R' and/or R" may be different, for example if a mixture of ethylene oxide and propylene oxide are used, R' may be independently hydrogen or methyl, and R" may be independently hydrogen or methyl.

Thus, R' and R" may independently be selected from hydrogen or alkyl, or R' and R" may together form a cyclohexyl ring, preferably R' and R" may independently be selected from hydrogen, methyl or ethyl, or R' and R" may together form a cyclohexyl ring.

W' corresponds to W described above, except that a bond replaces the labile hydrogen atom. Therefore, the identity of each W depends on the definition of W in the chain transfer agent.

The variable a will also depend on the nature of the chain transfer agent. It will be appreciated that the value of a in formula (IV) will be the same as in formula (III). Therefore, for formula (IV), a is an integer of at least 2, preferably a is in the range of between 2 and 8, preferably a is in the range of between 2 and 6.

The value of a will influence the shape of the polyether carbonate polyol product. For example, when a is 2, the polyol of formula (IV) may have the following structure:

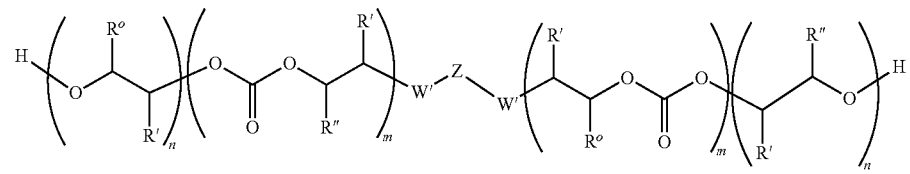

wherein Z, W', m, n, R' and R" are as described above for formula (IV).

For example, when a is 3, the polyether carbonate polyol of formula (IV) may have the following formula:

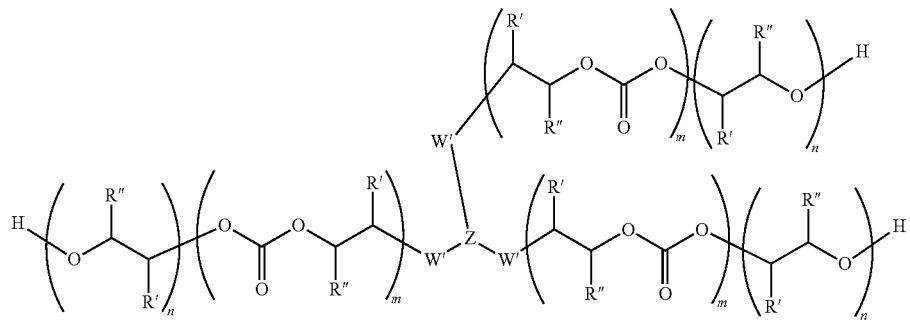

Where Z, W', m, n, R' and R" are as described above for formula (IV).

The polymer products may have any suitable number-average molecular weight (Mn). Preferably, the number-average molecular weight (Mn) of the polymer products may be from about 1,000 g/mol to about 100,000 g/mol. The number-average molecular weight (Mn) of the polymer products may be measured by Gel Permeation Chromatography (GPC) using, for example, a GPC-60 manufactured by Polymer Labs, using THF as the eluent at a flow rate of 1 ml/min on Mixed B columns, manufactured by Polymer Labs. Narrow molecular weight polystyrene standards can be used to calibrate the instrument.

The chain transfer agent may be used to control the molecular weight (Mn) of the polymer products. For example, it is possible to produce polyether carbonate polyols and polyester polyols having a M, of from about 200 g/mol to about 20,000 g/mol, preferably less than about 10,000 g/mol by adding a chain transfer agent to the polymerisation process.

The polymer products may have a polydispersity index (PDI) of less than about 2, preferably less than about 1.5, even more preferably less than about 1.2. Advantageously, it is possible to control the molecular weight distribution so as to produce multi-modal or broad molecular weight distribution polymers by the addition of one or more chain transfer agent(s).

The polymer products are useful building blocks in the preparation of various copolymeric materials. The polymer products may undergo further reaction, for example to produce polymeric products such as polyureas or polyamines. These processes and reactions are well known to the skilled person (for example, refer to WO2013/034750).

The polyether carbonate polyols or polyester polyols may be used in various applications and products which conventionally use polyols, including (but not limited to) adhesives (such as hot melt adhesives and structural adhesives), a binder (such as forest product binders, foundry core binders and rubber crumb binders), coatings (such as powder coatings, transport, e.g. automotive or marine coatings, fast cure coatings, self-healing coatings, top coats and primers, varnishes, and coatings for marine applications, e.g. oil rigs), elastomers (such as cast elastomers, fibres/spandex elastomers, footwear elastomers, RIM/RRIM elastomers, synthetic leather elastomers, technical microcellular elastomers and TPU elastomers), flexible foams (such as viscoelastic foams), rigid foams (such as rigid and flexible panels, moulded rigid foams, aerosol gap filling foam, spray foams, refrigeration foams, pour-in-place foams, and foam slabs) and sealants (such as glazing sealants for commercial, industrial and transport (e.g. automotive) applications, and construction sealants). The polyamines and polyureas can be processed using methods standard techniques known in the art, such as foaming.

It will be understood that the polyether carbonate polyol and polyester polyols produced by the polymerisation process of the present invention, or of the polymer of the fourth aspect of the present invention, may be mixed with other polyols prior to further use or reaction.

The polyether carbonate polyols may have a number of beneficial properties including high strength, high toughness, high gloss, high transparency, low haze, high gas (e.g. oxygen and carbon dioxide) or water barrier properties, flame resistance, UV resistance, high durability, rigidity and stiffness, compatibility with plasticizers, broad dimensional stability temperature, biodegradability and biocompatibility, and modulus of elasticity and yield strength comparable to LDPE. Thus, these polymers may be used in various applications and products, such as electronic components, construction materials, data storage products, automotive and aircraft products, security components, medical applications, mobile phones, packaging (including bottles), optical applications (such as safety glass, windscreens, etc).

Acid

The methods of the present invention comprise the step of contacting the catalyst with an acid effective to deactivate the catalyst. Advantageously, contacting the catalyst with an acid stabilises the polymer product. Without being bound by theory, it is thought that a complex is formed between the catalyst and the anion of the acid (for example, acetate if acetic acid is used as the acid), which may or may not be in equilibrium with the catalyst-polymer complex, depending on the acid used. Once carbon dioxide is removed from (or no longer added to) the polymerisation reaction, the presence of the catalyst-polymer complex can lead to degradation of the polymer chains. The formation of the complex between the catalyst and the anion of the acid reduces the amount of catalyst-polymer complex present, thus advantageously reducing the amount of polymer degradation.

The processes of the first and sixth aspects of the present invention comprise the step of contacting the catalyst with an acid effective to deactivate the catalyst. The acid of the first and sixth aspects of the present invention may be any suitable acid effective to deactivate the catalyst. Preferably, the acid of the first and sixth aspects of the present invention may be an acid containing an anion effective to act as an initiator for the polymerisation process. Preferably, therefore, the acid may be an acid containing an anion selected from $OC(O)R^x$, $OSO_2R^x$, $OSO(R^x)_2$, halide, nitrate, or carbonate. $R^x$ is independently hydrogen, or optionally substituted aliphatic, haloaliphatic, heteroaliphatic, alicyclic, heteroalicyclic, aryl, alkylaryl or heteroaryl. More preferably, the anion may be selected from $OC(O)R^x$. $R^x$ is independently hydrogen, optionally substituted aliphatic, haloaliphatic, aryl, heteroaryl, silyl, or alkylaryl. Exemplary options for the anion include $OCOCH_3$, $OCOCF_3$, $OSO_2C_7H_7$, $OSO(CH_3)_2$, Cl, Br, I, F. Most preferably, the acid may contain an anion selected from $OC(O)CH_3$, $OC(O)CH_2CH_3$, $OC(O)(CH_2)_2CH_3$, $OC(O)(CH_2)_3CH_3$, $OC(O)(CH_2)_4CH_3$, $OC(O)(CH_2)_5CH_3$, $OC(O)(CH_2)_6CH_3$, $OC(O)C(CH_3)_3$. $OC(O)C_6H_5$, $OC(O)CCl_3$ and/or $OC(O)CF_3$, most preferably $OC(O)CH_3$.

Preferably, the acid of the first and sixth aspects of the present invention may be selected from a sulfonic acid, a phosphoric acid, an organic acid, such as a carboxylic acid or a combination of any such acids. More preferably, the acid may be a carboxylic acid. The carboxylic acid may be any suitable carboxylic acid. Preferably, the acid may be a functionalised organic acid, wherein a functionalised organic acid is an organic acid having one or more other functional groups in addition to the acid group effective to form a stable bond or interaction with one or more of the metal centres of the catalyst. The one or more other functional groups may be any suitable group effective to form a stable bond with one or more of the metal centres of the catalyst. For example, the functional groups may be selected from —OH, —SO$_3$H, —P(O)(OH)$_2$, —N(R$^9$)$_2$ or —COOH, wherein $R^9$ may independently be selected from hydrogen, an aliphatic, heteroaliphatic, alicyclic, heteroalicyclic, aryl or heteroaryl group. More preferably the acid may be a functionalised carboxylic acid comprising one or more other functional groups effective to form a stable bond or interaction with one or more of the metal centres of the catalyst such as those detailed above. More preferably, the acid may be a functionalised carboxylic acid comprising one or more further —COOH groups and one or more —OH groups or may be a multi-functional carboxylic acid comprising two or more —COOH groups. Most preferably, the acid may be a multi-functional carboxylic acid, such as, for example, a dicarboxylic acid, tricarboxylic acid or salicylic acid.

Advantageously, the carboxylic acids can be used to deactivate the catalyst and/or stabilise the polymer products in the processes of the present invention in lower amounts than would typically be expected. For example, substantially stoichiometric amounts may be used.

When the acid is a carboxylic acid, the carboxylic acid may be an optionally substituted $C_1$-$C_{20}$ alkyl or an optionally substituted $C_5$-$C_2$ aryl carboxylic acid, preferably an optionally substituted $C_1$-$C_{10}$ alkyl or an optionally substituted $C_6$-$C_{12}$ aryl carboxylic acid, more preferably an optionally substituted $C_1$-$C_6$ alkyl or an optionally substituted $C_6$ aryl carboxylic acid, more preferably an optionally substituted $C_1$-$C_4$ alkyl or an optionally substituted $C_6$ aryl carboxylic acid. Most preferably, the carboxylic acid may be formic acid, acetic acid, propanoic acid, butanoic acid, pentanoic acid, hexanoic acid, stearic acid, pivalic acid, chloroacetic acid, dichloroacetic acid, trichloroacetic acid, trifluoroacetic acid, 1-adamantanecarboxylic acid, benzoic acid, and/or salicylic acid. It will be appreciated by a person skilled in the art that, for example, salicylic acid is also a functional carboxylic acid by virtue of the fact that it has a —COOH group and an —OH group.

When the acid is a dicarboxylic acid, the dicarboxylic acid may be an optionally substituted $C_0$-$C_{20}$ alkyl or an optionally substituted $C_6$-$C_{20}$ aryl dicarboxylic acid, preferably an optionally substituted $C_0$-$C_{10}$ alkyl or an optionally substituted $C_6$-$C_{12}$ aryl dicarboxylic acid, more preferably an optionally substituted $C_0$-$C_6$ alkyl or an optionally substituted $C_6$ aryl dicarboxylic acid, more preferably an optionally substituted $C_0$-$C_4$ alkyl or an optionally substituted $C_6$ aryl dicarboxylic acid. Most preferably, the dicarboxylic acid may be oxalic acid, malonic acid, succinic acid, glutaric acid, adipic acid, pimelic acid, suberic acid, azelaic acid, sebacic acid, maleic acid, fumaric acid, glutaconic acid, aspartic acid, tartaric acid, glutamic acid, phthalic acid, isophthalic acid, terephthalic acid, diphenic acid or 2,6-naphthalenedicarboxylic acid.

When the acid is a tricarboxylic acid, the tricarboxylic acid may be an optionally substituted $C_0$-$C_{20}$ alkyl or an optionally substituted $C_6$-$C_{20}$ aryl tricarboxylic acid, preferably an optionally substituted $C_0$-$C_{10}$ alkyl or an optionally substituted $C_6$-$C_{12}$ aryl tricarboxylic acid, more preferably an optionally substituted $C_0$-$C_6$ alkyl or an optionally substituted $C_6$ aryl tricarboxylic acid, more preferably an optionally substituted $C_0$-$C_4$ alkyl or an optionally substituted $C_6$ aryl tricarboxylic acid. Most preferably, the dicarboxylic acid may be citric acid, isocitric acid, aconitic acid, propane-1,2,3-tricarboxylc acid or trimesic acid, even more preferably, the dicarboxylic acid may be citric acid, isocitric acid, aconitic acid or propane-1,2,3-tricarboxylic acid.

The processes of the second, fourth, seventh and ninth aspects of the present invention comprise the step of contacting the catalyst with an acid containing an anion effective to initiate the polymerisation process and effective to deactivate the catalyst.

Preferably, the acid of the second, fourth, seventh or ninth aspects of the present invention may be selected from a sulfonic acid, a phosphoric acid, an organic acid, such as a carboxylic acid or a combination of any such acids, on the proviso that the acid is effective to initiate the polymerisation process. The acid containing an anion effective to initiate the polymerisation process and effective to deactivate the catalyst is as defined above in relation to the first and sixth aspects of the present invention. Most preferably, therefore, the acid may contain an anion selected from $OC(O)CH_3$, $OC(O)CH_2CH_3$, $OC(O)(CH_2)_2CH_3$, $OC(O)(CH_2)_3CH_3$, $OC(O)(CH_2)$ $CH_3$, $OC(O)(CH_2)_5CH_3$, $OC(O)(CH_2)_6CH_3$, $OC(O)C(CH_3)_3$, $OC(O)C_6H_6$, $OC(O)CCl_3$ and/or $OC(O)CF_3$, most preferably $OC(O)CH_3$.

Preferably, the acid of the second, fourth, seventh or ninth aspects of the present invention is an organic acid, such as a carboxylic acid. Suitable carboxylic acids are as defined above in relation to the first and third aspects of the present invention.

The processes of the third, fifth, eighth and tenth aspects of the present invention comprise the step of contacting the catalyst with a carboxylic acid effective to deactivate the catalyst. Suitable carboxylic acids are as defined above in relation to the first and sixth aspects of the present invention. Preferably, the carboxylic acid is effective to initiate the polymerisation process and effective to deactivate the catalyst. Most preferably, therefore, the acid may contain an anion selected from $OC(O)CH_3$, $OC(O)CH_2CH_3$, $OC(O)(CH_2)_2CH_3$, $OC(O)(CH_2)_3CH_3$, $OC(O)(CH_2)_4CH_3$, $OC(O)(CH_2)_5CH_3$, $OC(O)(CH_2)_6CH_3$, $OC(O)C(CH_3)_3$. $OC(O)C_6H_5$, $OC(O)CCl_3$ and/or $OC(O)CF_3$, most preferably $OC(O)CH_3$.

Preferably, the acid of any aspect of the present invention has a pKa of at least 2.5, more preferably at least 3, most preferably at least 4.

For the avoidance of doubt, references to pKa herein are references to pKa measured in dilute aqueous solution at 25° C. unless indicated otherwise. For the purposes of the invention herein, the pKa may be determined by suitable techniques known to those skilled in the art.

The molar ratio of acid to catalyst in the methods according to the fourth, fifth, ninth and tenth aspects of the present invention, and preferably according to the first, second, third, sixth, seventh and/or eighth aspects of the present invention, is less than or equal to 20:1 of the acid to catalyst mole ratio for the deactivation reaction. Preferably, the molar ratio of acid to catalyst is less than or equal to 18:1, less than or equal to 16:1, less than or equal to 14:1, less than or equal to 12:1, less than or equal to 10:1, less than or equal to 5:1. less than or equal to 4:1, less than or equal to 3:1, less than or equal to 2:1 of the acid to catalyst mole ratio for the reaction. More preferably, the molar ratio of acid to catalyst is less than or equal to 10:1 of the acid to catalyst mole ratio of the reaction. Even more preferably, the molar ratio of acid to catalyst is less than or equal to 5:1 of the acid to catalyst mole ratio of the reaction. Most preferably, the molar ratio of acid to catalyst is 2:1 to 1:1 of the acid to catalyst mole ratio of the reaction.

For the avoidance of doubt, by 'acid to catalyst mole ratio for the reaction', and like terms as used herein, is meant the stoichiometric ratio of acid to catalyst for the reaction. The reaction may be depicted as per the following reaction scheme:

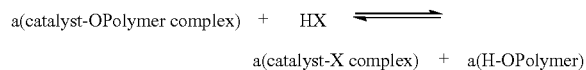

The number of polymer chains of the catalyst-OPolymer complex will typically depend on the number of X groups, i.e. initiating species, present in the catalyst at the beginning of the polymerisation reaction. This is because, typically, a polymer chain will grow from each initiating species present in the catalyst at the beginning of the polymerisation reaction. It will be understood, therefore, that the stoichiometric ratio of acid to catalyst for the reaction will typically depend upon the number of X groups of the catalyst at the beginning of the polymerisation reaction, and therefore the number of polymer chains present at the end of the polymerisation reaction, and the acid used. For example, when the acid is a monobasic acid, twice as much acid will be required to deactivate a metal complex catalyst having two X groups present at the beginning of the polymerisation reaction compared to a metal complex catalyst having one X group present at the beginning of the polymerisation reaction (by virtue of the fact that the metal complex catalyst has two initiating species present at the beginning of the polymerisation reaction and, therefore, typically two polymer chains present at the end of the polymerisation reaction, compared to a metal complex catalyst which has one initiating species present at the beginning of the polymerisation reaction and, therefore, typically one polymer chain present at the end of the polymerisation reaction). For example, when the catalyst is a metal complex catalyst having two X groups present at the beginning of the polymerisation reaction, twice as much monobasic acid will be required to deactivate the catalyst compared to a dibasic acid (by virtue of the fact that the dibasic acid has two acid groups compared to monobasic acid which has a single acid group). It will be understood that the reaction may proceed to completion or may be in equilibrium. However, in either case the stoichiometry of the reaction is the same. However, it will be appreciated by a person skilled in the art that a polymer chain does not necessarily grow from all X groups, i.e. initiating species, present in the catalyst at the beginning of the polymerisation reaction. In this case, the stoichiometric ratio of acid to catalyst for the reaction will depend upon the number of polymer chains present at the end of the polymerisation reaction and the acid used.

Advantageously, the use of organic acids can be used to deactivate the catalyst and/or stabilise the polymer products in the processes of the present invention in lower amounts than would typically be expected. For example, substantially stoichiometric amounts may be used. It is a further advantage that catalyst can be deactivated with organic acid. Advantageously, it has surprisingly been found that the catalyst can be deactivated by contact with an acid containing an anion that is an initiating species for the polymerisation process of the present invention, such as, for example, an acid containing an $O(C)OR^X$ anion (for example, acetic acid).

The acid of the methods of the present invention may be in any suitable form. For example, the acid may be in the solid and/or liquid state. In certain embodiments, the acid may be present on a solid support, such as, for example, an acidic ion exchange resin. The acid may be contacted with the catalyst by any suitable method. For example solid and/or liquid acid may be added directly to the polymerisation reaction medium. For example, when the acid is present on a solid support, the solid support may be added directly to the polymerisation reaction mixture or the polymerisation reaction mixture may be passed over and/or through the solid support.

Removal of Catalyst

The processes of the sixth to tenth aspects of the present invention comprise the step of removing the deactivated catalyst from the polymer product by contacting said deactivated catalyst and polymer product with a solid phase and/or by precipitation. The mixture containing the deactivated catalyst and polymer product, which will typically also contain the acid added to the process to quench the catalyst and/or other by-products, will herein be referred to as the 'crude polymer product'.

When the acid used to deactivate the catalyst is present on a solid support, the solid support (with the acid thereon) may also act as the solid phase for the step of removing the deactivated catalyst from the polymer product. In certain embodiments, therefore, the step of contacting the catalyst with an acid effective to deactivate the catalyst (i) may be performed simultaneously with the step of contacting the deactivated catalyst and polymer product with a solid phase (ii). It will be appreciated by a person skilled in the art that upon contact with the acid the catalyst becomes deactivated and, when the acid is present on a solid support, the deactivated catalyst is simultaneously deactivated and contacted with a solid support. Advantageously, when the acid used to deactivate the catalyst is present on a solid support, the deactivation step and removal step can be performed simultaneously.

The deactivated catalyst may be removed from the crude polymer product by contacting said deactivated catalyst and polymer product with a solid phase effective to remove the deactivated catalyst from the polymer product. The solid phase may be any suitable solid phase. Preferably, the solid phase may be an inorganic solid phase or an ion exchange resin, more preferably, an inorganic solid phase or an acidic ion exchange resin.

The inorganic solid phase may be any suitable inorganic solid phase. For example, the inorganic solid phase may be silica, alumina, zirconia, molecular sieves, zeolites, clays or derivatives or combinations thereof. Preferably, the inorganic solid phase may be silica, magnesium silicate or alumina. Preferably, the inorganic solid phase may be surface functionalised with functional groups effective to form a stable bond with one or more of the metal centres of the deactivated catalyst, such as, for example, with hydroxyl, carboxylic acid, carboxylate, sulphonic acid, sulphonate, phosphate, thiol and or anime functional groups More preferably, the inorganic solid phase may comprise sulphonic acid, sulphonate, carboxylic acid and/or carboxylate functional groups, most preferably sulphonate or carboxylic acid functional groups.

The acidic ion exchange resin may be in any suitable form. For example, the acidic ion exchange resin may be a gel or a macroreticular resin. Preferably, the acidic ion exchange resin may be a macroreticular resin. Preferably, the acidic ion exchange resin comprises a macroporous, polymer-based resin. For example, the acidic ion exchange resin may comprise a resin in the form of polymer beads, such as a crosslinked polystyrene resin in spherical bead form.

Preferably, the acidic ion exchange resin may be in the form of polymer beads ('free' polymer beads), which may optionally be in the form of a packed resin bed. When the acidic ion exchange resin is in the form of 'free' polymer beads, the crude polymer product is typically contacted with the ion exchange resin by mixing the 'free' polymer beads into the crude polymer product. When the acidic ion exchange resin is in the form of polymer beads in a packed rein bed, the crude polymer product is typically contacted with the ion exchange resin by passing a volume of the crude polymer product through the packed resin bed.

The acidic ion exchange material may be strongly or weakly acidic. For example, the acidic ion exchange resin may be a strongly acidic resin, such as a phosphonic acid ion exchange resin or a sulphonic acid ion exchange resin. Preferably, the strongly acidic resin is a sulphonic acid ion exchange resin. Alternatively, the acidic ion exchange resin may be a weakly acidic resin, such as an ion exchange resin comprising —COOH functional groups. Preferably, the weakly acidic resin may comprise iminodiacetic acid groups, more preferably the weakly acidic resin may be a polymethacrylic acid resin or iminodiacetic acid chelating cation exchange resin.

Preferred acidic ion exchange resins include those sold under the trade name Amberlite (registered trade mark), such as, for example, Amberlite IRC 748, those sold under the trade name Amberlyst (registered trade mark), such as, for example, Amberlyst 15, and those sold under the trade name Dowex (registered trade mark), such as, for example, Dowex Marathon MSC.

The crude polymer product may be contacted with the solid phase for any suitable amount of time. Preferably, the crude polymer product may be contacted with the solid phase for at least 1 minute, such as at least 10 minutes, such as at least 30 minutes, such as at least 1 hour, 2 hours, 3 hours, 4 hours, 5 hours, 6 hours, 12 hours, 18 hours, 24 hours, 36 hours, 48 hours or 72 hours. For the avoidance of doubt, the length of time for which the crude polymer product is contacted with the solid phase is equivalent to the residence time of the crude polymer product with the solid phase.

It will be understood by a person skilled in the art that upon contact of the crude polymer product with the solid phase the deactivated catalyst typically binds to the solid phase such that it is removed from the liquid phase which comprises the polymer product. Typically, following contact of the solid phase with the crude polymer product as described above, the solid phase is removed from the liquid phase. The solid phase may be removed from the liquid phase by any suitable method. For example, when the solid phase is in the form of polymer beads, the solid phase is preferably removed by filtration. For example, when the solid phase is in the form of a packed resin bed, the liquid phase may be removed from the solid phase by suitable washing steps. Suitable washing steps will be well known to a person skilled in the art.

Advantageously, it has been found that the use of organic carboxylic acids and/or organic dicarboxylic acids to deactivate the catalyst in the processes of the present invention results in easier removal of the deactivated catalysts from the crude polymer product compared to, for example, when sulphonic acids are used to deactivate the catalyst.

Alternatively, the deactivated catalyst may be removed from the polymer product by precipitation. Precipitation may be performed by any suitable method. For example, the deactivated catalyst may be caused to precipitate from the crude polymer product by the addition of one or more precipitant or may precipitate automatically (i.e. without the addition of one or more precipitant). For example, the deactivated catalyst may be caused to precipitate from the crude polymer product by the addition of one or more acid(s) effective to cause precipitation of the deactivated catalyst. The acid effective to cause precipitation of the deactivated catalyst may be any suitable acid. Preferably, the acid effective to cause precipitation of the deactivated catalyst may be a carboxylic acid, more preferably a functional or multi-functional carboxylic acid (i.e. a carboxylic acid having one or more further functional groups, wherein the further functional groups may be selected from, for example, —OH, —SO$_3$H, —P(O)(OH)$_2$, —N(R$^9$)$_2$ or —COOH, wherein R$^9$ may independently be selected from hydrogen, an aliphatic, heteroaliphatic, alicyclic, heteroalicyclic, aryl or heteroaryl group, most preferably a dicarboxylic acid or salicylic acid. It will be appreciated that the acid effective to cause precipitation of the deactivated catalyst may be the same as or different from the acid effective to deactivate the catalyst. Alternatively, the deactivated catalyst may precipitate from the crude polymer product automatically by allowing the crude polymer product to stand for a suitable period of time. The crude polymer product may be allowed to stand for any suitable amount of time. Preferably, the crude polymer product may be allowed to stand for at least 1 hour, such as at least 2 hours, such as at least 4 hours, such as at least 6 hours, such as at least 8 hours, such as at least 12 hours, such as at least 18 hours, such as at least 24 hours.

Heat may be applied to any of the precipitation methods described above. Heat may be applied for any suitable amount of time. For example, heat may be applied for up to 1 minute, such as up 2 minutes, such as up to 5 minutes, such as up to 10 minutes, such as up to 15 minutes, such as up to 30 minutes, such as up to 1 hour, such as up to 2 hours, such as up to 5 hours. Heat may be applied to any suitable temperature. For example, heat may be applied to a temperature of at least 30° C., such as at least 40° C., such as at least 50° C., such as at least 60° C., such as at least 70° C., such as at least 80° C., such as at least 90° C., such as at least 100° C.

The precipitated deactivated catalyst may be removed from the crude polymer product by any suitable method. Preferably, the precipitated deactivated catalyst may be removed from the crude polymer product by filtration or centrifugation, more preferably by filtration, optionally followed by contact with a further solid phase, wherein the further solid phase is a defined above.

It has surprisingly and advantageously been found by the present inventors that the use of organic carboxylic acids, functionalised carboxylic acids including di or tricarboxylic acids to deactivate the catalyst in the processes of the present invention means that the deactivated catalysts are particularly suitable for removal by precipitation. Without being bound by theory, it is hypothesised that these bulky and/or multivalent organic acids are able to bind to vacant metal sites on the catalyst, possibly as aggregates, reducing their solubility.

Reactivation

The processes of the sixth, seventh, eighth, ninth and tenth aspects of the present invention comprise the step of optionally reactivating the catalyst by contacting the deactivated catalyst with a suitable anion. Preferably, the processes of the sixth, seventh, eighth, ninth and tenth aspects of the present invention comprise the step of reactivating the catalyst by contacting the deactivated catalyst with a suitable anion. However, it will be appreciated by a person skilled in the art that a reactivation step may not be required if the catalyst is removed from the crude polymer product in a form that is substantially reactivated, i.e. in a form that is effective to catalyse the processes of the present invention.

Preferably, when the deactivated catalyst is removed from the polymer product by contacting said deactivated catalyst and polymer product with a solid phase, the anion is capable of displacing the catalyst from the solid phase.

The anion may be any suitable anion. Preferably, the anion may be derived from an acid. Preferably, the anion may be derived from an acid selected from nitric acid; sulphuric acid; organic acids such as optionally substituted $C_{0-20}$ alkyl carboxylic acids and optionally substituted $C_{6-20}$ aryl carboxylic acids; sulphonic acids such as methane sulphonic acid, chlorosulphonic acid, fluorosulphonic acid, trifluoromethane sulphonic acid, benzene sulphonic acid, naphthalene sulphonic acid, toluene sulphonic acid, e.g. p-toluene sulphonic acid, t-butyl sulphonic acid, and 2-hydroxypropane sulphonic acid; perhalic acid such as perchloric acid; halogenated carboxylic acids such as trichloroacetic acid and trifluoroacetic acid; orthophosphoric acid; phosphonic acids such as benzenephosphonic acid; and acids derived from interactions between Lewis acids and Broensted acids; or metal salts of each of the aforementioned acids.

Preferably, the anion may be derived from carboxylic acids selected form optionally substituted $C_{0-20}$ alkyl carboxylic acids or optionally substituted $C_{6-20}$ aryl carboxylic acids, more preferably from optionally substituted $C_{0-10}$ alkyl carboxylic acids or optionally substituted $C_{6-12}$ aryl carboxylic acids, more preferably an optionally substituted $C_0$-$C_6$ alkyl carboxylic acids or an optionally substituted $C_6$ aryl carboxylic acids, more preferably an optionally substituted $C_0$-$C_4$ alkyl carboxylic acids or an optionally substituted $C_6$ aryl carboxylic acids. Most preferably, the anion may be derived from acetic acid, oxalic acid, salicylic acid, metal salts of acetic acid, oxalic acid and/or salicylic acid, or combinations thereof.

Preferably, the anion may be derived from functional carboxylic acids (as defined above), a metal salt of a functional carboxylic acid or combinations thereof, more preferably a functional carboxylic acid.

Preferably, the anion may be derived from an acid which has a pKa of at least 2.5, more preferably at least 3, most preferably at least 4. More preferably, the anion may be derived from a carboxylic acid having a pKa of at least 2.5, more preferably at least 3, most preferably at least 4. Most preferably, the anion may be derived from a monocarboxylic acid having a pKa of at least 2.5, more preferably at least 3, most preferably at least 4.

Preferably, the anion is able to act as an initiating species for the processes of the present invention. Preferably, therefore, the anion may be selected from $OC(O)R^x$, $OSO_2R^x$, $OSO(R^x)_2$, $OR^x$, halide, nitrate, hydroxyl, carbonate, amido or optionally substituted aliphatic, heteroaliphatic (for example silyl), alicyclic, heteroalicyclic, aryl or heteroaryl. $R_x$ is independently hydrogen, or optionally substituted aliphatic, haloaliphatic, heteroaliphatic, alicyclic, heteroalicyclic, aryl, alkylaryl or heteroaryl. More preferably, the anion may be selected from $OC(O)R^x$ or $OR^x$. $R^x$ is independently hydrogen, optionally substituted aliphatic, haloaliphatic, aryl, heteroaryl, silyl, or alkylaryl. Exemplary options for the anion include $OCOCH_3$, $OCOCF_3$, $OSO_2C_7H_7$, $OSO(CH_3)_2$, Et, Me, PhOEt, OMe, OiPr, OtBu, Cl, Br, I, F, $N(iPr)_2$ or $N(SiMe_3)_2$. Preferably, the anion may be $OC(O)CH_3$, $OC(O)CH_2CH_3$, $OC(O)(CH_2)_2CH_3$, $OC(O)(CH_2)_3CH_3$, $OC(O)(CH_2)_4CH_3$, $OC(O)(CH_2)_5CH_3$, $OC(O)(CH_2)_6CH_3$, $OC(O)C(CH_3)_3$, $OC(O)C_6H_5$, $OC(O)CCl_3$ and/or $OC(O)CF_3$, more preferably $OC(O)CH_3$.

More preferably, the anion may be selected from an anion derived from a monocarboxylic acid, such as a monocarboxylic acid having a pKa of at least 2.5, more preferably at least 3, most preferably at least 4, and/or from an anion that is able to act as an initiating species for the processes of the present invention.

Most preferably, the anions is acetic acid and/or a metal salt of acetic acid.

Advantageously, when the anion is able to act as an initiating species for the processes of the present invention the reactivated catalyst is able to be used directly in a further polymer polymerisation process. For example, if the anion is derived from acetic acid, the $OC(O)CH_3$ anion of the acetic acid is able to act as an initiating species in a further polymerisation process and, as such, the reactivated catalyst can be used directly in said further polymerisation process. Advantageously, this means that no further purification steps, i.e. to further purify the reactivated catalyst, are required.

Definitions

For the purpose of the present invention, an aliphatic group is a hydrocarbon moiety that may be straight chain or branched and may be completely saturated, or contain one or more units of unsaturation, but which is not aromatic. The term "unsaturated" means a moiety that has one or more double and/or triple bonds. The term "aliphatic" is therefore intended to encompass alkyl, alkenyl or alkynyl groups including multivalent equivalents such as alkylene, alkenylene and alkynylene, and combinations thereof. An aliphatic group is preferably a $C_{1-20}$ aliphatic group, that is, an aliphatic group with 1, 2, 3, 4, 5, 6, 7, 8, 9, 10, 11, 12, 13, 14, 15, 16, 17, 18, 19 or 20 carbon atoms. Preferably, an aliphatic group is a $C_{1-15}$ aliphatic, more preferably a $C_{1-12}$ aliphatic, more preferably a $C_{1-10}$ aliphatic, even more preferably a $C_{1-8}$ aliphatic, such as a $C_{1-6}$ aliphatic group.

An alkyl group is preferably a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Preferably, an alkyl group is a $C_{1-15}$ alkyl, preferably a $C_{1-12}$ alkyl, more preferably a $C_{1-10}$ alkyl, even more preferably a $C_{1-8}$ alkyl, even more preferably a $C_{1-6}$ alkyl group. Specifically, examples of "$C_{1-20}$ alkyl group" include methyl group, ethyl group, n-propyl group, iso-propyl group, n-butyl group, iso-butyl group, sec-butyl group, tert-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

Alkenyl and alkynyl groups are preferably "$C_{2-20}$ alkenyl" and "$C_{2-20}$ alkynyl", more preferably "$C_{2-15}$ alkenyl" and "$C_{2-15}$ alkynyl", even more preferably "$C_{2-12}$ alkenyl" and "$C_{2-12}$ alkynyl", even more preferably "$C_{2-10}$ alkenyl" and "$C_{2-10}$ alkynyl", even more preferably "$C_{2-8}$ alkenyl" and "$C_{2-8}$ alkynyl", most preferably "$C_{2-6}$ alkenyl" and "$C_{2-6}$ alkynyl" groups, respectively.

Alkylene is divalent but otherwise defined as an Alkyl group above. Likewise, alkenylene and alkynylene are defined as divalent equivalents of alkenyl and alkynyl above.

A heteroaliphatic group (including heteroalkyl, heteroalkenyl and heteroalkynyl) is an aliphatic group as described above, which additionally contains one or more heteroatoms. Heteroaliphatic groups therefore preferably contain from 2 to 21 atoms, preferably from 2 to 16 atoms, more preferably from 2 to 13 atoms, more preferably from 2 to 11 atoms, more preferably from 2 to 9 atoms, even more preferably from 2 to 7 atoms, wherein at least one atom is a carbon atom. Particularly preferred heteroatoms are selected from O, S, N, P and Si. When heteroaliphatic groups have two or more heteroatoms, the heteroatoms may be the same or different.

Heteroalkylene is divalent but otherwise defined as an heteroalkyl group above. Likewise, heteroalkenylene and heteroalkynylene are defined as divalent equivalents of heteroalkenyl and heteroalkynyl above. An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms, even more preferably from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —CH$_2$-cyclohexyl. Specifically, examples of the $C_{3-20}$ cycloalkyl group include cyclopropyl, cyclobutyl, cyclopentyl, cyclohexyl, cycloheptyl, adamantyl and cyclooctyl.

A heteroalicyclic group is an alicyclic group as defined above which has, in addition to carbon atoms, one or more ring heteroatoms, which are preferably selected from O, S, N, P and Si. Heteroalicyclic groups preferably contain from one to four heteroatoms, which may be the same or different. Heteroalicyclic groups preferably contain from 5 to 20 atoms, more preferably from to 14 atoms, even more preferably from 5 to 12 atoms.

An aryl group is a monocyclic or polycyclic ring system having from 5 to 20 carbon atoms. An aryl group is preferably a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, naphthyl group or azulenyl group and the like. It should be noted that condensed rings such as indan and tetrahydro naphthalene are also included in the aryl group.

A heteroaryl group is an aryl group having, in addition to carbon atoms, from one to four ring heteroatoms which are preferably selected from O, S, N, P and Si. A heteroaryl group preferably has from 5 to 20, more preferably from 5 to 14 ring atoms. Specifically, examples of a heteroaryl group include pyridine, imidazole, methylimidazole and dimethylaminopyridine.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

Arylene is divalent but otherwise defined as an aryl group above. Likewise heteroarylene is defined as divalent equivalents of heteroaryl and cycloalkylene as divalent equivalents of alicyclic and heteroalicyclic above.

The term "halide" or "halogen" are used interchangeably and, as used herein mean a fluorine atom, a chlorine atom, a bromine atom, an iodine atom and the like, preferably a fluorine atom, a bromine atom or a chlorine atom, and more preferably a fluorine atom.

A haloalkyl group is preferably a "$C_{1-20}$ haloalkyl group", more preferably a "$C_{1-15}$ haloalkyl group", more preferably a "$C_{1-12}$ haloalkyl group", more preferably a "$C_{1-10}$ haloalkyl group", even more preferably a "$C_{1-8}$ haloalkyl group", even more preferably a "$C_{1-6}$ haloalkyl group" and is a $C_{1-20}$ alkyl, a $C_{1-15}$ alkyl, a $C_{1-12}$ alkyl, a $C_{1-10}$ alkyl, a $C_{1-8}$ alkyl, or a $C_{1-6}$ alkyl group, respectively, as described above substituted with at least one halogen atom, preferably 1, 2 or 3 halogen atom(s). Specifically, examples of "$C_{1-20}$ haloalkyl group" include fluoromethyl group, difluoromethyl group, trifluoromethyl group, fluoroethyl group, difluroethyl group, trifluoroethyl group, chloromethyl group, bromomethyl group, iodomethyl group and the like.

An alkoxy group is preferably a "$C_{1-20}$ alkoxy group", more preferably a "$C_{1-15}$ alkoxy group", more preferably a "$C_{1-12}$ alkoxy group", more preferably a "$C_{1-10}$ alkoxy group", even more preferably a "$C_{1-8}$ alkoxy group", even more preferably a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$ alkoxy group" include methoxy group, ethoxy group, n-propoxy group, iso-propoxy group, n-butoxy group, iso-butoxy group, secbutoxy group, tert-butoxy group, n-pentyloxy group, isopentyloxy group, sec-pentyloxy group, n-hexyloxy group, iso-hexyloxy group, n-hexyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxy group, 1,1,2-trimethylpropoxy group, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An aryloxy group is preferably a "$C_{5-20}$ aryloxy group", more preferably a "$C_{6-12}$ aryloxy group", even more preferably a "$C_{6-12}$ aryloxy group" and is an oxy group that is bonded to the previously defined $C_{5-20}$ aryl, $C_{6-12}$ aryl, or $C_{6-10}$ aryl group respectively.

An alkylthio group is preferably a "1-20 alkylthio group", more preferably a "$C_{1-15}$ alkylthio group", more preferably a "$C_{1-12}$ alkylthio group", more preferably a "$C_{1-10}$ alkylthio group", even more preferably a "$C_{1-8}$ alkylthio group", even more preferably a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-6}$ alkyl, or $C_{1-6}$ alkyl group respectively. An alkylthio group utilised as a substituent as defined herein, may be connected via either a carbon atom of the alkyl group as defined above or the sulphur atom of the thio group. An arylthio group is preferably a "$C_{5-20}$ arylthio group", more preferably a "$C_{6-12}$ arylthio group", even more preferably a "$C_{6-10}$ arylthio group" and is an thio (—S—) group that is bonded to the previously defined $C_{5-20}$ aryl, $C_{6-12}$ aryl, or $C_{6-10}$ aryl group respectively.

An alkylaryl group is preferably a "$C_{6-12}$ aryl $C_{1-20}$ alkyl group", more preferably a preferably a "$C_{6-12}$ aryl $C_{1-16}$ alkyl group", even more preferably a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, preferably, the alkylaryl group is —CH$_2$-Ph or —CH$_2$CH$_2$-Ph. An alkylaryl group can also be referred to as "aralkyl".

A silyl ether group is preferably a group OSi(R$^7$)$_3$ wherein each R$^7$ can be independently an aliphatic, heteroaliphatic, alicyclic, heteroalicyclic, aryl or heteroaryl group as defined above. In certain embodiments, each R$^7$ can be independently an unsubstituted aliphatic, alicyclic or aryl. Preferably, each R$^7$ is an optionally substituted phenyl or optionally substituted alkyl group selected from methyl, ethyl, propyl or butyl (such as n-butyl or tert-butyl (tBu)). Exemplary silyl ether groups include OSi(CH$_3$)$_3$, OSi(C$_2$H$_5$)$_3$, OSi(C$_6$H$_5$)$_3$, OSi(CH$_3$)$_2$C(CH$_3$)$_3$, OSi(tBu)$_3$ and OSi(C$_6$H$_5$)$_2$C(CH$_3$)$_3$.

A nitrile group (also referred to as a cyano group) is a group CN.

An imine group is a group —CR$^8$NR$^8$, preferably a group —CHNR$^8$ wherein R$^8$ is an aliphatic, heteroaliphatic, alicyclic, heteroalicyclic, aryl or heteroaryl group as defined above. In certain embodiments, R$^8$ is unsubstituted aliphatic, alicyclic or aryl. Preferably R$^8$ is an alkyl group selected from methyl, ethyl or propyl.

An amido group is preferably-NR$^9$C(O)R$^9$ or —C(O)—NR$^9$(R$^9$) wherein R$^9$ can be hydrogen, an aliphatic, heteroaliphatic, alicyclic, heteroalicyclic, aryl or heteroaryl group as defined above. In certain embodiments, R$^9$ is unsubstituted aliphatic, alicyclic or aryl. Preferably R$^9$ is hydrogen, methyl, ethyl, propyl or phenyl. The amido group may be terminated by hydrogen, an aliphatic, heteroaliphatic, alicyclic, heteroalicyclic, aryl or heteroaryl group.

An ester group is preferably —OC(O)R$^{10}$ or —C(O)OR$^{10}$ wherein R$^{10}$ can be hydrogen, an aliphatic, heteroaliphatic, alicyclic, heteroalicyclic, aryl or heteroaryl group as defined above. In certain embodiments, R$^{10}$ is unsubstituted aliphatic, alicyclic or aryl. Preferably R$^{10}$ is hydrogen, methyl, ethyl, propyl or phenyl. The ester group may be terminated by hydrogen, an aliphatic, heteroaliphatic, alicycdic, heteroalicyclic, aryl or heteroaryl group.

An acetylide group contains a triple bond —C≡C—R$^{11}$, preferably wherein R$^{11}$ can be hydrogen, an aliphatic, heteroaliphatic, alicyclic, heteroalicyclic, aryl or heteroaryl group as defined above. For the purposes of the invention when R$^{11}$ is alkyl, the triple bond can be present at any position along the alkyl chain. In certain embodiments, R$^{11}$ is unsubstituted aliphatic, alicyclic or aryl. Preferably R$^{11}$ is methyl, ethyl, propyl or phenyl.

An amino group is preferably —NH$_2$, —NHR$^{12}$ or —N(R$^{12}$)$_2$ wherein R$^{12}$ can be an aliphatic, heteroaliphatic, alicyclic, heteroalicyclic, a silyl group, aryl or heteroaryl group as defined above. It will be appreciated that when the amino group is N(R$^{12}$)$_2$, each R$^{12}$ group can be the same or different. In certain embodiments, each R$^{19}$ is independently an unsubstituted aliphatic, alicyclic, silyl or aryl. Preferably R$^{12}$ is methyl, ethyl, propyl, butyl, Si(CH$_3$)$_3$ or phenyl.

An ether group is preferably —OR$^{15}$ or —R$^{16}$OR$^{17}$ wherein R$^{15}$, R$^{16}$ and R$^{17}$ can be an aliphatic, heteroaliphatic, alicyclic, heteroalicyclic, aryl or heteroaryl group as defined above. In certain embodiments, R$^{15}$, R$^{16}$ and R$^{17}$ are each unsubstituted aliphatic, alicyclic or aryl. Preferably, R$^{15}$, R$^{16}$ and R$^{17}$ are each methyl, ethyl, propyl or phenyl. The ether group may be terminated by hydrogen, an aliphatic, heteroaliphatic, alicyclic, heteroalicyclic, aryl or heteroaryl group.

Groups R$^{13}$, R$^{14}$, R$^{18}$, R$^{19}$, R$^{20}$ and R$^{21}$ can be a hydrogen an aliphatic, heteroaliphatic, alicyclic, heteroalicyclic, aryl or heteroaryl group as defined above. In certain embodiments, R$^{13}$, R$^{14}$, R$^{18}$, R$^{19}$, R$^{20}$ and R$^{21}$ are each unsubstituted aliphatic, alicyclic or aryl. Preferably, R$^{13}$, R$^{14}$, R$^{18}$, R$^{19}$, R$^{20}$ and R$^{21}$ are each hydrogen, methyl, ethyl, propyl or phenyl.

A sulfoxide is preferably —S(O)R$^{22}$ and a sulfonyl group is preferably —S(O)$_2$R$^{22}$ wherein R$^{22}$ can be hydrogen, an aliphatic, heteroaliphatic, alicyclic, heteroalicyclic, aryl or heteroaryl group as defined above. In certain embodiments, R$^{22}$ is unsubstituted aliphatic, alicyclic or aryl. Preferably R$^{22}$ is hydrogen, methyl, ethyl, propyl or phenyl.

A sulfinate group is preferably —OSOR$^{23}$ wherein R$^{23}$ can be hydrogen, an aliphatic, heteroaliphatic, haloaliphatic, alicyclic, heteroalicyclic, aryl or heteroaryl group as defined above. In certain embodiments, R$^{23}$ is unsubstituted aliphatic, alicyclic or aryl. Preferably R$^{23}$ is hydrogen, methyl, ethyl, propyl or phenyl.

By the term "phosphonium" as used herein is meant the cation comprising the formula P(R$^{24}$)$_4^+$, typically PH$_4^+$ wherein R$^{24}$ can be a hydrogen an aliphatic, heteroaliphatic, alicyclic, heteroalicyclic, aryl or heteroaryl group as defined above. In certain embodiments R$^{24}$ is unsubstituted aliphatic, alicyclic or aryl. Preferably, R$^{24}$ is hydrogen, methyl, ethyl, propyl or phenyl.

A silyl group is preferably a group —Si(R$^{25}$)$_3$, wherein each R$^{25}$ can be independently an aliphatic, heteroaliphatic, alicyclic, heteroalicyclic, aryl or heteroaryl group as defined above. In certain embodiments, each $R^{25}$ is independently an unsubstituted aliphatic, alicyclic or aryl. Preferably, each $R^{25}$ is an alkyl group selected from methyl, ethyl or propyl.

Any of the aliphatic (including alkyl, alkenyl, alkynyl, alkylene, alkenylene and alkynylene), heteroaliphatic, (including heteroalkyl, heteroalkenyl, heteroalkynyl, heteroalkylene, heteroalkenylene and heteroalkynylene), alicyclic, cycloalkylene, heteroalicyclic, aryl, arylene, heteroaryl, heteroarylene haloalkyl, alkoxy, aryloxy, alkylthio, arylthio, alkylaryl, silyl, silyl ether, ester, sulfoxide, sulfonyl, imine, acetylide, amino, sulfonate or amidogroups wherever mentioned above, particularly when mentioned as optionally substituted above may be optionally substituted by halogen, hydroxy, nitro, alkoxy, aryloxy, alkylthio, arylthio, heteroaryloxy, alkylaryl, amino, amido, imine, nitrile, silyl, silyl ether, ester, sulfoxide, sulfonyl, acetylide, sulfonate or optionally substituted aliphatic, heteroaliphatic, alicyclic, heteroalicyclic, aryl or heteroaryl groups (for example, optionally substituted by halogen, hydroxy, nitro, alkoxy, aryloxy, alkylthio, arylthio, amino, imine, nitrile, silyl, sulfoxide, sulfonyl, sulfonate or acetylide).

When we use the term "optionally substituted" at the start of a list of chemical species we mean that all of the species in the list which can be substituted may be optionally substituted; that is we do not mean that only the first species mentioned in the list may be optionally substituted. The term optionally substituted when used herein means unsubstituted or substituted with a suitable group. Suitable groups will be known to the skilled person. Generally, such groups would not significantly detrimentally affect the function of the substituted group or of a larger moiety to which the substituted group is attached. In some cases, the skilled person would expect the substituent to improve the function of the substituted group.

All of the features contained herein may be combined with any of the above aspects and in any combination.

Embodiments of the invention will now be described with reference to the following non-limiting examples.

EXAMPLES

Catalysts

Catalysts 1 and 2 as used in the examples are:

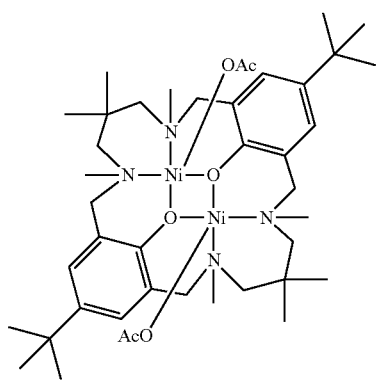

Catalyst 1

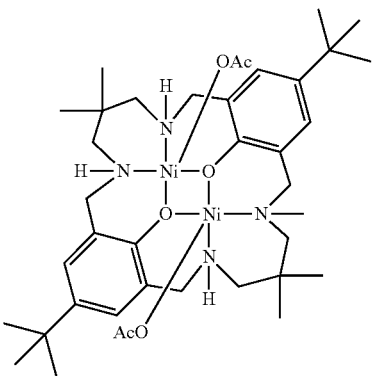

Catalyst 2

Example 1: Stabilisation of an Mn 2000 PPC Diol with a Variety of Acids

From 600 g of a crude reactor product containing about 78 wt % polypropylene carbonate polyol (PCC polyol) of Mn 2243 gmol$^{-1}$ (GPC), 20 wt % propylene oxide and about 4.8 g of catalyst 1 was drawn five different aliquots of approximately 70-80 g each. The crude PPC polyol contained about 2.6% cyclic carbonate (molar). One aliquot was left untreated, and to the other four was added a different acid, in 2.2 molar equivalents to the molar amount of catalyst present in each sample (1.1 eq. per metal site on the catalyst). The five samples were analysed by 1H NMR and GPC initially, and again after 13 days, the results are summarised in Table 1.

TABLE 1

| Acid | % cyclic | Mn (PDI) |
| --- | --- | --- |
| Crude (day 1) | 2.6% | 2243 (1.65) |
| No acid | 67.8% | 1065 (1.21) |
| p-toluene sulfonic acid (pTSA) | 2.6% | 2234 (1.05) |
| Oxalic acid | 2.6% | 2243 (1.05) |
| Acetic acid | 2.6% | 2234 (1.05) |
| Salicylic acid | 2.6% | 2235 (1.05) |

It can be clearly seen from the data that after 13 days the crude material without acid stabilisation had degraded significantly from 2.6 to almost 70% cyclic carbonate, whilst the molecular number halved and the dispersity significantly increased. It was surprisingly shown that 2.2 equivalents of each of the acids tested (just 1.1 equivalent to each metal centre) effectively stabilised the PPC polyol.

Example 2: Stabilisation of an Mn 1600 PPC Diol with a Variety of Acids

Example 1 was repeated, except a 30 g polymer mixture containing: 60% PPC polyol product with an Mn of 1574 g/mol (containing 66% PPC and 34% cyclic carbonate), 40% propylene oxide and 0.16 g catalyst 2 was split into about 4 g portions. One sample was not altered, but to the others were added different acids in 2.5 molar equivalents to the molar amount of catalyst present in each sample (1.25 eq. per metal site on the catalyst). The samples were analysed after 3 days and compared with the crude material. The results are shown in Table 2.

TABLE 2

| Acid | % cyclic | Mn |
| --- | --- | --- |
| Crude (day 1) | 34% | 1574 |
| No acid | 90% | 809 |
| p-toluene sulfonic acid (pTSA) | 36% | 1526 |
| Phosphoric acid | 34% | 1589 |
| Oxalic acid | 34% | 1578 |

This demonstrates that the different acids stabilise the mixture in a similar manner as the selectivities and molecular weights remain substantially unchanged.

Example 3: Stabilisation of an Mn 900 PPC Diol with a Variety of Acids

Example 1 was repeated, except the PPC polyol had an Mn of 922 g/mol and 5.9% cyclic carbonate (molar). The sample had 11 aliquots of approximately 40 g taken out. One sample was unaltered but the remaining samples had a number of different acids added in different quantities in comparison to the catalyst. The results are shown in Table 3.

TABLE 3

| Acid | Eq. Acid | % cyclic | Mn |
| --- | --- | --- | --- |
| Crude (day 1) | N/A | 5.9% | 922 |
| No acid | N/A | 11.2% | 700 |
| pTSA | 1.2 | 9.3% | 940 |
| pTSA | 2.2 | 6.6% | 949 |
| pTSA | 5 | 5.9% | 930 |
| Acetic acid | 5 | 5.9% | 937 |
| Acetic acid | 10 | 5.9% | 940 |
| Oxalic acid | 1.2 | 7.3% | 917 |
| Oxalic acid | 2.2 | 6.6% | 923 |
| Oxalic acid | 5 | 5.9% | 922 |
| Oxalic acid | 10 | 5.9% | 928 |

It is surprisingly demonstrated that even when sub-stoichiometric amounts of acid per metal centre are used (such as 1.2 eq. oxalic acid or pTSA), then the polymer molecular weight and selectivity is substantially retained. As catalyst 1 features acetate initiating groups in its active form, it is clear the deactivation process is not dependent on whether the conjugate anion of the acid is a viable initiator for the polymerisation reaction.

Example 4: Stabilisation of an Mn 500 PPC Diol with a Variety of Acids

A 600 g PPC polyol with an Mn of 522 g/mol and 15.1% cyclic carbonate (molar) was stabilised with 5 equivalents of acetic acid in comparison to the catalyst 1 (2.5 eq. per metal site). The sample selectivity was measured over 6 days and found to be unchanged across this period. The results are shown in Table 4.

TABLE 4

| Day | % cyclic | Mn |
| --- | --- | --- |
| 1 | 15.1% | 550 |
| 3 | 15.1% | 550 |
| 6 | 15.2% | 550 |

Example 5: Stabilisation

A 600 g polyethercarbonate polyol containing 59% carbonate linkages (28.7 wt % $CO_2$) with an Mn of 1395 g/mol containing 2 g catalyst 1 and 0.3 g DMC catalyst was stabilised with a number of different acids in different equivalents to catalyst 1. The molecular weight and cyclic content was reassessed after 6 days. The results are shown in Table 5.

TABLE 5

| Acid | Eq. Acid | Cyclic content | Mn |
| --- | --- | --- | --- |
| None(day 1) | 0 | 4.3% | 1395 |
| pTSA | 2.2 | 4.7% | 1373 |
| pTSA | 3.5 | 4.3% | 1371 |
| pTSA | 5 | 4.3% | 1366 |
| Salicylic acid | 2.2 | 4.3% | 1384 |
| Salicylic acid | 3.5 | 4.3% | 1389 |
| Salicylic acid | 5 | 4.3% | 1387 |
| Acetic acid | 2.2 | 4.3% | 1381 |
| Acetic acid | 5 | 4.3% | 1386 |

The different acids all demonstrated a similar level of stabilisation, with no increase in cyclic carbonate observed and a stabilised molecular weight see for all samples. The pTSA stabilised samples showed a very marginal decrease in molecular weight, possibly because pTSA is known to degrade polyethers. This demonstrates that the catalyst can be successfully deactivated in polyether carbonate polyols as well as polycarbonates and that acids that contain a conjugate anion that is an initiator can be successfully used to quench the catalyst post-reaction.

Some of the samples were heating to 120° C. for 16 hours in the presence of the deactivated catalyst 1, to assess the extent to which the polyols were stabilised. The results are shown in Table 5a

TABLE 5a

| Acid | Eq. Acid | Mn |
| --- | --- | --- |
| None (day 1) | 0 | 1395 |
| pTSA | 2.2 | 1264 |
| pTSA | 3.5 | 1222 |
| pTSA | 5 | 1201 |
| Salicylic acid | 2.2 | 1385 |
| Salicylic acid | 5 | 1277 |
| Acetic acid | 5 | 1247 |

It was found that after heating the crude samples at 120° C. for 16 hours, in the presence of the deactivated catalyst, the samples were remarkably robust considering the catalyst was still present. Without being bound by theory, the extra degradation caused by pTSA is considered to be due to the degradation of polyether linkages by pTSA.

Example 6: Catalyst Removal Using Weakly Acidic Resins

To 500 g of polycarbonate polyol of Mn ca. 550 gmol$^{-1}$, stabilised by 5 equivalents of p-TSA containing about 4 g of catalyst 1 and 8 wt % cyclic carbonate, was added EtOAc (500 mL) and dried, acidified Amberlite IRC748 resin (functional group iminodiacetic acid, 300 g, acidified, dried).

The mixture was stirred overnight then the resin was removed by filtration and washed with 2×200 mL EtOAc. This resulted in the isolation of blue-coloured resin and a colourless polyol/cyclic carbonate/EtOAc mixture with <20 ppm metal (UV-Vis) content in near quantitative yield.

Example 7: Catalyst Removal Using Strongly Acidic Resins

To 500 g of polycarbonate polyol of Mn about 550 gmol$^{-1}$, stabilised by 5 equivalents of p-TSA containing ca. 4 g of catalyst 1 and 8 wt % cyclic carbonate, was added EtOAc (500 mL) and dried, acidified Amberlyst 15 resin (functional group sulfonic acid, 300 g, pre-washed).

The mixture was stirred overnight then the resin was removed by filtration and washed with 2×200 mL EtOAc. This resulted in the isolation of blue-coloured resin and a colourless polyol/cyclic carbonate/EtOAc mixture with <20 ppm metal (UV-Vis) content in near quantitative yield.

Example 8: Catalyst Removal Using Magnesium Silicate

To 600 g of polycarbonate polyol of Mn ca. 2000 gmol$^{-1}$, stabilised using 5 equivalents of p-TSA, containing ca. 4 g of catalyst 2 and 9 wt % cyclic carbonate, was added EtOAc (300 mL). A column was packed with Florisil (600 g, pre-wetted with EtOAc) and the polyol solution added to the top of the column. The polyol mixture was washed through with EtOAc and dried, giving a colourless polyol/cyclic carbonate mixture containing <5 ppm metal by ICP-OES in near quantitative yield.

Example 9: Catalyst Removal Using Alumina

To 2 g of polycarbonate polyol of Mn about 2000 gmol$^{-1}$, stabilised using 5 equivalents of p-TSA containing ca. 0.01 g of catalyst 2 and 30 wt % cyclic carbonate, was added EtOAc (2 mL). A column was packed with neutral or basic Alumina (20 g, pre-wetted with EtOAc) and the polyol solution added to the top of the column. The polyol mixture was washed through with EtOAc and dried, giving a colourless polyol/cyclic carbonate mixture containing <5 ppm metal by ICP-OES in near quantitative yields.

Example 10: Catalyst Removal Using Silica

To 2 g of polycarbonate polyol of Mn about 2000 gmol$^{-1}$, stabilised using 5 equivalents of p-TSA containing ca. 0.01 g of catalyst 2 and 30 wt % cyclic carbonate, was added DCM (2 mL). A column was packed with Silica (12 g, pre-wetted with DCM) and the polyol solution added to the top of the column. The polyol mixture was washed through with CHCl$_3$ and dried, giving a colourless polyol/cyclic carbonate mixture containing <20 ppm metal by ICP-OES in near quantitative yields.

Example 11: Catalyst Removal Using Polymer Beads

An aliquot from the samples produced in example 1 were dissolved in a volume of ethyl acetate and stirred with Dowex Marathon MSC for the allotted time as provided in Table 7 below, after which the samples were filtered and the ethyl acetate removed under vacuum. The samples were analysed by either ICP-OES or UV-Visible spectroscopy for metal content. The results are shown in Table 7.

TABLE 7

| Acid | PPC/Dowex | Solvent | Time | Ni content |
|---|---|---|---|---|
| Salicylic | 1 g/0.15 g | 1.5 g | 40 min | <1 ppm |
| Acetic | 1 g/0.15 g | 1.5 g | 1 h | 1 ppm |
| Oxalic | 1 g/0.2 g | 3.5 g | 1 h | <1 ppm |
| pTSA | 1 g/1.1 g | 3.5 g | 2 h | 13 ppm |

It was surprisingly found that the samples deactivated with carboxylic acids were easily removed from the solution using the Dowex resin. In contrast, the sample deactivated with pTSA required significantly more Dowex resin and time, yet still did not remove as much of the metal.

Example 12: Catalyst Removal by Precipitation and Filtration

A second aliquot from the samples from example 1 were left to stand overnight, at which point green/blue precipitate could be observed in the polyol. The polyols were filtered and analysed for metal content by ICP-OES. The results are shown in Table 8.

TABLE 8

| Acid | Post filtration Ni content | % Ni removed |
|---|---|---|
| Crude | 421 ppm | N/A |
| Salicylic acid | 32 ppm | 92.4 |
| Acetic acid | 174 ppm | 58.7 |
| Oxalic acid | 61 ppm | 85.5 |
| pTSA | 223 ppm | 47.0 |

It was discovered that >92% of the catalyst was removed by a simple precipitation step when salicylic acid was used and >85% was removed by precipitation using oxalic acid. Both acids are multifunctional. Without being bound by theory, it is therefore presumed that the multidentate anions are capable of blocking the vacant coordination sites on the catalyst or enabling aggregates to form, both of which result in a reduced solubility of the catalyst.

Example 13: Regeneration of Catalyst 1 (Method 1)

To a bed of Amberlite IRC-748 beads (500 g, ~1.6 wt % cat) contained on a filter was added EtOAc (400 mL). The beads were allowed 5 minutes to soak with each portion, with occasional stirring, after which a vacuum was applied below the filter and the EtOAc filtrate was discarded. Glacial Acetic acid (400 mL) was added to the beads and allowed 15 minutes to soak, after which a vacuum was applied and a blue filtrate recovered. The filtrate was layered with EtOAc (400 mL) and water (700 mL); this was centrifuged and combined in a separating funnel. The organic layer was washed with excess water and reduced in-vacuo to give catalyst 1 (6.26 g).

MS (ESI or APCI) 767.3 [M−2OAc+ HCOO]$^+$ and 781.3 [M−OAc]$^+$.

Example 14: Regeneration of Catalyst 1 (Method 2)

Purolite C106 (84 g/g of catalyst to be recovered) was added to a crude polymerisation reaction mixture. The resulting suspension was stirred for 90 min at 23° C. The mixture was filtered. The resin was dried on the sinter before transferring to a clean glass jar. To the resin, 30% formic acid in EtOAc (10 mL/g resin) was added, and the suspension was stirred for 4 h. The mixture was filtered to collect the resin. The organics were dried over $Na_2SO_4$, filtered, MeOH was added to the mixture, and the solvents were evaporated in vacuo. This produced the catalyst 1 as a solid (260 mg).

MS (ESI or APCI) 767.3 [M+ HCOO]$^+$.

Example 15: Regeneration of Catalyst 1 (Method 3)

Purolite C106 (84 g/g of catalyst to be recovered) was added to a crude polymerisation reaction mixture. The resulting suspension was stirred for 3 h at 23° C. The mixture was filtered. The resin was dried on the sinter before transferring to a clean glass jar. To the resin, 1 L of acetic acid and 1 L of EtOH was added, and the suspension was stirred for 2 h at 23° C. The mixture was filtered to remove the resin, and the solvents were removed in vacuo, yielding a blue suspension. The resulting suspension was filtered, and washed with water (100 mL), yielding the catalyst 1 as a solid (2.37 g).

MS (ESI or APCI) 767.3 [M−2OAc+ HCOO]$^+$ and 781.3 [M−OAc]$^+$.

Example 16: Copolymerisation Using a Recovered Catalyst

Dodecanediol (1.05 g, 5.2 mmol) was taken into reactor and dried at 100° C. under vacuum for 30 minutes, after cooling the reactor down to room temperature, it was pressurised to 0.2 bar of $CO_2$ and cycled vacuum/$CO_2$ 3 times. The recovered catalyst, (0.086 mmol) was taken into a Schlenk tube and dried under vacuum for 30 minutes before propylene oxide (15 mL, 0.214 mol) was added via syringe to the reactor under $CO_2$. The reactor was heated to 75° C. and pressurised to 20 bar $CO_2$ and reactor heated to 75° C. The setpoint temperature and pressure were maintained for 16 hours. The reactor was cooled to below 10° C. and pressure slowly vented. $^1$H NMR and GPC were measured immediately.

| Catalyst | Relative TON | Relative selectivity | Relative Mn |
|---|---|---|---|
| New catalyst | 100.0% | 100% | 100.0% |
| Recaptured Method 1 | 76.8% | 101% | 85.5% |
| Recaptured Method 2 | 50.9% | 86.1% | 54.6% |
| Recaptured Method 3 | 38.6% | 57.8% | 37.9% |

The data demonstrates that the recaptured catalysts were active in producing polypropylene carbonate polyols and could be recovered with activity approaching that of fresh catalyst.

The invention claimed is:

1. A method for quenching a polymerization process comprising the reaction of carbon dioxide with an epoxide in the presence of a bimetallic metal complex catalyst, the method comprising the step of deactivation of the catalyst by contacting the catalyst with an acid effective to deactivate the catalyst.

2. A method for purifying a polymer product formed from a polymerization process comprising the reaction of carbon dioxide with an epoxide in the presence of a bimetallic metal complex catalyst, the method comprising the steps of:
   (i) quenching the polymerization process by contacting the catalyst with an acid effective to deactivate the catalyst;
   (ii) removing the deactivated catalyst from the polymer product by contacting said deactivated catalyst and polymer product with a solid phase and/or by precipitation; and
   (iii) optionally reactivating the catalyst by contacting the deactivated catalyst with an anion.

3. A method according to claim 1, wherein the molar ratio of acid to catalyst in the deactivation step is less than or equal to 20:1 of the acid to catalyst mole ratio for the deactivation reaction.

4. A method according to claim 3, wherein the molar ratio of acid to catalyst in the deactivation step is less than or equal to 10:1 of the acid to catalyst mole ratio for the deactivation reaction.

5. A method according to claim 1, wherein the acid contains an anion effective to initiate the polymerization process.

6. A method for quenching a polymerization process comprising the reaction of carbon dioxide with an epoxide in the presence of a metal complex catalyst, the method comprising the step of deactivation of the catalyst by contacting the catalyst with an acid effective to deactivate the catalyst and which contains an anion effective to initiate the polymerization process and wherein the molar ratio of acid to catalyst in the deactivation step is less than or equal to 20:1 of the acid to catalyst mole ratio for the deactivation reaction.

7. A method for purifying a polymer product formed from a polymerization process comprising the reaction of carbon dioxide with an epoxide in the presence of a metal complex catalyst, the method comprising the steps of:
   (i) quenching the polymerization process by contacting the catalyst with an acid containing an anion effective to initiate the polymerization process and effective to deactivate the catalyst, wherein the molar ratio of acid to catalyst in the deactivation step is less than or equal to 20:1 of the acid to catalyst mole ratio for the reaction;
   (ii) removing the deactivated catalyst from the polymer product by contacting said deactivated catalyst and polymer product with a solid phase and/or by precipitation; and
   (iii) optionally reactivating the catalyst by contacting the deactivated catalyst with an anion.

8. A method according to claim 7, wherein the molar ratio of acid to catalyst in the deactivation step is less than or equal to 10:1 of the acid to catalyst mole ratio for the reaction.

9. A method according to claim 1, wherein the acid is a carboxylic acid.

10. A method according to claim 9, wherein the acid is a functionalized carboxylic acid comprising one or more other functional groups in addition to the acid group effective to form a stable bond or interaction with one or more of the metal centers of the catalyst.

11. A method according to claim 10, wherein the functional groups are selected from —OH, —SO$_3$H, —P(O)(OH)$_2$, —N(R$^9$)$_2$ or —COOH, wherein R$^9$ is independently selected from hydrogen, an aliphatic, heteroaliphatic, alicyclic, heteroalicyclic, aryl or heteroaryl group.

12. A method according to claim 11, wherein the functionalized carboxylic acid is a dicarboxylic, tricarboxylic or hydroxy carboxylic acid.

13. A method according to claim 1, wherein the acid contains an anion selected from OC(O)CH$_3$, OC(O)CH$_2$CH$_3$, OC(O)(CH$_2$)$_2$CH$_3$, OC(O)(CH$_2$)$_3$CH$_3$, OC(O)

(CH$_2$)$_4$CH$_3$, OC(O)(CH$_2$)$_5$CH$_3$, OC(O)(CH$_2$)$_6$CH$_3$, OC(O)C(CH$_3$)$_3$, OC(O)C$_6$H$_5$, OC(O)CCl$_3$ and/or OC(O)CF$_3$.

14. A method according to claim 1, wherein the acid has a pKa of at least 2.5.

15. A method according to claim 1, the metal complex catalyst is of formula (I) or formula (II):

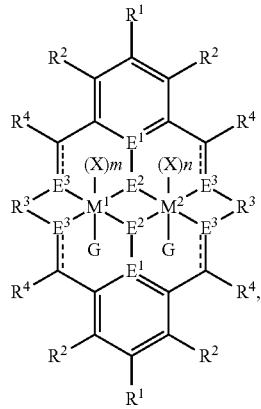

formula (I)

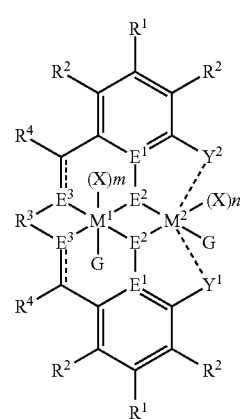

formula (II)

wherein R$^1$ and R$^2$ are independently selected from hydrogen, halide, a nitro group, a nitrile group, an imine group, —NCR$^{13}$R$^{14}$, an amine, an ether —OR', —R$^{16}$OR$^{17}$, an ester group —OC(O)R$^{10}$ or —C(O)OR$^{10}$, an amido group —NR$^9$C(O)R$^9$ or —C(O)—NR$^9$(R$^9$), —COOH, —C(O)R$^{15}$, —OP(O)(OR$^{18}$)(OR$^{19}$), —P(O)R$^{20}$R$^{21}$, —P(O)(OR)(OR), —OP(O)R(OR), a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

R$^3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

R$^4$ is independently selected from H, or optionally substituted aliphatic, heteroaliphatic, alicyclic, heteroalicyclic, aryl, heteroaryl, alkylheteroaryl or alkylaryl;

R$^9$, R$^{10}$, R$^{13}$, R$^{14}$, R$^{18}$, R$^{19}$, R$^{20}$ and R$^{21}$ are independently selected from hydrogen or an aliphatic, heteroaliphatic, alicyclic, heteroalicyclic, aryl or heteroaryl group;

E$^1$ is C, E$^2$ is O, S or NH or E$^1$ is N and E$^2$ is O;

E$^3$ is N, NR$^5$, O or S, wherein when E$^3$ is N,

===== is =====, and when E$^3$ is NR$^5$, O or S,

===== is ——;

R$^5$ is independently selected from H, or optionally substituted aliphatic, heteroaliphatic, alicyclic, heteroalicyclic, aryl, heteroaryl, alkylheteroaryl, -alkylC(O)OR$^{10}$, -alkylnitrile, or alkylaryl;

X, when present, is independently selected from OC(O)R$^x$, OSO$_2$R$^x$, OSOR$^x$, OSO(R$^x$)$_2$, S(O)R$^x$, OR$^x$, phosphinate, halide, nitrate, hydroxyl, carbonate, amino, nitro, amido or optionally substituted aliphatic, heteroaliphatic, alicyclic, heteroalicyclic, aryl or heteroaryl;

m and n are independently integers selected from the range 0-3, such that the sum of m and n is 0-5;

R$^x$ is independently selected from hydrogen or an aliphatic, heteroaliphatic, alicyclic, heteroalicyclic, aryl or heteroaryl group;

each G is independently absent or a neutral or anionic donor ligand which is a Lewis base;

Y$^1$ and Y$^2$, when present, are independently a neutral or anionic donor group capable of donating a lone pair to the metal M$^2$; and M$^1$ and M$^2$ are independently selected from Zn(II), Cr(II), Co(II), Cu(II), Mn(II), Mg(II), Ni(II), Fe(II), Ti(II), V(II), Cr(III), Co(III), Mn(III), Ni(III), Fe(III), Ca(II), Ge(II), Al(III), Ti(III), V(III), Ge(IV), Y(III), Sc(III) or Ti(IV).

16. A method according to claim 2, wherein the solid phase is an inorganic solid phase or an ion exchange resin.

17. A method according to claim 16, wherein the ion exchange resin is an acidic ion exchange resin.

18. A method according to claim 2, wherein the deactivated catalyst is caused to precipitate from the crude polymer product by the addition of one or more precipitant or precipitates automatically.

19. A method according to claim 2, wherein the anion is derived from an acid.

20. A method according to claim 19, wherein the anion is derived from one or more carboxylic acid(s).

21. A method according to claim 16, wherein the anion is derived from a functionalized carboxylic acid comprising one or more other functional groups in addition to the acid effective to form a stable bond or interaction with one or more of the metal centers of the catalyst, a metal salt of a functional carboxylic acid comprising one or more other functional groups effective to form a stable bond or interaction with one or more of the metal centers of the catalyst or combinations thereof.

22. A method according to claim 21, wherein the functional groups are selected from —OH, —SO$_3$H, —P(O)(OH)$_2$, —N(R$^9$)$_2$ or —COOH, wherein R$^9$ is independently selected from hydrogen, an aliphatic, heteroaliphatic, alicyclic, heteroalicyclic, aryl or heteroaryl group.

23. A method according to claim 22, wherein the functionalized carboxylic acid is a dicarboxylic, tricarboxylic or hydroxy carboxylic acid.

24. A method according to claim 19, wherein the anion is derived from an acid which has a pKa of at least 2.5.

25. A method according to claim 1, wherein the anion is able to act as an initiator for the polymerization process.

26. A method according to claim 25, wherein the anion is selected from $OC(O)CH_3$, $OC(O)CH_2CH_3$, $OC(O)(CH_2)_2CH_3$, $OC(O)(CH_2)_3CH_3$, $OC(O)(CH_2)_4CH_3$, $OC(O)(CH_2)_5CH_3$, $OC(O)(CH_2)_6CH_3$, $OC(O)C(CH_3)_3$, $OC(O)C_6H_5$, $OC(O)CCC_{13}$ and/or $OC(O)CF_3$.

27. A method according to claim 1, wherein the acid does not include trimesic acid.

28. A method according to claim 1, wherein the acid used to deactivate the catalyst is present on a solid support, and the solid support acts as the solid phase for the step of removing the deactivated catalyst from the polymer product.

29. A method for purifying a polymer product formed from a polymerization process comprising the reaction of carbon dioxide with an epoxide in the presence of a bimetallic metal complex catalyst, the method comprising the steps of:
  (i) quenching the polymerization process by contacting the catalyst with an acid effective to deactivate the catalyst;
  (ii) removing the deactivated catalyst from the polymer product by contacting said deactivated catalyst and polymer product with a solid phase and/or by precipitation; and
  (iii) optionally reactivating the catalyst by contacting the deactivated catalyst with an anion;
  wherein the acid used to deactivate the catalyst is present on a solid support, and the solid support acts as the solid phase for the step of removing the deactivated catalyst from the polymer product.

30. A method according to claim 1, wherein the deactivation step and removal step are performed simultaneously.

31. A method according to claim 2, wherein the solid phase is an inorganic solid phase optionally selected from silica, alumina, zirconia, molecular sieves, zeolites, clays or derivatives or combinations thereof; wherein optionally, the inorganic solid phase is surface functionalized with functional groups effective to form a stable bond with one or more of the metal centers of the deactivated catalyst, optionally, with hydroxyl, carboxylic acid, carboxylate, sulphonic acid, sulphonate, phosphate, thiol and or amine functional groups.

* * * * *

UNITED STATES PATENT AND TRADEMARK OFFICE
CERTIFICATE OF CORRECTION

PATENT NO. : 11,613,606 B2  
APPLICATION NO. : 16/758179  
DATED : March 28, 2023  
INVENTOR(S) : Kember et al.

Page 1 of 2

It is certified that error appears in the above-identified patent and that said Letters Patent is hereby corrected as shown below:

In the Specification

Column 4, Line 67: Please correct "–OR$^{19}$," to read -- –OR$^{15}$,--

Column 10, Line 10: Please correct "Cr(II)" to read --Cr(III)--

Column 37, Line 32: Please correct "one of one" to read --one of: one--

Column 37, Line 49: Please correct "M$^1$" to read --M'--

Column 38, Line 22: Please correct "Co(II)" to read --Co(III)--

Column 38, Line 25: Please correct "Cr(II)" to read --Cr(III)--

Column 41, Line 51: Please correct "hexacyanocobaltate(II)" to read --hexacyanocobaltate(III)--

Column 41, Line 51: Please correct "hexacyanoferrate(II)" to read --hexacyanoferrate(III)--

Column 41, Line 52-53: Please correct "hexacyanocobaltate(II)" to read --hexacyanocobaltate(III)--

Column 43, Line 51: Please correct "OSO$_2$C$_1$H$_7$" to read --OSO$_2$C$_7$H$_7$--

Column 49-50: Please remove formula (IV) and replace with the following:

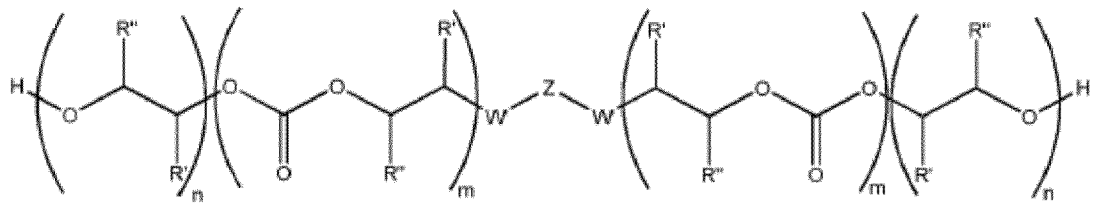

Signed and Sealed this  
Eighth Day of August, 2023

Katherine Kelly Vidal  
*Director of the United States Patent and Trademark Office*

CERTIFICATE OF CORRECTION (continued)
U.S. Pat. No. 11,613,606 B2

Column 51, Line 35: Please correct "M," to read --$M_n$--

Column 53, Line 49: Please correct "$C_5$-$C_2$" to read --$C_5$-$C_{20}$--

Column 54, Line 41: Please correct "OC(O)(CH$_2$) CH$_3$" to read --OC(O)(CH$_2$)$_4$CH$_3$--

Column 61, Line 66: Please correct "from to 14 atoms," to read --from 5 to 14 atoms,--

Column 63, Line 19: Please correct ""$C_{6-12}$ aryloxy group"" to read --"$C_{6-10}$ aryloxy group"--

Column 63, Line 22: Please correct ""1-20 alkylthio group"" to read --a "$C_{1-20}$ alkylthio group"--

Column 63, Line 28: Please correct "$C_{1-10}$ alkyl, $C_{1-6}$ alkyl," to read --$C_{1-10}$ alkyl, $C_{1-8}$ alkyl--

Column 66, Table 1: Please remove TABLE 1 and replace with the following:

| Acid | % cyclic | Mn (PDI) |
|---|---|---|
| Crude (day 1) | 2.6% | 2243 (1.05) |
| No acid | 67.8% | 1065 (1.21) |
| p-toluene sulfonic acid (pTSA) | 2.6% | 2234 (1.05) |
| Oxalic acid | 2.6% | 2243 (1.05) |
| Acetic acid | 2.6% | 2234 (1.05) |
| Salicylic acid | 2.6% | 2235 (1.05) |

In the Claims

Column 73, Line 6, Claim 15: Please correct "A method according to claim 1, the" to read --A method according to claim 1, wherein the--

Column 75, Line 12, Claim 26: Please correct "OC(O)CCC$_{13}$" to read --OC(O)CCCl$_3$--